United States Patent
Royall, Jr. et al.

(10) Patent No.: US 11,769,082 B2
(45) Date of Patent: Sep. 26, 2023

(54) SYSTEMS AND METHODS FOR LIVE EVENT MANAGEMENT AND REMOTE INTEGRATION

(71) Applicant: PromoTix, Inc., Christiansted, VI (US)

(72) Inventors: William Russell Royall, Jr., Christiansted, VI (US); Sebastian Chan Schulze, Acton, MA (US); Leah Kay Simons, Indianapolis, IN (US)

(73) Assignee: PromoTix, Inc., Christiansted, VI (US)

( * ) Notice: Subject to any disclaimer, the term of this patent is extended or adjusted under 35 U.S.C. 154(b) by 104 days.

(21) Appl. No.: 17/127,982

(22) Filed: Dec. 18, 2020

(65) Prior Publication Data
US 2021/0398029 A1 Dec. 23, 2021

Related U.S. Application Data

(60) Provisional application No. 63/041,737, filed on Jun. 19, 2020.

(51) Int. Cl.
*G06Q 10/02* (2012.01)

(52) U.S. Cl.
CPC .................................. *G06Q 10/02* (2013.01)

(58) Field of Classification Search
CPC ........... G06Q 30/0206; G06Q 30/0283; G06Q 30/0284; G06Q 10/02
See application file for complete search history.

(56) References Cited

U.S. PATENT DOCUMENTS

| | | | |
|---|---|---|---|
| 2007/0055554 A1* | 3/2007 | Sussman | G06Q 10/06 705/5 |
| 2008/0109297 A1* | 5/2008 | Leach | G06Q 30/08 705/7.31 |

(Continued)

OTHER PUBLICATIONS

Ticketmaster, "Ticketmaster's Face Value Ticket Exchange," Feb. 14, 2020, https://help.ticketmaster.com/s/article/Fan-to-Fan-Ticket-Exchange?language=en_US (Year: 2020).*

(Continued)

*Primary Examiner* — Emmett K. Walsh
*Assistant Examiner* — Michelle E Carey
(74) *Attorney, Agent, or Firm* — Wolf, Greenfield & Sacks, P.C.

(57) ABSTRACT

Provided are systems and methods for an event management platform that include integrated services that are conventionally provided as add-on features or even provided by third party servicers in conventional approaches. The system delivers functionality not available in any conventional approach. The system and method deliver event management for both online and in-person event execution. Ticketing operation is integral in the platform and can be provided without notorious ticket service fees. Further embodiments automatically integrate an ambassador platform configured to deliver promotion, tracking, marketing, and attribution functions with little or no input required from an event organizer. Pre-registration services can be implemented with little or no input, and ambassador teams can be linked by the system to an event and used to drive participation. Information captured and made available by the ambassador platform and ticketing platform enables audience insights and targeting that are unavailable in conventional systems.

23 Claims, 36 Drawing Sheets
(17 of 36 Drawing Sheet(s) Filed in Color)

(56) References Cited

U.S. PATENT DOCUMENTS

| | | | |
|---|---|---|---|
| 2009/0198528 A1* | 8/2009 | Kahn | G06Q 10/02 |
| | | | 705/26.1 |
| 2012/0078667 A1* | 3/2012 | Denker | G06Q 10/02 |
| | | | 705/5 |
| 2018/0039916 A1* | 2/2018 | Ravindra | G07C 9/38 |
| 2020/0311619 A1* | 10/2020 | Ramirez Flores | G06Q 10/02 |

OTHER PUBLICATIONS

"U.S. Department of Transportation Expands Airline Passenger Protections," U.S. Department of Transportation, https://www.transportation.gov/briefing-room/us-department-transportation-expands-airline-passenger-protections, Apr. 20, 2011 (Year: 2011).*
Boley, Megan, "Hybrid Events for Venues: How to Prepare for the Future," https://www.cvent.com/en/blog/hospitality/hybrid-events, May 14, 2020 (Year: 2020).*

* cited by examiner

FIG. 11

SYSTEMS AND METHODS FOR LIVE EVENT MANAGEMENT AND REMOTE INTEGRATION

RELATED APPLICATIONS

This application claims priority under 35 U.S.C. 119(e) to U.S. Provisional Application Ser. No. 63/041,737 entitled "SYSTEMS AND METHODS FOR LIVE EVENT MANAGEMENT AND REMOTE INTEGRATION," filed on Jun. 19, 2020, which application is incorporated herein by reference in its entirety.

BACKGROUND

Various ticketing platforms exist for managing live events and they have attempted to integrate servicing of remote base events under the umbrella of outbreak conditions. The adoption of new technology and interactive systems into event ticketing has been slow. Some market participants point to a near stranglehold position that entrenched ticketing servicers current enjoy. In the context of a system that is slow to adopt new technology and slow to adopt new system implementation, the inventors have realized that there is a need for ticketing to expand beyond the delivery of tickets to events. The need for expansion comes regardless of the updated vehicles for delivery tickets and extends into and throughout the entire vertical of event management, event promotion, and event execution.

SUMMARY

Accordingly, provided is an event management platform that includes integrated services that are conventionally provided as add-on features or even provided by third party servicers, requiring co-ordination and redundant implementation. In various embodiments, the integrated platform reduces implementation redundancy, and produces unexpected benefits in a holistic approach that derives new functionality and/or efficiency in a fully integrated system. According to various aspects, the system manages a hybrid ticketing platform that executes in-person and/or physical world events and ticketing services while offering virtual events and ticketing services to support in-person events, online events, and their combination. The integrated system executes functions to optimize allocation between the physical ticketing and/or in-person event management with automatic virtualization services that provides access outside the in-person event via adaptive streaming services, automatic compute allocation, and can also dynamically access controls that enable participants to transition seamlessly between physical participation in an event and virtual participation, and further maintain options for transitioning between participation options (e.g., in-person and online event participation).

In further aspects, the event management platform includes an ambassador platform or subsystem that is configured to handle almost all aspects of integrating promotion, marketing, and tracking of all activity associated with event management and execution. In various embodiments, the ambassador subsystem can be implemented as its own platform. The ambassador platform can be accessed online, similarly to the ticketing platform. The unique integration of the ambassador platform enables event management and utilization of tools that are often ignored in conventional approaches. The ambassador platform can be configured to recommend promotion integration, identify options overlooked during event creation, and even, in some examples, select and implement promotion functionality automatically.

Various user types can access any of the event management platform, the ticketing platform, and the ambassador platform to harness associated functionality. For event organizers, the system enables event creation and execution management. The system can be configured to automatically define parameters for event execution including ticketing operation (e.g., venue based in-person ticketing and/or audience size limitation, seat assignment, spacing assignment within a physical venue, hybrid options (e.g., online event services responsive to in-person capacity and/or online event integration for any in-persons event, etc.). In further embodiments, an ambassador platform can also be configured to automatically integrate promotion events and/or functions into a new or existing event. In some embodiments, the ambassador platform can match a current event to prior executions and leverage selections on promotions, marketing, advertising, associated games (e.g., promotion based points or rewards tailored to event goals, among other options), etc., in order to automatically prepare ambassador functions on behalf of an event organizer. In other embodiments, the system can analyze new or existing events against pre-defined promotion framework, identifying missing or suboptimal configurations, and present options for enabling those features.

In further embodiments, the ambassador platform and/or the event management platform can enable sponsors and/or brand managers to access the platform and leverage the ambassador functionality to link into a new or existing event. In some examples, the system can match a new or existing event to registered sponsors, and even automatically associate some sponsors to events based on matching criteria the sponsors define (e.g., event type, event locations, costs, income sharing, event organizer, event talent or topic, etc.). In additional embodiments, the system can provide ambassador functions to the event organizer and/or an event manager that can be implemented or presented automatically. Responsive to event creation, the system can match an event to an ambassador framework that defines pre-event functions, event functions, and/or post-event operations, among other options—any of which would likely require integrations external system and managing complex interactions between the same in a conventional implementation.

According to some embodiments, the system can trigger construction of pre-event websites (e.g., pre-registration sites), advertisements, etc. In another example, the system can automatically build and connect an ambassador team to the event. The team can then implement on the ground and/or viral marketing campaigns to ensure that the newly created or existing event is a success. Various embodiments are configured to automatically track and link all such activity to event targets (e.g., ticket sales, referrals, merchandize purchases, registrations, network associations, etc.). The information capture by system can then be used to refine existing promotion functions, recommend additional promotion functions, and/or automatically engage new or additional communication channels, among other options.

In further example, the ambassador program prompts user participation in newly organized or existing events through game-based rewards and/or incentives. Preregistration activities can be targeted by the ambassador platform and specific rewards or points can be given to users who pre-register, refer others, link social platforms, link social networks, tag posts with event identifiers, etc. Through the incentives, the event organizer uses the system to build a pre-event population of users who are going to drive or are likely to drive participation in the event—in some cases, including those likely to also participate. Further, the system leverages such buy-in to build up connected networks of contacts that the system can leverage to achieve event goals.

According to one aspect, a remote event management system is provided. The system comprises at least one processor operatively connected to a memory, the at least one processor when executing is configured to host a ticketing interface for a live performance and remote streamed live event, wherein the ticketing interface includes an in-person interface for kiosk or POS ticketing services; a remote box office service; and an online ticketing platform configured to manage a ticket pool for the live performance and the remote streamed event. According to one embodiment, the system is configured to limit purchase price to face value ticket sale and redemption. According to one embodiment, the system further comprises an external revenue component configured to manage sponsorship operations for the live performance or remote streamed live event.

According to one embodiment, the system further comprises an external revenue component configured to manage ticketing costs based on manage revenue from products or sponsorships. According to one embodiment, the system is configured to determine a threshold value for ticketing operations and determine projected input from the external revenue component meets or excess the threshold value. According to one embodiment, the system dynamically adjusts volume or value to achieve the threshold based on projected input. According to one embodiment, the system is configured to manage execution of an in-person live performance; localized ticketing of persons at the live performance; execute virtual event spaces for the live performance; ticketing for access to the virtual space; and secure broadcast of the live performance to ticketed users through the virtual space.

According to one embodiment, the at least one processor is configured to execute in-person event ticketing and virtual event ticketing, allowing an event to be attended both in-person or virtually. According to one embodiment, the system is configured to manage a distribution period that includes virtual tickets and in-person tickets and enables transitions between in-person tickets and virtual tickets. According to one embodiment, the at least one processor is configured to manage a virtual venue and an in-person venue during event execution. According to one embodiment, the at least one processor is configured to broadcast the event online and secure access to broadcast content based on secured tickets issued by the system.

According to one aspect, a computer implemented method for remote event management is provided. The method comprises hosting, by at least one processor, a ticketing interface for a live performance and remote streamed live event, wherein hosting includes displaying, by the at least one processor, an in-person interface for kiosk or POS ticketing services; executing, by the at least one processor, a remote box office service; and executing, by the at least one processor an online ticketing platform configured to manage a ticket pool for the live performance and the remote streamed event.

According to one embodiment, the method further comprises limiting purchase price to face value ticket sale and redemption. According to one embodiment, the method further comprises managing a sponsor interface and sponsorship operations for the live performance and remote streamed live event. According to one embodiment, the method further comprises external revenue component configured to manage ticketing costs based on manage revenue from products or sponsorships. According to one embodiment, the method further comprises determining a threshold value for ticketing operations and determining projected input from the external revenue component meets or excess the threshold value and dynamically defining ticketing parameters according to the act of determine the threshold.

According to one embodiment, the method further comprises an act of dynamically adjusting ticketing volume or ticketing value to achieve the threshold based on projected input. According to one embodiment, the method further comprises managing, by the at least one processor, execution of an in-person live performance; controlling, by the at least one processor, localized ticketing of persons at the live performance; executing, by the at least one processor, virtual event spaces for the live performance; controlling, by the at least one processor, ticketing for access to the virtual space; and securing, by the at least one processor, broadcast of the live performance to ticketed users through the virtual space. According to one embodiment, the method further comprises executing, by the at least one processor, in-person event ticketing and virtual event ticketing, and enabling an event to be attended both in-person or virtually by at least a respective participant.

According to one embodiment, the method further comprises executing, by the at least one processor, distribution period that includes virtual ticket distribution and in-person ticket distribution, and controlling, by the at least one processor, transitions between in-person tickets and virtual tickets. According to one embodiment, the method further comprises managing, by the at least one processor, ticket distribution and redemption via a virtual venue and an in-person venue during event execution. According to one embodiment, the method further comprises broadcasting, by the at least one processor, the event online and securing, by the at least one processor, access to broadcast content based on secured tickets issued by the method.

According to one aspect, an event management platform is provided. The platform comprises at least one processor operatively connected to a memory, the at least one processor when executing is configured to manage definition of event including a live performance; control ticketing for online, live in-person, and hybrid execution of defined events; for an existing event definition, audit the existing event definition to identify at least one ambassador function missing from the existing event; for a new event, generate at least one recommendation for ambassador functions to include and execute as part of event definition; wherein the at least one processor is configured to identify missing or recommendation ambassador functions based at least in part on analyzing a pre-defined ambassador framework or intelligent model matching prior events to the existing or the new event; and responsive to selection to enable the ambassador function, define and execute the ambassador function.

According to one embodiment, the at least one processor is further configured to enable a social media integration as at least part of the ambassador function or event definition; access social media activity of registered ambassador users; and capture preference information associated with respective registered ambassador users and associated social networks connected to the respective ambassador users. According to one embodiment, the at least one processor is further configured to identify music preference and associated performers based on capturing preference information; group audience candidates based on the music preference and the associated performers; define communication channels responsive to grouping the audience candidates; and communicate event information to the define communication channels.

According to one embodiment, the at least one processor is further configured to track ambassador activity online and in-person; attribute the ambassador activity to respective ambassadors; and award points or rewards based on a defined ambassador program. According to one embodiment, the at least one processor is further configured to establish goals associated with the defined ambassador program; analyze tracked ambassador activity to determine goal completion; and request validation information from a respective ambassador to verify goal completion. According to one embodiment, the at least one processor is further configured to identify submitted validation information; associate the submitted validation information; and credit an ambassador based on confirming goal completion based on submitted validation information. According to one embodiment, the at least one processor is further configured to manage execution of ticket or merchandise distribution from an ambassador to a purchaser, wherein managing includes functions to generate and execute a ticket or merchandise purchase from the event organizer to the ambassador response to a transfer of a ticket or merchandise from the ambassador to a purchaser. According to one embodiment, the at least one processor is further configured to generate candidate audiences associated with event definition and determine recommendations for talent to book for a given event responsive to generation of the candidate audience. According to one embodiment, the at least one processor is further configured to generate custom audiences for targeting communication based on preference modelling.

According to one embodiment, the at least one processor is further configured to automatically match event definition parameters to candidate audiences, responsive to event definition. According to one embodiment, the at least one processor is further configured to identify talent booked for an event; determine the candidate audience for an event location responsive to identifying the talent booked for an event; create custom communication channels or ambassador events goals to connect to the candidate audience; and display targeted communication options to the end user.

According to one aspect, a computer implemented method for event management is provided. The method comprises managing, by at least one processor, definition of event including a live performance; controlling, by the at least one processor, ticketing for online, live in-person, and hybrid execution of defined events; auditing, by the at least one processor, for an existing event definition, to identify at least one ambassador function missing from the existing event; generating, by the at least one processor, at least one recommendation for ambassador functions to include and execute as part of event definition for a new event; identifying, by the at least one processor, missing or recommendation ambassador functions based at least in part on analyzing a pre-defined ambassador framework or intelligent model matching prior events to the existing or the new event; and enabling, by the at least one processor, the ambassador function responsive to selection in a user interface; and defining, by the at least one processor, parameters for the ambassador function; and executing the ambassador function according to the defined parameters.

According to one embodiment, the method further comprises enabling, by the at least one processor, a social media integration as at least part of the ambassador function or event definition; accessing, by the at least one processor, social media activity of registered ambassador users; and capturing, by the at least one processor, preference information associated with respective registered ambassador users and associated social networks connected to the respective ambassador users. According to one embodiment, the method further comprises identifying, by the at least one processor, music preference and associated performers based on capturing preference information; grouping, by the at least one processor, audience candidates based on the music preference and the associated performers; defining, by the at least one processor, communication channels responsive to grouping the audience candidates; and communicating, by the at least one processor, event information to the defined communication channels.

According to one embodiment, the method further comprises tracking, by the at least one processor, ambassador activity online and in-person; attributing, by the at least one processor, the ambassador activity to respective ambassadors; and awarding, by the at least one processor, points or rewards based on a defined ambassador program. According to one embodiment, the method further comprises automatically establishing, by the at least one processor, goals associated with the defined ambassador program without user input; analyzing, by the at least one processor, tracked ambassador activity to determine goal completion; and requesting, by the at least one processor, validation information from a respective ambassador to verify goal completion. According to one embodiment, the method further comprises identifying, by the at least one processor, submitted validation information; associating, by the at least one processor, the submitted validation information; and crediting, by the at least one processor, an ambassador based on confirming goal completion based on submitted validation information.

According to one embodiment, the method further comprises managing, by the at least one processor, execution of ticket or merchandise distribution from an ambassador to a purchaser, wherein managing includes generating and executing a ticket or merchandise purchase from the event organizer to the ambassador response to a transfer of a ticket or merchandise from the ambassador to a purchaser. According to one embodiment, the method further comprises generating, by the at least one processor, candidate audiences associate with event definition; and determining, by the at least one processor, recommendations for talent to book for a given event responsive to generation of the candidate audience. According to one embodiment, the method further comprises generating, by the at least one processor, custom audiences for targeting communication based on preference modelling.

According to one aspect, a remote event management system is provided. The system comprises at least one processor operatively connected to a memory. The at least one processor when executing is configured to host a ticketing interface for a live performance or remote streamed live event, wherein the ticketing interface includes an in-person interface for kiosk or POS ticketing services; a remote box office service; and an online ticketing platform configured to manage a ticket pool for the live performance or the remote streamed event. According to one embodiment, the system is configured to limit purchase price to face value ticket sale and/or redemption.

According to one embodiment, the system further comprises an external revenue component configured to manage sponsorship operations for the live performance or remote streamed live event. According to one embodiment, the system further comprises an external revenue component configured to manage ticketing costs based on manage revenue from products or sponsorships. According to one embodiment, the system is configured to determine a threshold value for ticketing operations and determine projected input from the external revenue component meets or excess the threshold value. According to one embodiment, the system dynamically adjusts volume or value to achieve the threshold based on projected input.

According to one embodiment, the system manages a live performance; localized ticketing of persons at the live performance; and virtual event spaces for the live performance. According to one embodiment, the at least one processor is configured to execute in-person event ticketing and virtual event ticketing, allowing an event to be attended both in-person or virtually. According to one embodiment, the system is configured to manage a distribution period that includes virtual tickets and in-person tickets (e.g., sold at the same time, in the same transaction, to attend the same event). According to one embodiment, the at least one processor is configured to manage a virtual venue and an in-person venue.

Still other aspects, embodiments, and advantages of these exemplary aspects and embodiments, are discussed in detail below. Any embodiment disclosed herein may be combined with any other embodiment in any manner consistent with at least one of the objects, aims, and needs disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF THE DRAWINGS

Various aspects of at least one embodiment are discussed below with reference to the accompanying figures, which are not intended to be drawn to scale. Where technical features in the figures, detailed description or any claim are followed by reference signs, the reference signs have been included for the sole purpose of increasing the intelligibility of the figures, detailed description, and claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. The figures are provided for the purposes of illustration and explanation and are not intended as a definition of the limits of the invention. The present application file contains at least one drawing executed in color. Copies of this patent or patent application publication with color drawing(s) will be provided by the Office upon request and payment of the necessary fee. In the figures:

FIGS. 9-13 illustrate example screen captures, according to one embodiment;

DETAILED DESCRIPTION

Figure 1:
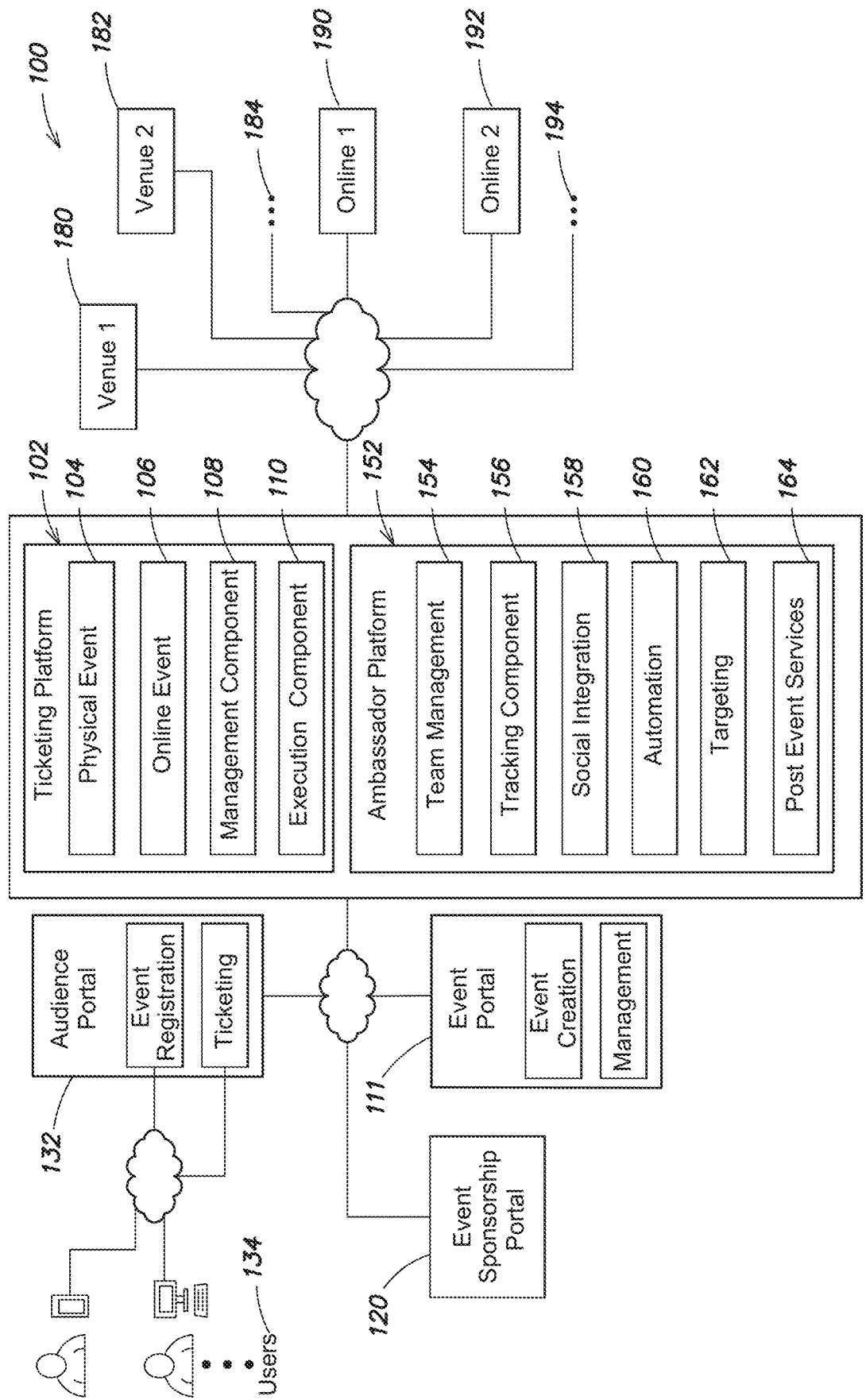
FIG. 1 is a block diagram of an event management system, according to one embodiment.

According to various embodiments, event management systems can be configured to facilitate event management and event execution in both the physical and online spaces. According to some aspects, the event management platform can include subsystems that manage ticketing, promotions and distribution, as well as subsystems that can manage merchandise sales for each any event and do so before an event, during and event, and even after an event whether the event is online, physical or any combination of the same. In various embodiments, the event management platform delivers functions and services that can eliminate the notorious ticketing fees that are currently ubiquitous in ticket and event management.

Further aspects provide subsystems for a unique ambassador program. In some embodiments, prior participants can be connected to new or existing events to become an ambassador team. Such teams can leverage their knowledge and connections to improve participation in events, improve communication channels between event organizers and potential participants, etc. The ambassador subsystem can be configured to automatically integrate pre-event registration pages and notices, marketing campaigns, and ambassador gaming incentives and provide such functionality in conjunction with any new or existing event. Such integrated ambassador platform improves over conventional approaches that often require external systems to provide similar functionality. Often the configuration of such external services/systems prevents or limits adoption. In many circumstances, event organizers lack the technical expertise to fully leverage, and in some circumstances, even to use such systems. Many of these issues, including complex system integration issues, are eliminated by the system's selections/recommendations and/or implementation of ambassador programs that can occur automatically or as simple enable-based selections in user interfaces presented to event organizers.

In some other aspects, events, organizers, and sponsors are readily linked by the event management platforms using the ambassador subsystem. In some embodiments, sponsorships provide the opportunity to deliver a fee free ticketing approach for managing events. In further embodiments, participants and sponsors gain access to a rich body of knowledge based on event participants and ambassador information. Further aspects of the system draw in social information, social network information, and any online activity to construct a database that can include any social platform activity. In one example, social media music platforms become a unique source of event management data that can be viewed through the lens of an event participant and/or ambassador team member and their music preferences. The various insights delivered in this context provide unique targeting insights for increasing participation and even for tailoring rewards to ambassador teams. In various embodiments, the event management system can be used by the event organizers, promoters, sponsors, and merchandising teams to filter communication and develop communication targets using such insights at a level not achieved in various conventional approaches.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, any combination of, and all of the described terms.

FIG. 1 is a block diagram showing an example embodiment of an event management system 100. The event management system 100 can include an event management engine executing on various computer systems and/or instantiate a variety of sub-systems that can be configured to execute the functions and/or processes described below.

According to one embodiment, the system can include a ticketing platform 102 configured to manage ticketing for an event that can occur in-person, online, or as a hybrid of online and in-person elements. In further examples, the system can link an event to physical space or venue (e.g., 180-184), and a physical event component 104 can be configured to store and/or capture information on a variety of venues. In further example, venues can be registered on the event management system through the physical event component 104, which can prompt entry of venue specific information (e.g., location, ticketing capacity, access restrictions, age limits, parking, etc.). The venue specific information can used by the system to manage and/or determine ticketing options.

The physical event component 104 can also be configured to dynamically adjust parameters for a venue. For example, ticketing in a pandemic world may require an organizer or event manager to maintain spacing between in-person participants. The ticketing platform and/or physical event component can analyze seating plans and other parameters associated with a venue as part of and/or in conjunction with ticket assignment to ensure appropriate spacing. In some examples, the system can include "cohort" designations that permit groups of designated users to be in proximity at an event. In further example, system users (e.g., event organizers or venue managers, etc.) can specify criteria for defining "cohort" participants (e.g., family members, same address, relationship, etc.) that the system can validate before permitting proximate seating. In various embodiments, the system can enable pandemic compliant seating assignment that better utilizes venue resources. The system may also enforce upper ticketing thresholds (e.g., even with cohorts) to limit utilization of venue resources and may consider factors besides seating assignment (e.g., sanitary facilities, parking, access to seating, etc.) and/or limit crowding for the same resources.

In further embodiments, the ticketing platform can also include an online event component 106 configured to manage, for example, online resources needed to run an online event or an online portion of an in-person/online event. The online event component 106 can also be configured to request, allocate, and/or monitor cloud compute resources for broadcasting live and/or recorded events. In various embodiments, the online event component 106 can be configured to track ticketing for an online event, validate ticketing for participation, and secure communication of the event to users and/or registered users' devices. In some examples, the platform and/or online event component can maintain history information on users and devices used to access online events. The system can validate current access against historical information (e.g., same access location, matching access location, same access device) and/or increase security requests in response to deviations. In other embodiments, users can register devices to receive their tickets and to identify devices to use in viewing online events.

According to one embodiment, the online event component 106 can be configured to estimate needed resources for executing an online event, and automatically allocate cloud resources to support the online event. The online event component can also be configured to monitor events and transmission to determine if any shortage of resource, bandwidth, etc., occurs during an event. Responsive to under allocation, the online event component can request and integrate additional cloud compute resources. In further embodiments, monitoring and allocation functions can also be performed by a management component 108 and/or various functions can be shared or performed by either the online event component or the management component 108.

In various embodiments, the ticketing platform can include a management component 108 configured to track information on a given event, and to manage resources needed for event execution. In some examples, the management component is configured to handle passing of resources, information, and analysis between physical event components and online event components. In some settings the management component can also be configured to generate, maintain, and/or communicate with external portals that are accessible online to end users (e.g., ticket purchasers, event organizers, event sponsors, etc.). Shown in FIG. 1 at 132 is an audience portal configured to display user interfaces to potential event participants. Such users 134 can access the portal 132 for event registration, ticket purchasing, system registration, device linking, game access, reward access, social media integration, etc. In various embodiments, the audience portal is configured to provide access to system functionality associated with potential audience members for events and promotion activity associated with events.

According to various embodiments, the system can include an event portal 110 configured to provide access to the system for event creation, event development, event marketing, merchandising, etc. An event organizer can access the event portal to create an event, modify an event, and/or cancel an event should it become necessary. In some embodiments, the event portal 110 provides access to various event frameworks. In some examples, the event frameworks provide event organizers pre-defined options for implementing ticketing approaches, which may include pre-defined selections for pandemic seat assignment (e.g., spacing requirements and/or capacity restrictions based on venue accommodations (e.g., access pathways and volume control, sanity facilities and capacity, food service options and controls (if allowed)), among many other options). In further example, the event frameworks enable an event organizer to select a desired framework and based on pre-defined selection have a complete and executable event definition with a few simple selections in the user interface. This ability is unavailable in various conventional approaches, and for ticketing and event management that require external system integration is likely not even achievable. In various embodiments, the result is a system that can more efficiently generate events and, in others a system that effectively reduces needed system implementation and the associated communication between various systems relied on by various conventional implementation.

According to some embodiments, the event system can also be configured to accept user definition of event options and details including event type, timing, location(s), venue, etc. The system can capture event details to generate intelligent models of a respective event and match a respective event to other events that have occurred via the intelligent models. The system can then use prior selections and/or intelligent models of prior event definition and event options to automatically implement event definition choices on behalf of the event organizer. The result of such embodiments eliminates decision points that plague normal event definition and provides functionality that is unavailable in conventional implementation. Further, the system can analyze a defined event to identify options that have not been implemented and often are not even considered.

In various embodiments, the system can include intelligent algorithms to analyze historical event execution including ticketing, promotion, merchandising, etc., and optimize event definition options for an event organizer based on identifying the optimal choice for such configurations using the intelligent models. Additional analysis and options are discussed in greater detail below. In some embodiments, intelligent modelling can include matching event sponsors to existing or newly created events. In some alternatives, an event sponsor can define criteria and the system can match the sponsor to events based on a rule based or procedural matching approach.

For example, a sponsor can access the system via a sponsor portal 120 to use the functions and analysis available on the system. As discussed, sponsors can define event criteria for events that they wish to participate in, and use the criteria to have the system connect sponsors to event organizers. In other examples, the sponsors can use criteria to filter options for events so that the sponsors can view and/or navigate various events/sponsorship opportunities.

In some embodiments, the management component can be configured to generate and maintain the various portals for controlling interaction between various users (e.g., potential event participants, ticket purchasers, event organizers, event sponsors, ambassadors, etc.) in displayed user interfaces. The management component 108 can be configured to generate, display, and control access to the respective user interfaces and manage user roles assigned to the respective users.

In some embodiments, the audience portal 132 can be maintained as a publicly available online portal and/or web page(s). In further embodiments the event portal 110 and the event sponsorship portal 120 can be maintained similarly. In yet other embodiments, access to the event portal and/or sponsorship portal can be gated by pre-qualification and/or validation of users seeking to access or register with the event portal 110 and/or the event sponsorship portal 120. In some examples, the system can require referrals before registering a user, and/or giving access to the event organizer portal and/or sponsorship portal.

According to some embodiments, the system can include an execution component 110 configured to control the operation and/or broadcast of an online and/or a hybrid event. In various embodiments, the execution component 110 can monitor and/or control a broadcast of an event. In some examples, the execution component includes broadcast applications and secured communication controls to limit receipt of an event broadcast to validated ticket holders. In further example, the execution component can include recording functionality and provide options for event organizers, sponsors, etc., to rebroadcast recorded events.

In some embodiments, the execution component can include video capture and/or broadcast devices local to various venues (e.g., venue 1 (180), venue 2 (182), of FIG. 1—where " . . . " at 184 indicates any number of additional venues). In one example, the execution component can establish secured connections to local devices for verification and validation, as well as for broadcasting a live event. The execution component 110 can also be configured to control online venues (e.g., 190, 192, and additional venues show by " . . . " at 194), distribution, and/or access to content made available via online sources.

According to other aspects, the event management system also provides unique integration of promotion services and functions associated with organizing and launching a successful event. In some embodiments, the event management system includes an ambassador platform 152. The ambassador platform is configured to seamlessly integrate event promotion, event marketing, and/or event advertising strategies that make events successful. In some embodiments, the system and/or ambassador platform 152 can be configured to automatically integrate a number of functions into existing or new events as they are created to support all event promotion activities, including those prior to event announcement, during event execution, and even post-event.

According to one embodiment, the system includes a team management component 154 that is configured to match a team of ambassadors to an existing or new event. The team of ambassadors is uniquely suited to deliver on the ground and/or grass roots promotion for a given event. For example, users on the system who have participated in similar events are selected as potential team candidates. Users who have engaged in ambassador activities in the past can also be prioritized in candidate selection. Once selected, and confirmed by respective users, the candidates are assigned to an ambassador team. These users literally become ambassadors to the world (or their zone of influence zone) for a respective event. In some embodiments, event frameworks can be implemented by the system to pre-define rewards or point systems that can be used to incentivize ambassador behavior. Thus, in some examples, the system can create a promotional campaign for an event with little or even no input by an event organizer.

Even before an event is announced, the system can implement ambassador functions, including creation and implementation of pre-event registration. According to some embodiments, the system and/or ambassador platform can be configured to enable operations that targets fans as well as the services, operations, and functions specific to ambassadors (discussed in greater detail below). In further embodiments, the system and/or ambassador platform can include additional subsystems or components (e.g., a fan platform) that manages system functions associated with event participants as fans. In some examples, the system can define specific user roles for "fans" and "ambassadors," which roles can be shared, and need not be exclusive. Some differences in the roles and operations include that ambassadors may require vetting and approval (e.g., validated registration) prior to participation as an ambassador, whereas users can become "fans" and be assigned the user role for a fan simply by registering for an event.

In one example, a fan user can also be incentivized to register new users, refer members of their social networks, posts event teasers on their social media feeds, etc., via reward point offers or direct awards defined as part of a rewards program. The point or award can include free tickets to events, priority seating in a physical venue, free access to an online broadcast of the event, among other options. For example, a fan can earn points by linking respective social media sites and their networks to various events. Linking can include granting access to the respective social media accounts, networks, and connections. In further example, posts to social media platforms (e.g., FACEBOOK, SPOTIFY, etc.) can earn points for the ambassador.

In some embodiments, the team management component 154 can operate in conjunction with and/or communicate with a tracking component 156 to track all promotion activity and provide attribution to an ambassador and/or fan as a source of a promotion activity or event. For example, the tracking component can link ambassadors to various social platforms and track posts, comments, and/or other activity that promote or are linked to a respective event managed by the system. Based on the rewards defined, the ambassador can be credited points and the points can be redeemed for various incentives. For example, points can be redeemed for tickets or merchandise. In some examples, points can be traded on the system to secure better awards or as an inducement to trade a better seat assignment, etc.

In other examples, user devices can be registered to specific users and action taken on those devices can be traced by the tracking component to award point and/or assign awards. In one embodiment, physical advertisements, flyers, cards, etc. can be imaged by a user device to link and downstream activity to a respective user/ambassador. Such images can also be used to validate or prove goal completion. In other embodiments, unique identifiers can be included on physical promotion material, linking actions taken to respective ambassadors. The tracking component 156 can be configured to link any such downstream activity and provide awards or points accordingly.

In further example, the system can also leverage tags or metadata associated with online activity. According to one embodiment, GPS information (e.g., GPS coordinates) can be used by the system to track and/or identify common activity. GPS information can also be used as a source of validation information to ensure that reward program activities are being properly completed.

In further embodiments, the ambassador platform can also include a social integration component 158 configured to capture social media activity of respective users/ambassadors. In various embodiments, ambassadors' networks can be polled, crawled, and/or queried to identify promotional activity of respective users and such information communicated to the tracking component.

In other embodiments, the social activity of respective ambassadors can be used to identify social networks of the ambassadors and identify candidates for targeting promotional activity. In various embodiments, the social integration component 158 can be configured to identify connections with similar tastes, habits, and/or comments, as the ambassador. According to some embodiments, the social integration component 158 can automatically build targeted invitations for those network connections, and provide targeted incentives to the ambassadors for communicating them to their networks. Additional points can be awarded for new user registration, ticket purchases, merchandize purchases, etc., for such referred participants. Likewise, the new registrations can then be used to leverage their networks and connections, enabling deep penetration into user bases unreachable by many conventional approaches. The fanning out approach implemented by the system can start with event participants (e.g., possibly fans) who become ambassadors, linking in their networks as further event participants, who likewise become ambassadors driving further social network integration. In various embodiments, the result is nearly exponential growth in audience development. A facet of this development and growth of a user base leveraged by the system is that various event networks develop by integrating participant networks and the participants themselves represent targeted groups of potential participants having (for the most part) similar tastes and preferences. The system can develop and maintain participant networks and connection networks based on specific events, and the system and/or ambassador platform is configured to leverage those networks when seeking to promote new events with similar characteristics or even to expand promotion options for existing events.

In various embodiments, the system can leverage opportunities to fan out distribution across the entire user base (e.g., ambassadors and/or fans, among other options), providing a unique an expansive source of audience information significantly expands on various conventional options.

In further embodiments, various social media platforms can also be queried to identify posts associated with an event, event venue, event talent, etc. GPS information can also be used and/or captured to improve targeting or matching with an event, venue, talent, etc. Where the source is independent, the system can invite the source to participate or even offer awards for further participation.

According to some embodiments, an automation component 160 can be included in the ambassador platform. The automation component 160 can be configured to automatically develop promotion functionality for a new or existing event. For example, the automation component 160 can be configured to analyze a new or existing event to identify similarity between the new or existing event and previous events. Similarity can be based on event style, talent in the event, headliner act, opening act, performance category, genre, etc. Similarity determinations can be based on or include venue, location, tour information, age targets, audience demographic, prior shows for the same event, etc.

Once similarity is determined, the automation component 160 can be configured to define a promotion program for an event based on options used in the previous events. In some settings, the automation component employs intelligent algorithms to identify similarity between events and/or elements of events. For example, intelligent algorithms can be trained on data captured for prior event execution to yield classifications of similar events. The classifications can then be used to select prior events and promotion-based functions and implementation. In further embodiments, the intelligent algorithms can determine similarity in various elements of an event (e.g., audience rather than genre) and select promotion functions and implementation based on the audience similarity. For example, the system can use the learning algorithms to select an ambassador team that is better tailored to an event location.

According to other embodiments, a promotion framework can define a set of options and functions that can be used as part of an event. The system can compare current event definition against the promotion framework to identify options that have not been set up. The system can recommend implementation for any deficiency. In some examples, the system is configured to determine a projected impact associated with various promotion options to facilitate selection. In further examples, the system can include a number of promotion frameworks, where respective frameworks are tailored to respective events, event genre, music, music genre, headliner talent, venue, location, among other options. In some examples, the promotion framework can specify default or baseline options to use, which can include a viral marketing strategy employing an ambassador team, pre-registration website(s) (e.g., wherein a default website design integrates event defined information, etc.), reward program(s) for the pre-registrants (e.g., fans), reward program(s) for the ambassadors, tailored and custom branded mobile applications for fans, ambassadors, etc., which can be deployable in one, two, three, or four selections in a user interface, tailored and custom branded mobile applications generated by a sequence of wizard screens, etc. Theses baseline or default operations are often overlooked or not employed in conventional system because of complexity and/or integration challenges.

According to further embodiments, specific promotion implementation can be selectively tailored to a headliner group for an event, while having a different suite of promotions and/or ambassador teams for an opening act. In some embodiments, the automation component 160 can present promotion options (e.g., enable ambassador team(s), enable incentive program and rewards, flyer campaign, pre-registration campaign, street marketing, etc.) as options in a user interface, where, for example, an event organizer can simply select between enable and disable to engage the respective promotion function. (See FIG. 15). In various embodiments, the system can present ranked options (e.g., multiple promotion teams, multiple reward programs, multiple street marketing campaigns, etc., drawn from historical approaches and/or promotion templates) for user selection. In further embodiment, the system can display a projection on event impact for each selection, which can project and display an impact on event participation, event revenue, merchandising, etc., based on selection of enable or disable for such options. In some examples, selection of various options can trigger recalculation of impact on subsequent selections, dynamically changing the impact values and ordering of the options in the user interface.

In further embodiment, the system and/or platform can include a targeting component 162 configured to analyze event data and generate groupings or users, participants, network connection, etc. In some embodiments, the respective groupings can be used by the system to target communication, target promotion material, update promotion activity, report on promotion incentives and/or game participation, among other options. The targeting component 162 is configured to provide unique insight into the target groups and is configured to improve communication efficiency of the system based on improved targeting. For example, the system is able to reach the same number of people while limiting communication of messages that would be required by various conventional systems.

According to another aspect, event management operations do not cease once an event takes place. Various embodiments include a post-event component 164 configured to manage post-event activity. For example, the system can enable event organizers and/or venue operators to continue to offer merchandize for a completed event. Typically, conventional approaches limit merchandising to an event and thus fail to leverage post-event promotions. Various embodiments of the system provide functionality to continue merchandising and sales. In further embodiments, the system can also deliver these functions to restricted populations (e.g., event participant, participant connected users, referrals, etc.) thus preserving future merchandising opportunities for event tours or events having multiple instances while enabling additional merchandising and thus new revenue. In further embodiments, this can include post-event ticket sales for re-broadcast of any recorded event. In some examples, additional merchandizing opportunities are enabled by integration of virtual marketplaces into the re-broadcast of prior events. Thus, various embodiments of the system support ongoing and/or on demand access to prior event all while integration merchandizing system and functions in to the on-demand requests.

In various embodiment, the functions and components described above can be combined with other components and the described functions can be executed by any one or more or any combination of the components above. In further embodiments, the system need not instantiate additional components but can execute the described functionality directly.

Figure 2:
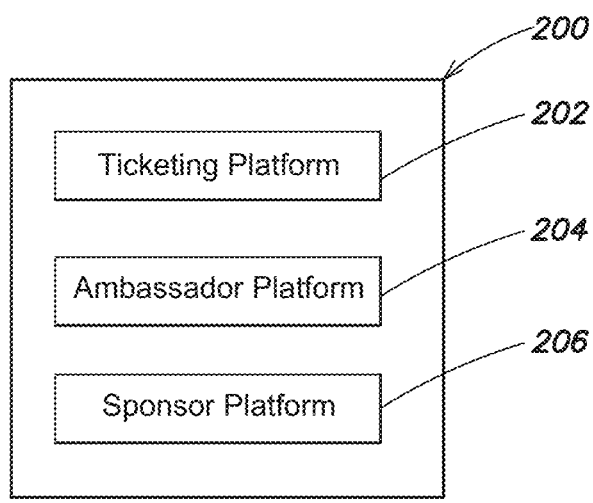
FIG. 2 is a block diagram of an event management system, according to one embodiment.

FIG. 2 is a block diagram of an example event management system 200 that can include a ticketing platform 202, an ambassador platform 204, and a sponsor platform 206. The functions of the ticketing platform and ambassador platform include those described above. In addition, the system can include the sponsor platform configured to manage sponsor selection and participation in event execution. In various embodiments, the sponsor platform is configured to register potential event sponsors, provide options for searching and selecting events to sponsor, and defining options for participating in events. In some embodiment, the system provides a unique platform for communication between event organizers, venue operations, and/or event sponsors. In some examples, participants (e.g., venue managers, sponsors, event organizers, etc.) can define the criteria under which other parties may participate, and the system presents options to agree or not to specified terms. In other examples, the system presents a communication interface through which participation terms can be defined and agreed.

As part of the sponsor suite of functions, the sponsor platform can present user interfaces to accept sponsor definitions of their criteria for participating in an event. The system can evaluate event opportunities automatically and present matching options to the sponsor. In some examples, matching may be partial, and the system can be configured to display sponsor options ranked by a degree of matching the sponsor's criteria. In other examples, sponsors can define importance or weighting on their criteria so that partial matches will be ordered and/or displayed based on the weighting defined by the respective sponsor.

Figure 3A:
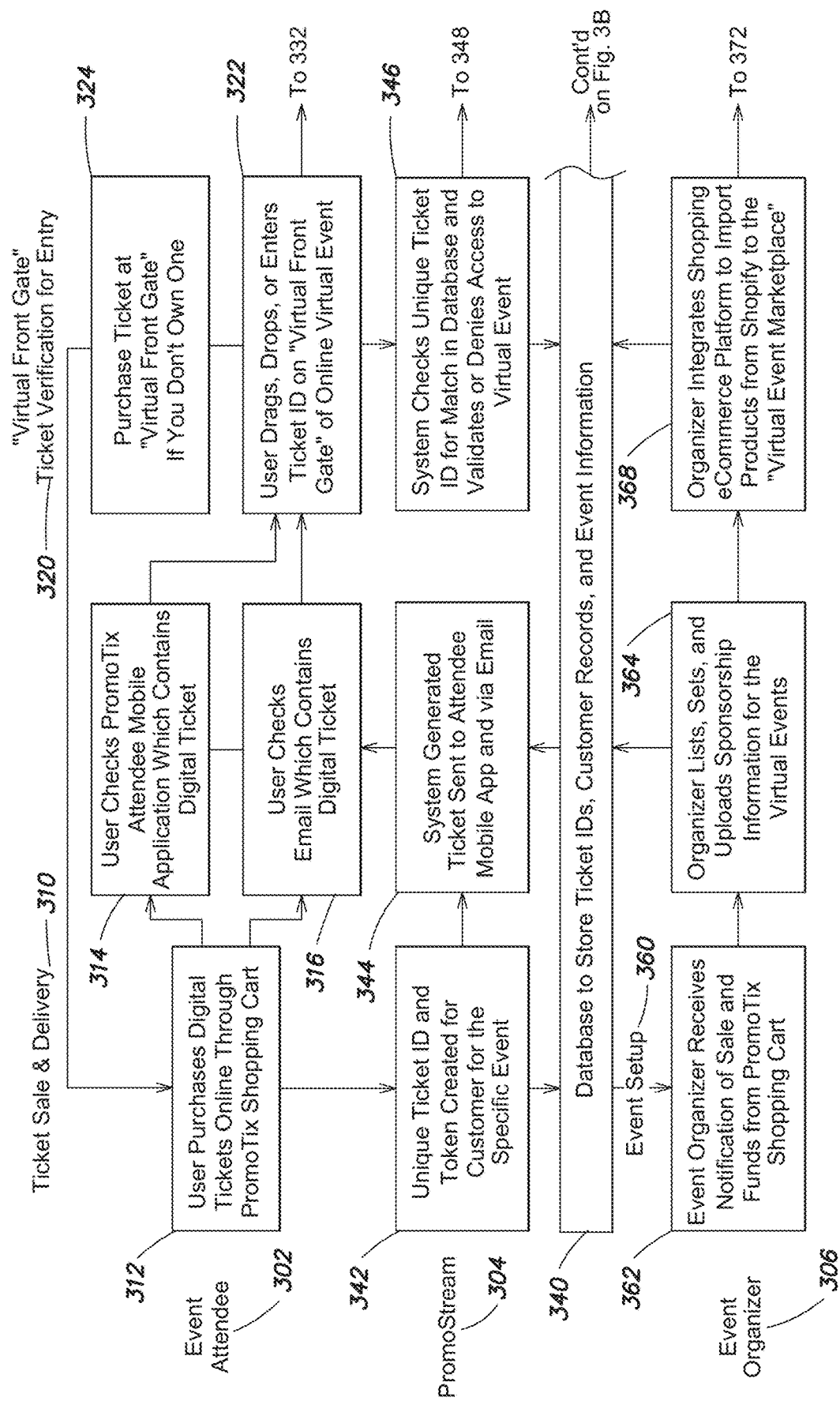
FIGS. 3A-B are a block diagram of an event management system, according to one embodiment.
Figure 3B:
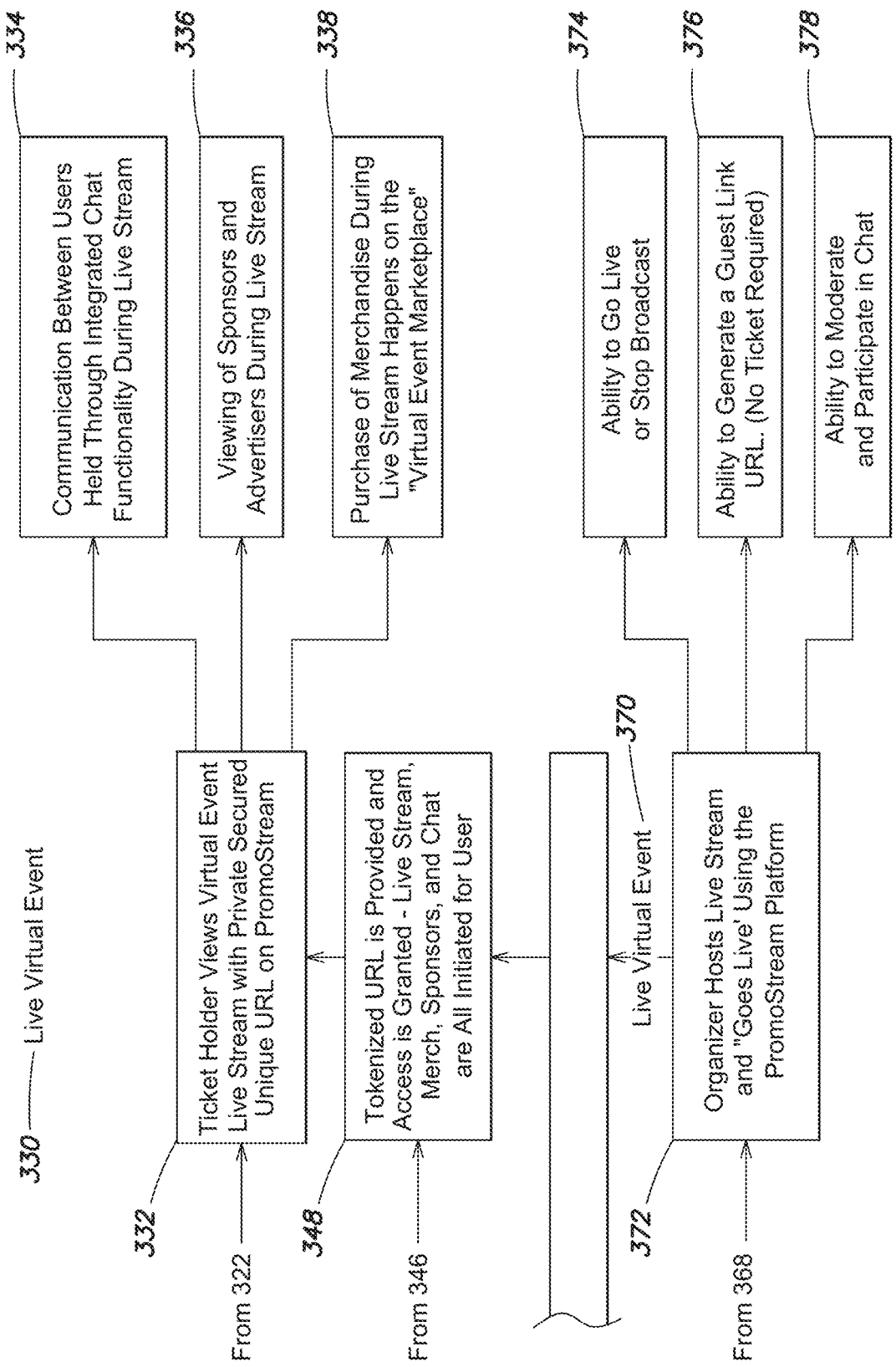

FIG. 3 is an example embodiment of an event management system and process flow executed by the system. As shown, an event attendee 302 can access the PromoStream system 304. The PromoStream system 304 is an example embodiment and/or component of an event management system and can incorporate any of the functions, features, components, and/or details described in association with the event management systems described herein. In some embodiments, the details discussed with respect to a PromoStream system can also be implemented in any embodiment of an event management system. Various PromoStream embodiments can include processes, operations, and/or functions for streaming a live event online, alone or in combination with an in-person event. The PromoStream system can also include functions for event access, ticket validation, and management, among other options. As shown, an event attendee 302 can access the PromoStream system 304 to use ticket sale and delivery functions at 310. For example, users can purchase digital tickets online through a PromoTix shopping cart at 312. The reference to PromoTix describes a component of an event management system and can include functionality associated with any event management system and/or any ticketing platform as described herein. The examples and details described with respect to PromoTix functions and features can also be implemented by any event management system and/or any ticketing platform as described herein. Once a user has purchased ticket(s) at 312, the user can check the PromoTix system to verify receipt of a purchased ticket at 314. In some embodiments the PromoTix system can include mobile applications that are downloaded or installed on a user device. In some examples the mobile app can be used to access ticket sale and delivery functions on the system. For users without an application or for users who opt for email delivery, users can check their email which will contain their digital ticket at 316. In some embodiment, the system is configured to use multiple delivery channels to ensure ticket delivery.

When an event is about to take place, ticketed participants/users are able to go to a "virtual front gate" for the event to access the event at 320. The virtual front gate can be presented in user interfaces that are accessible online. In some examples, if the user does not have a ticket the user is given the opportunity to purchase one at the virtual front gate at 324. If the user has already obtained a ticket, the user can drag and drop the electronic ticket on the virtual front gate (e.g., 322) representation in the user interface thereby giving access to a live virtual event (e.g. 330).

When accessing a live virtual event 330, any ticketholder is able to view the virtual event live stream using a private and securely unique URL linked to their digital ticket by the PromoStream system 304. As part of the live virtual event interface, ticketed users are given access to communication systems that connect the various live streams of the event participants at 334. In some examples, this can be provided through user interface displays of the live virtual event and in other examples can be made accessible in a respective mobile application on a ticketed user's device. During the live stream, sponsors and advertising can be displayed as part of the event broadcast at 336. According to some embodiments, ticketed participants may also access and purchase merchandise during the live stream by accessing a virtual event marketplace made accessible in an online interface and/or mobile application at 338.

As shown in FIG. 3, the PromoStream system 304 is configured to support the user operations described above and save relevant data in database 340. For example, at 342 the PromoStream system creates a unique ticket ID responsive to a user purchase, the unique ticket ID can be linked to the customer and the specific event. At 344, a system generated token is sent to the user/attendee via a mobile application and/or email. The user's information and the ticket ID and any other associated information can be stored in the database 340. During redemption, the PromoStream system 304 checks the unique ticket ID and confirms a valid match in the database to validate or deny access to a virtual event at 346. In some embodiments, the PromoStream system 304 is configured to update the unique identifiers associated with distributed tickets such that the unique ID associated with the ticket upon distribution will change prior to redemption, and must match the updated information on both systems in order to permit access (e.g., at 346). If there is a match, a tokenized URL is communicated to the attendee and access is granted to the live stream of the event at 348. The access grant can also include access to sponsors, merchandise, a virtual event marketplace, and/or chat functionality. Similar to ticket sales, the information produced and exchanged as part of the ticket purchase and access control can be stored in a database 340.

According to some embodiments, event organizers 306 can also access the PromoStream system 304. For example, the event organizer 306 can access an event set up subsystem 362 create and manage an event. Once the event organizer 306 has set up an event, ticketing services are automatically provided. For example, once a user purchases a ticket to the event the event organizer receives a notification regarding sale and receives the funds from the sale via the PromoStream system at 362. As part of an event set up, the event organizer 306 can list, establish, and/or upload sponsorship information for the event at 364. In other embodiments, sponsors can access the PromoStream system 304 and request participation in an event.

In further embodiments, an event organizer 306 can use the PromoStream system to integrate shopping and e-commerce services which can include integration of SHOPIFY products into a virtual event marketplace at 368. Other e-commerce platforms and/or services can also be integrated. As part of execution of the live virtual event (e.g., 370), the event organizer is given management responsibility which can include triggering the live stream of the virtual event and/or hosting the live stream of the virtual event at 372. In some examples, the PromoStream system 304 includes a streaming service or platform (e.g. provided by PromoStream system) that can be activated at the start of a live virtual event. The reference to PromoStream should be understood to be a name for the system element(s) and/or functions that encompass and/or corresponds to the various components described herein that manage event execution and/or provide functionality to stream or broadcast an event, including a live event. Such streaming and/or broadcasting can take place as part of an online event or an in-person event having an online component, among other options, including pre-corded or on-demand.

As the event organizer, the system provides functionality to either start or stop a broadcast of a live event at 374, the ability to generate a guest link URL that provides access to the live event without requiring ticket purchase at 376, and also provides the ability to moderate and participate in any communication sessions enabled as part of the live event at 378, among other options.

Various embodiments can implement the system elements and process flow described in FIG. 3, however other embodiments may include different elements, fewer elements, and/or combine various process flows into fewer steps or breakout the various process flows into a larger number of steps.

Event Management System Implementation Examples

In some embodiments, the system includes a live video streaming platform which uses ticketing to control unique attendance to the live stream and creates a virtual venue which displays on the same screen. In some examples, the system manages event merchandise sales and e-commerce, live communication between attendees and organizers, sponsors and advertising, and the live streamed event broadcast. For example, the system can execute this functionality through various system components (e.g., a management component 108, FIG. 1, an execution component 110, FIG. 1, ambassador platform 152, and/or ticketing platform 102, among other options).

According to some embodiments, the system is configured to automatically host recordings of previously live virtual streamed broadcasted events and further enables event organizers to continue to monetize those previous streams as ticketed video on-demand content in the future. In further embodiments, the system hosts an internal ambassador program ("AP") module with ambassador members coming from previous ticket or account holders of other events held on the platform. Various functions and implementation discussed with respect to the ambassador platform may also be implemented in an AP module and vice versa.

In some examples, the AP module is configured to enable ambassadors to send email ticket reminders to potential customers. The e-mail can be automatically generated and sent on behalf of ambassador users. In some examples, the system can generate the e-mail automatically and wait for ambassador input before communicating.

In further examples, the system can link online activity of ambassadors to a venue or event and make the online activity available across various platforms and/or system components. For example, the system enables organizers to view direct links of social media posts posted by their ambassadors. Tracking of the same can be used to generate rewards or points by the system.

In further embodiments, the system is configured to organize and monetize merchandise goods seamlessly through multiple channels including, for example, at a shopping cart when customers purchase tickets, through brand ambassadors promoting the events, and during live video feed broadcasts of virtual/online events, among other options.

According to some embodiments, the system is configured to collect data from ticket holders on their listening habits of music and organize and display that data for consumption by event organizers. The captured data enables event organizers to make better artist booking decisions, for example, based on selection the artists that their ticket buyers and potential ticket buyers are listening to. In one embodiment, the system is configured to create customized audiences based on targeted preferences of potential ticket buyers (e.g., that uses previous global event ticket holder or event registration data, creates advertisements, and uploads both the ads and audiences in order to automatically launch advertising on third party platforms such as Facebook, Instagram, Twitter, Adroll, YouTube, and via other means such as SMS text, or via email). For example, an event organizer can use custom audience target to improve or even create an event.

In other embodiments, the system can also include a security component that issues or offers a secured ticket type, which cannot be reproduced, cannot be subject to fraud, or resold. These secured tickets are created and maintained by dynamically changing a digital barcode (e.g., every 30 seconds, day, week, or updated at least once prior to redemption), essentially delivering new unique Ticket IDs to the customers. In some examples, the unique tickets can be delivered to a customer's mobile application on a linked and registered device. Registration and linking of a device and/or application enables validation of ticket delivery, as well as secure updating of the ticketing information to improve security over conventional system. Similarly, each ticket and associated information can be stored in a PromoTix (an example event management system/component) database for verification on a periodic, aperiodic, continuous, etc., basis.

In other embodiments, the system can also include an analytics component to automatically and consistently analyze how well an event is selling and being marketed, and that is configured to make suggestions for new marketing tactics or channels for additional sales opportunities to the event organizer. In some examples, the system builds intelligent models by training intelligent algorithms on prior event data. The intelligent algorithms can then determine similarity matches between a current event and prior executions, and use the similarity to identify promotion options previously used. In further example, the system can use machine learning to identify which promotion options are best suited to a current event based on training on the prior event data, and use the machine leaning output to either suggest or implement those options.

Additionally, the analytic component can be configured to identify new potential ticket buyers and create new audiences for advertising and marketing outreach automatically, which may optionally include automatic suggestions to the event organizer audiences to launch new ads for delivery. The analytic component can include any of the functions, processes, and operations discussed above with respect to analysis executed by an event management platform or component. Similarly, the details described with respect to an analytic component can be implemented on an event management system and/or components. In various embodiments, the analytic component can also include machine learning functions.

For example, the system can further comprise an AI component configured to recognize key event indicators (e.g., such as whether tickets are on sale or not, if the event is about to sell out or not, if the event is approaching soon, if key promotional tools within the software are not being utilized yet, etc.). In some examples, the AI component is configured to automatically guide the event organizer by suggesting what steps they should take next to improve the sales and promotion of their event leading to its success.

In further embodiments, the system is configured to enable pre-registration for potential attendees (e.g., fans) that allows event organizers to provide contests and rewards to attendees for registering for an event, and for providing referrals for others to register for the event. In some examples, this approach includes a point-based system for incentivizing performance. The platform may ask the registrant to perform certain tasks such as referrals, following on social media, providing their music preference data, among other options to earn points. The event organizer can use the points as a scoring system to provide the promised rewards or an event organizer can directly provide awards. According to various embodiments, the incentive program(s) are configured, for example, to drive registration, improve event participation, improve event attendance, etc., and each incentive program can be tailored to one or more goals defined by an event organizer or suggested by the system.

According to some embodiments, the analytic component is configured to accept user specified geographic constraints to identify potential targets and match associated preferences. For example, the system enables research ahead of time within a geographic area to see how many potential ticket buyers exist in the system in that area, and whom also match the preferences set by the event organizer such as: listening to an artist on music platforms such as Spotify, Pandora, Amazon Music, or Apple Music. It also allows psychographics targeted from social media platforms such as pages or topics liked on Facebook or other places on the internet, and demographics such as gender, age, and income. The inventors are not aware of any other ticketing platform that allows users to see a potential audience for the event being contemplated ahead of time. In various embodiments, the system can identify a potential audience and display the candidate users, their connections, etc. that would make up the potential audience for the future event.

According to various embodiments, the ambassador program module can be configured to enable ambassadors to sell digital tickets or merchandise in the same shopping cart from a ticketing platform in person. To facilitate this functionality, the system enables ambassadors to have their credit cards linked to their account. For example, when an ambassador sells a ticket or merchandise for cash to a customer, the ambassador keeps the cash, the ambassador's credit card is charged for the ticket(s) and/or merchandise, and an event organizer sends the ticket(s) and/or merchandise to the customer and receives payment from the ambassador. The ambassador can also directly enter the customer's credit card information to sell tickets or merchandise for credit, or can provide an affiliate link to the customer who can then purchase online on their own through the system (e.g., via a hosted PromoTix shopping cart or merchandise checkout page).

Figure 4:
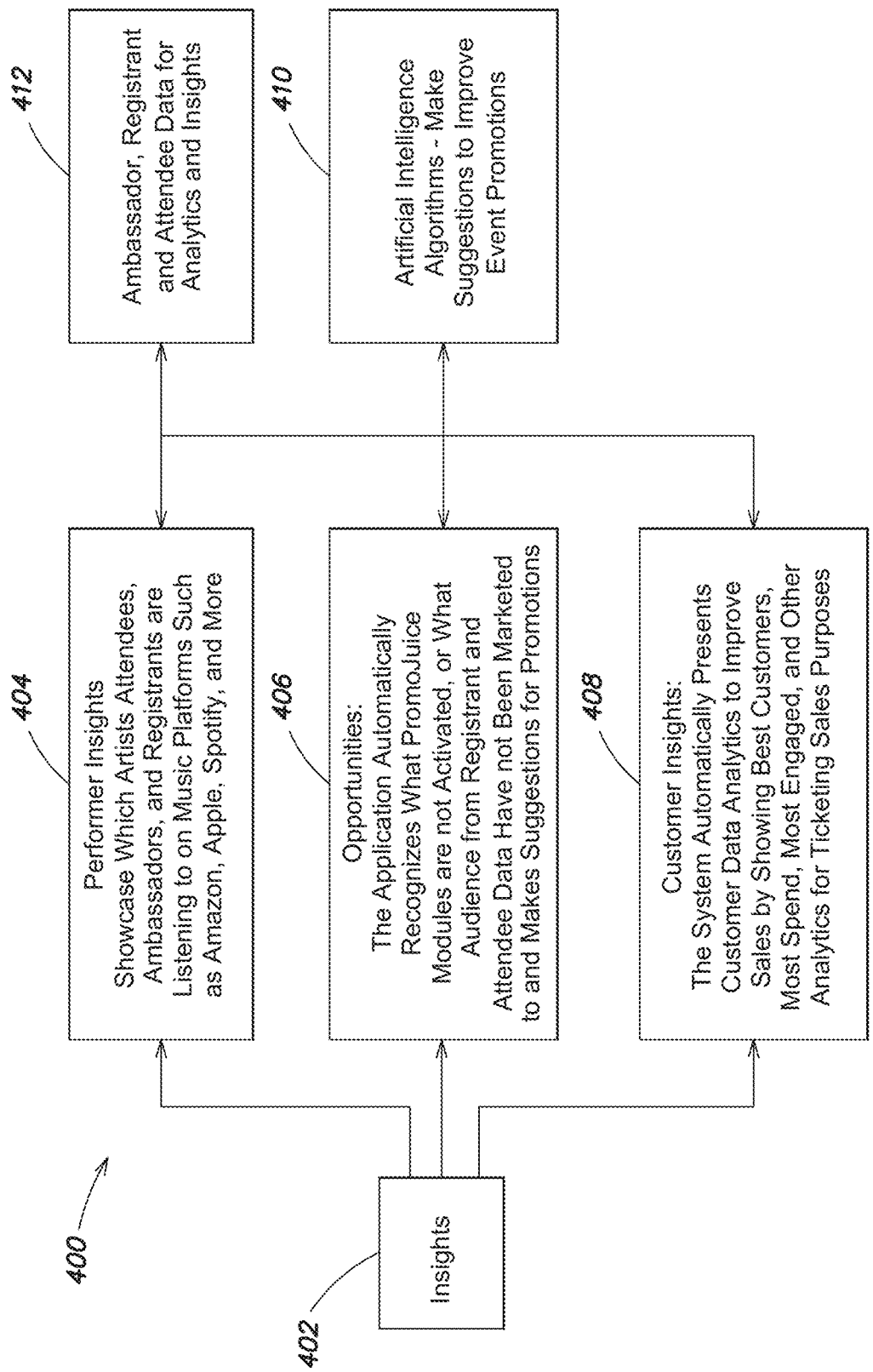
FIG. 4 is an example process flow for generating insights, according to one embodiment.

FIG. 4 illustrates logic flow 400 that can be executed by the system to build and leverage database data on event participants, users, event execution, and feedback into AI optimizations. For example, the system can generate insights for respective users, for example, at 402, based on analyzing performer information and identifying alignment between users and their listening habits and the respective performers. Customer/performer insights can likewise be developed at 408 detailing the detected alignment or potential alignment for a given performer or event. At 406 the system can identify and display what promotion opportunities are available, and for example, have not be enabled. In some embodiments, AI algorithm review new or existing events to determined what options are available and have not been implemented (e.g., at 410). A body of information can be constructed responsive to event execution, user registration, ticket purchasing, social media integration, and/or by analyzing pervious events. In some embodiments, the system can harvest data from ambassadors, registrants, attendees, and use that data as part of insight generation (e.g., 412) and/or training of intelligent algorithms.

Figure 5:
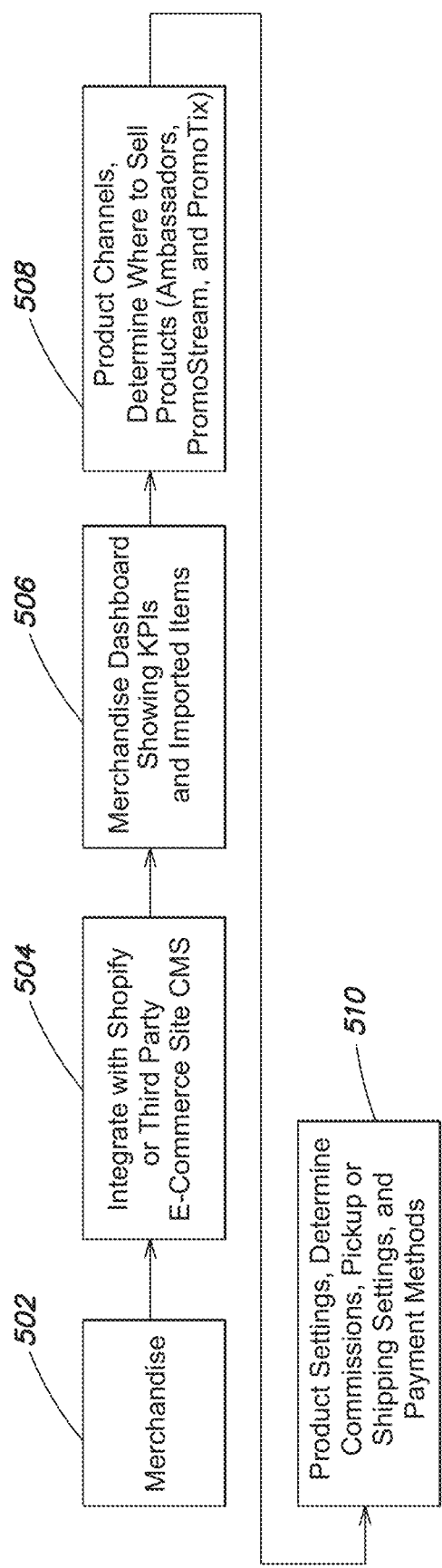
FIG. 5 is an example process flow for integrating merchandising functionality, according to one embodiment.

FIG. 5 illustrates a process flow that can be executed by the system to manage merchandising for an event. At 502, a product line or suite of products can be established as merchandise for sale during an event. According to one embodiment, event creation can include integration with SHOPIFY pages for services. In other embodiments, various third-party e-commerce solutions can be integrated into an event using the system at 504. As part of event management, the system can display in merchandise dashboard that includes key performance indicators ("KPI") and any imported items or imported information at 506. In some embodiments, the system offers options for a number of product channels to determine where to sell specific products. For example, the system can provide an ambassador channel for referring products and/or making products available via an ambassador team. In another example, the PromoStream system itself may offer another channel for delivery and/or sales of merchandise, and in another channel the PromoTix component can provide sales and distribution options at 508. In various embodiments, the event organizer can also control specific product settings associated with commissions, pick up or shipping settings, as well as defining valid payment methods at 510.

In various environments, an event management system can include external platform integration and/or APIs that enable the system to capture information on any social media platform (whatever that may be) to track social media posts, likes, comments, and other social media activity (e.g., playlist creation, favorite songs, video, youtube, tik toks, etc.). For ambassadors any such activity can be tracked and attributed.

In various embodiments any ambassador activity can be tracked and attributed, including for example, how many flyers for your event have been generated and/or distributed. The platform can be configured to take such event promotion activity steps even further. In some embodiments, the system includes a base ambassador network that is pre-configured for each event, and can be implemented ahead of time on the event management system/platform. According to one embodiment, the system maintains a promotion framework with default functions and actions. For example, the promotion framework is built into platform so that the ticketing operations and functionality is seamlessly integrated into a promotion platform that links the ticketing systems and promotions systems. In various examples, the platform provides the only system and ticketing platform known to the inventors that does not request other systems or does not request third-party services to provide promotion functionality.

In some examples, the system provides integrated functions to track promotion material (e.g., posters and flyers) with GPS coordinates on a user phone and to track social media hashtag references online (e.g., detect and link online activity via crawlers, searches, and/or robots), and the systems can connect such material with an ambassador and an event or a brand. The promotion platform also includes affiliate link tracking so any event host can know all promotion information and access traditional affiliate link tracking even in external systems. Various embodiments of the system enable tracking not only of the ticket sales associated with the event, but also with specific distributors, specific event ambassadors, outreach, and target communication modalities, etc. In further embodiments, the platform is the only approach known to the inventors that includes a promotion platform integrated with ticketing functionality and that also enables an ambassador network and the tools that connect both the ticketing and the ambassador, affiliate, and promotional program. In further embodiments, the system enables a singular platform that hosts a variety of integrated services and pre-generated frameworks that eliminate the need for other systems and complex interaction logic of various known approaches.

In various embodiments, any one or more or any combination of the following features and sub-features can be implemented as part of an event management system:

1. Event creation by an event organizer—system automatically generates and displays in an event organizer window with pre-generated functionality. For example, the system guides the organizer through generating pre-show registration publicity, including for example, when the organizer wants a preshow registration page, and automatically prompts the organized to build in a reward for incentivizing ambassadors and/or participants. For example, rewards can include points to earn or directly award pre-backstage passes, meetings with the headliner, meetings with the talent, photo ops with the talent, special seating, and/or performance participation (e.g., audient on stage, video or phots ops, etc.), whatever the case may be.
   a. Various implementations automatically prompt the organizer to build these features into their event, which often go overlooked, are poorly implemented, and/or rely too heavily on outside services and invariably lead to underutilization and/or over complex architecture.
2. Automatic ambassador Team—In some embodiments, each event is automatically tied to an ambassador team upon creation of a new event. The ambassador team is automatically chosen by the system to facilitate event promotion and to implement any number of system base event functions.
3. Direct Social Integration—For each ambassador on the team the system automatically provides tracking and updates on ambassador activity. For example, user login can be used to identify ambassadors and activity. In other embodiments, the system registers user devices that can be associated with each ambassador. In such manner, the system can trace ambassador activity simply by identifying the device that provides information to the system. In further embodiments, the system is configured to manage all such promotional activity according to device and/or ambassador such that an originating activity is able to be traced and travel along with each additional interaction. For example, the system can trace and/or follow activity through social posts, various social media feeds, on a user's social panels, among other options.
4. Ticket Security—in some embodiments, tickets can be secured with dynamic encoding. In further embodiments, ticket sales and/or exchanges can include blockchain operations, signatures, and/or transactions, and blockchain validation can be used to ensure a ticket is being redeemed by a valid purchaser.
5. Manage Social Activity and Information—various system embodiments leverage the data tracking and integration to enable additional invitation and registrations allowing any activities performed for an event to fan out into various social connections and also enabling direct invitation for a user's network of friends. In some examples, having established such connections awards and rewards can be definitively traced back to a source actor or ambassador earning more points and/or rewards. These approaches can be implemented by the system in the context of fan operations and a fan platform and may also be performed by ambassadors.
6. User Interface Visualization of Connections and Awards—In some embodiments, the system generates and displays network-based screen showing originating actions and the resultant actions or activities that earn each user points or awards. Thus, not only can the system optimize and leverage users who have far reaching influence, the influencer can see what activities they have done that have the most value.
7. Registration Cascade—In some examples, the influence of originating actions incentivizes users to earn more points/rewards, and each of those users looks for the same opportunity triggering exponential growth as everybody's trying to earn points or rewards and ultimately any grand prize. According to some embodiments, the result is far greater penetration of registrations based on fewer computational resources, and fewer systems involved over conventional approaches. Further, experimental execution yields much greater increase in the number of registrations over any standard registration page approach.
8. Automatic Event Registration Page/Platform—in various examples, the system automatically builds a registration page for the organizer and in further examples, automatically selects and implements a reward approach for event ambassadors. Thus, various embodiments build out a promotion platform and associated functionality without even requiring organizer input.
9. Event Action Database—Further embodiments integrate the rewards program(s) with event-based actions that leverage a vast collection of ambassador information, connections and social platforms. Event based action can occur before an event takes place, during, and/or after an event. Communication and targeted delivery in event organization has traditionally been limited to the ticket holders and potential ticketholders in such settings. With various embodiments of the system, the ambassador platform creates a far great communication channel with interested parties. This results in improved targeting opportunities and permits optimized identification of communication targets to event organizers and/or event brokers.
10. Sponsor Platform—In some embodiments, the system is configured to automatically generate a sponsor platform to implement sponsor functionality for any event. In other embodiments, an event organizer or other user can access sponsor functionality with an activation visualization in a displayed user interface. In some examples, the system can automatically match sponsors to an event based on historic analysis, prior event modeling (including e.g., intelligent algorithms), and/or system maintained reservations for registered sponsors, among other options.

Various embodiments of the system support combo events that include virtual and in-person ticketing. Further embodiments include an ambassador platform that includes end-to-end systems for implementation of event-based marketing, event tracking, and integration between ticketing and execution management and marketing systems. Further embodiments include system components that are configured to enroll and manage sponsors and/or promote sponsorships. Stated generally users may register as sponsors and the sponsors would be essentially using the same system as the event organizers. In various embodiments, both event organizers and sponsors are able to use the system to parse and sort through the data in order to select audiences for the tickets that they want to sponsor and/or events with the ability to drill into the demographics of the potential audience/participants and their connections. In further examples, the system enables sponsors fine grain control over what aspects of a given event they attach their brand to, and further enable fine grained control over targeting members, groups and/or entire audiences as well as connections and/or social networks linked to those members, groups and/or entire audiences. In various embodiments, the unique ambassador platform and associated functionality enables various embodiments to break the ticketing surcharge stranglehold enjoyed by the primary market movers in the ticketing and management space.

Example implementations of the system include any one or more and any combination of the following features and sub-features:

I) A hybrid ticket management platform
  a. In-person ticketing system plus hybrid remote streaming/ticketing control and management
  b. Automatic functionality for streaming an event to select ticketed participants
  c. Execution services for co-execution of online and in-person events
    i. Automatic cloud resource allocation functions
    ii. Automatic compute resource optimization for audience parameters
    iii. Secured in-person and virtualized ticketing options
  d. Functionality to dynamically transition from in-person to online participation and vice versa with the ability to co-execute in the online and in-person space
  e. Ticketing management to enable participants to dynamically select between in-person event participation and/or online event participation and to dynamically transition between those options II) Complete integration of ambassador-based marketing and of the marketing
  a. Includes, in some examples, the ability to act on system data points and create, automatically, customized audience actions
    i. Similarity between a current event and a prior can be used to capture and present options for similar ambassador functions (e.g., ambassador teams, reward program, etc.)
  b. Includes in other examples, the ability to act on system data points and create, automatically, customized marketing campaigns
    i. which can include automatically generating marketing campaigns for a virtual event,
    ii. which can include automatically generating marketing campaigns for an in-person event,
    iii. which can include automatically generating marketing campaigns for incorporating in-person phases for a virtual event (e.g., go to location for points or award, perform real worlds action for points or reward, etc.),
    iv. which can also include automatically generating marketing campaigns for incorporating virtual/online phases for an in-person event, among other options.

Figure 6A:
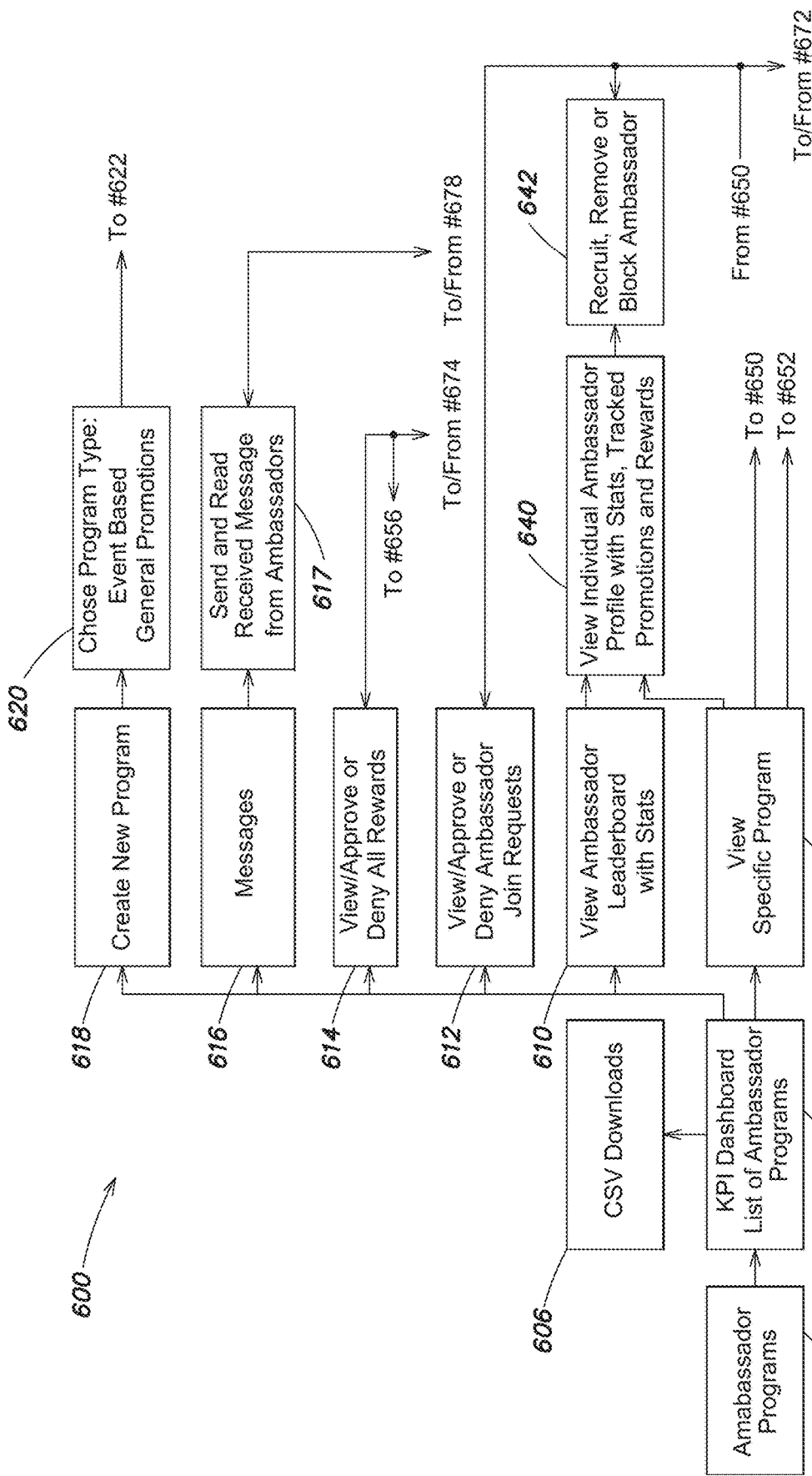
FIGS. 6A-C are an example process flow for enabling ambassador functionality, according to one embodiment.
Figure 6B:
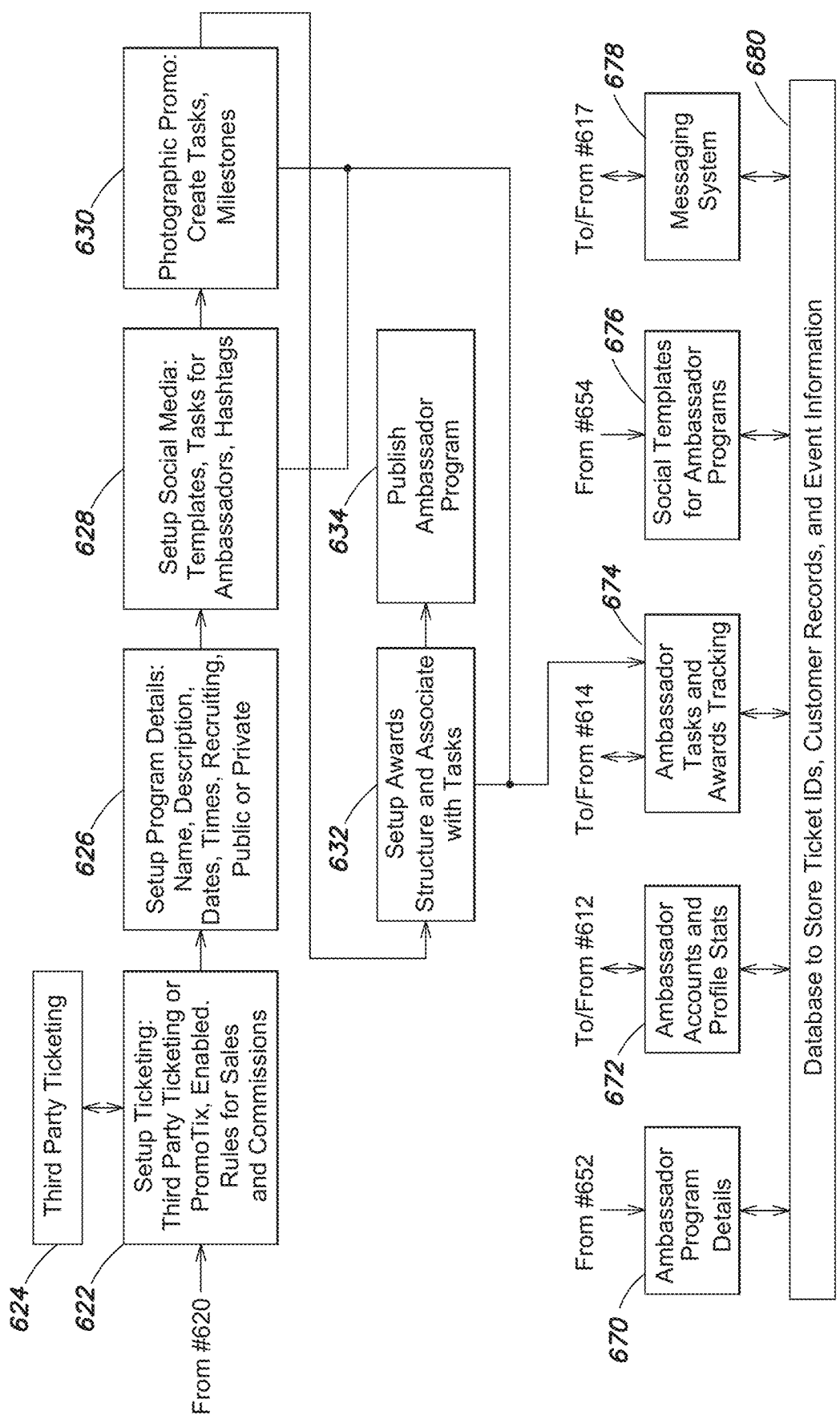
Figure 6C:
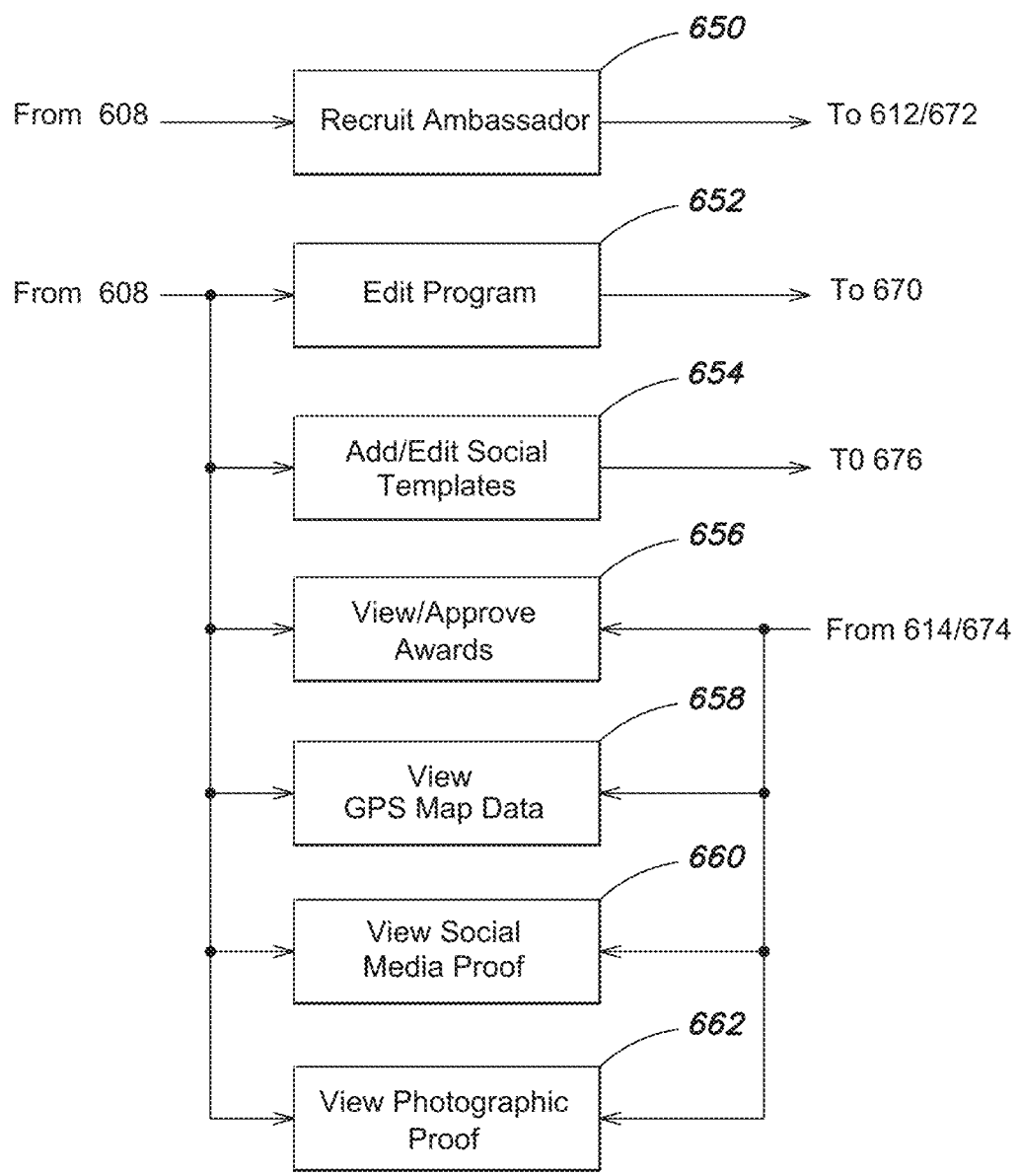

FIG. 6 illustrates a process flow 600 that can be executed by an event management system (e.g., 100, FIG. 1, 200 FIG. 2, etc.). According to some embodiments, process flow 600 can begin at 602 with accessing ambassador programs. In some examples, the user may access the user portal and view ambassador programs on an event management platform. Upon access to the ambassador programs (e.g. at 602), the user can review a list of ambassador programs at 604 or visualize a key performance indicator ("KPI") dashboard. Users may navigate the dashboard or a list of programs to view specific programs at 608. The list of ambassador programs can include active ambassador programs, suggested ambassador programs, and/or pre-generated ambassador programs, among other options.

Once a specific program is selected, the user can access details associated with the specific program. For example, the user can access individual ambassador profiles, status of ambassador teams and/or individual ambassadors, tracked promotions, and associated awards (e.g. at 640). When visualizing information on ambassador teams or individuals the user can recruit additional ambassadors, remove listed ambassadors, or block ambassadors from participating in the user's events (e.g., at 642).

Additional functions that can be accessed when viewing a specific program include recruiting ambassadors at 650, editing an ambassador program at 652 (e.g., changing rewards, goals, requirements, communication channels, among other options). Other functions that can be accessed include accessing, adding, editing social templates at 654 which specify, for example, social media sites of interest, hashtags to query and/or track, among other options.

In some embodiments, awards associated with an ambassador program are listed when accessing a specific program (e.g., at 656). Additional information that can be captured and displayed includes GPS map data at 658, social media proof or validation information (e.g., at 660), and/or photographic proof or validation information at 662. For example, an ambassador program and event goal can specify distribution of promotional flyers. Validation information may require an image of the distribution to earn points.

According to some embodiments, there are additional options to access the same function and/or information by first accessing an ambassador leaderboard at 610, which can include statistics on the leading ambassadors and navigation options for accessing individual ambassador profiles and/or specific programs associated with the leaders.

According to further embodiments, the list of ambassador programs can be used to create an ambassador program to associate with an event and the preceding functions can be used to specify the parameters of a newly created program. Additional functions made available to users include options to view ambassador join requests at 612. For example, the managing user (e.g., event organizer) can approve or deny any join request to allow an ambassador to participate on their ambassador team. In further embodiments, ambassador rewards are displayed as part of a program view. According to some examples, the event organizer is able to approve or deny all rewards for program at 614. In other examples, the system maintains a record of rewards and redemptions of points without requiring approval or denial.

In further embodiments, process 600 can include operations for accessing messages at 616, for example, through a menu listing available ambassador programs (e.g., 604). The process may continue at 617 with the user sending and/or receiving messages from ambassadors in various programs associated with the user. In various embodiments message distribution is controlled via a messaging system (e.g., 678). In various embodiments, process 600 can interact with any number of data storage components and/or any number of database instances. For example, flow 600 illustrates connections between the various steps and/or actions and respective data storage (e.g., ambassador program details at 670, ambassador account and profile information at 672, ambassador tasks and award tracking at 674, and social templates for ambassador programs at 676, among other options). In various embodiments, the data store or database 680 can contain the various data storage components, database instances, or manage access to the same.

In some embodiments, process 600 can include a specific flow for creation of a new ambassador program at 618. As part of creation of a new program, a user can select a program type at 620. For example, a user can select a program type that is event-based or in general promotion. In further examples, other program types can be displayed and selected by a user creating a new program. As part of creating a new program user can set up ticketing parameters at 622. The ticketing parameters can include information on third-party ticketing options, event management system ticketing options, rules for event sales (e.g., by ambassadors, etc.), and any commissions that can be awarded for sales activity, among other options. If a third party ticketing service is made available as an option, the user may specify such information at 624.

According to some embodiments, process 600 can continue at 626 with definition of program details. For example, the user can define a name, description, date(s), times, and recruiting parameters (e.g. public or private among other options). As part of program definition, the user can set up or select social media information at 628.

Figure 15:
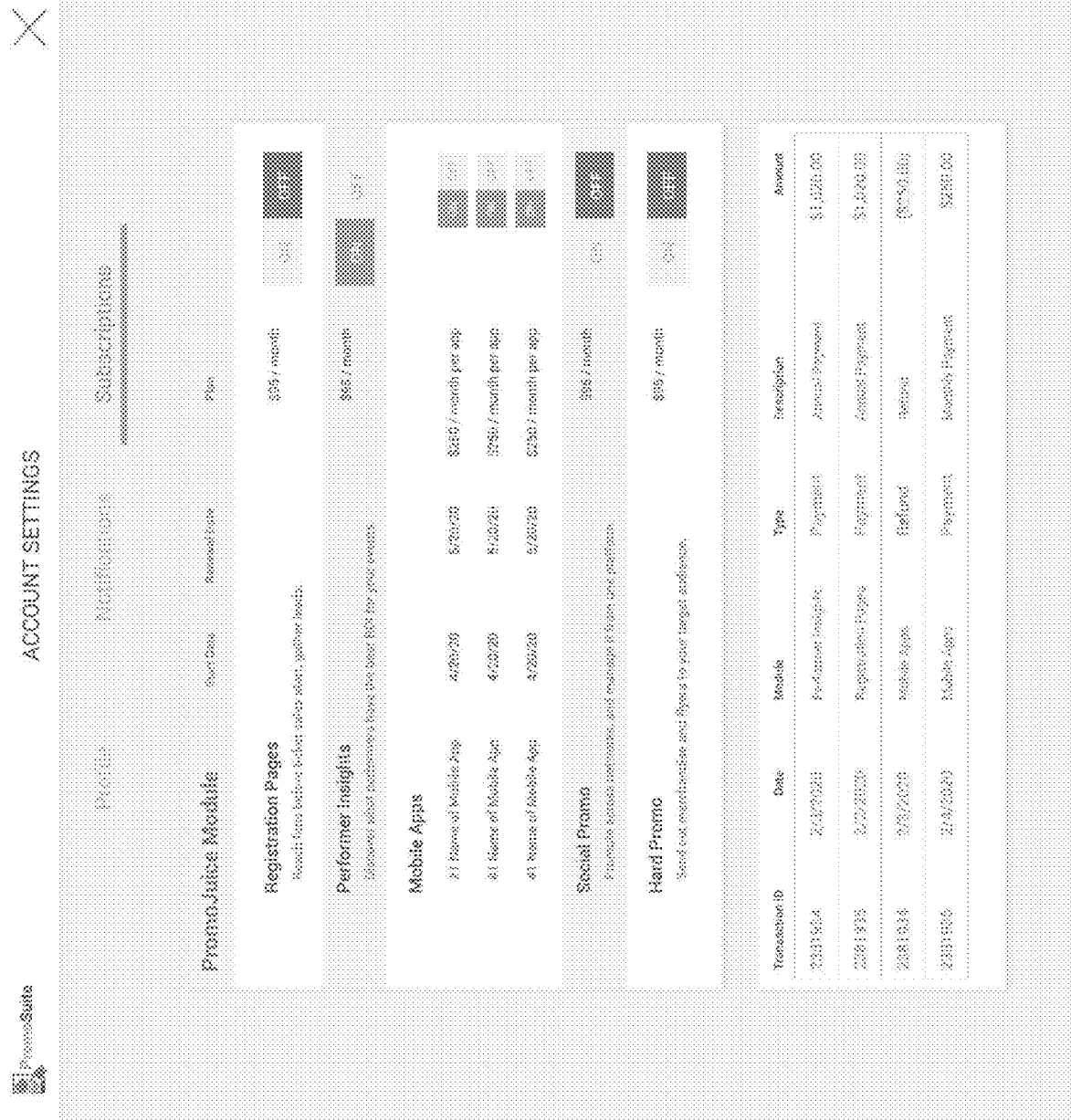
FIGS. 15-31 illustrate example screen captures, according to some embodiments.
Figure 16:
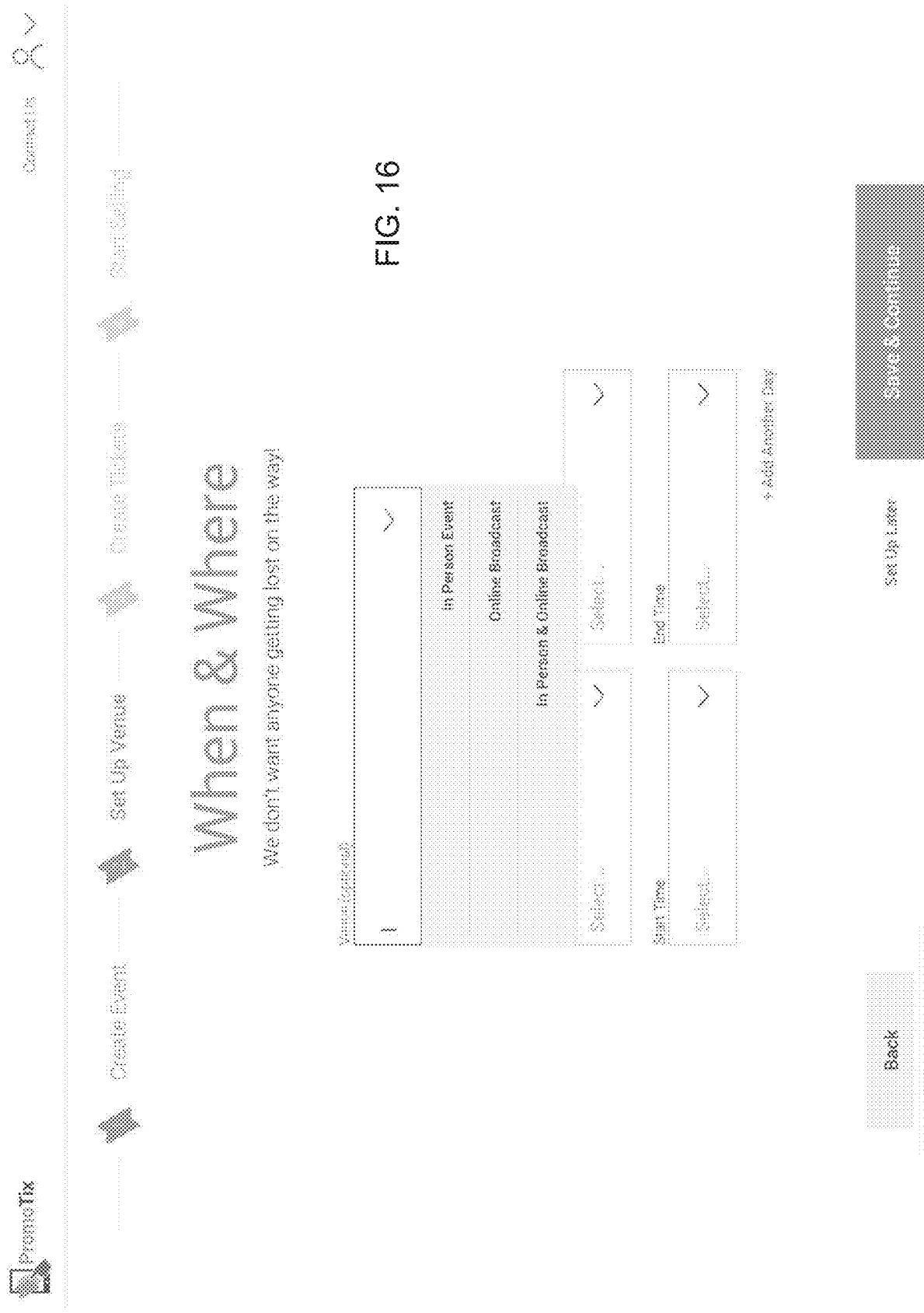
Figure 17:
Figure 18:
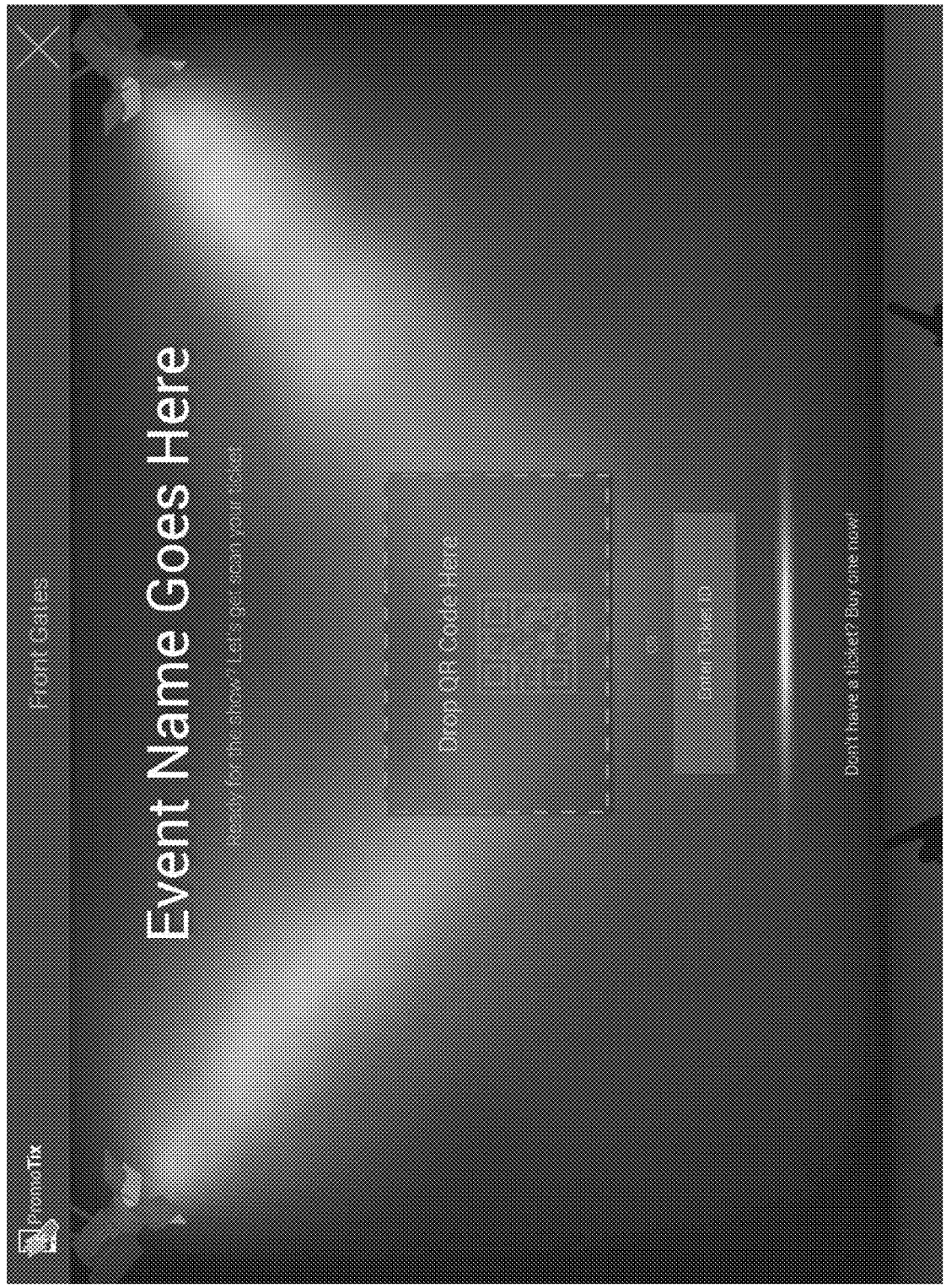
Figure 19:
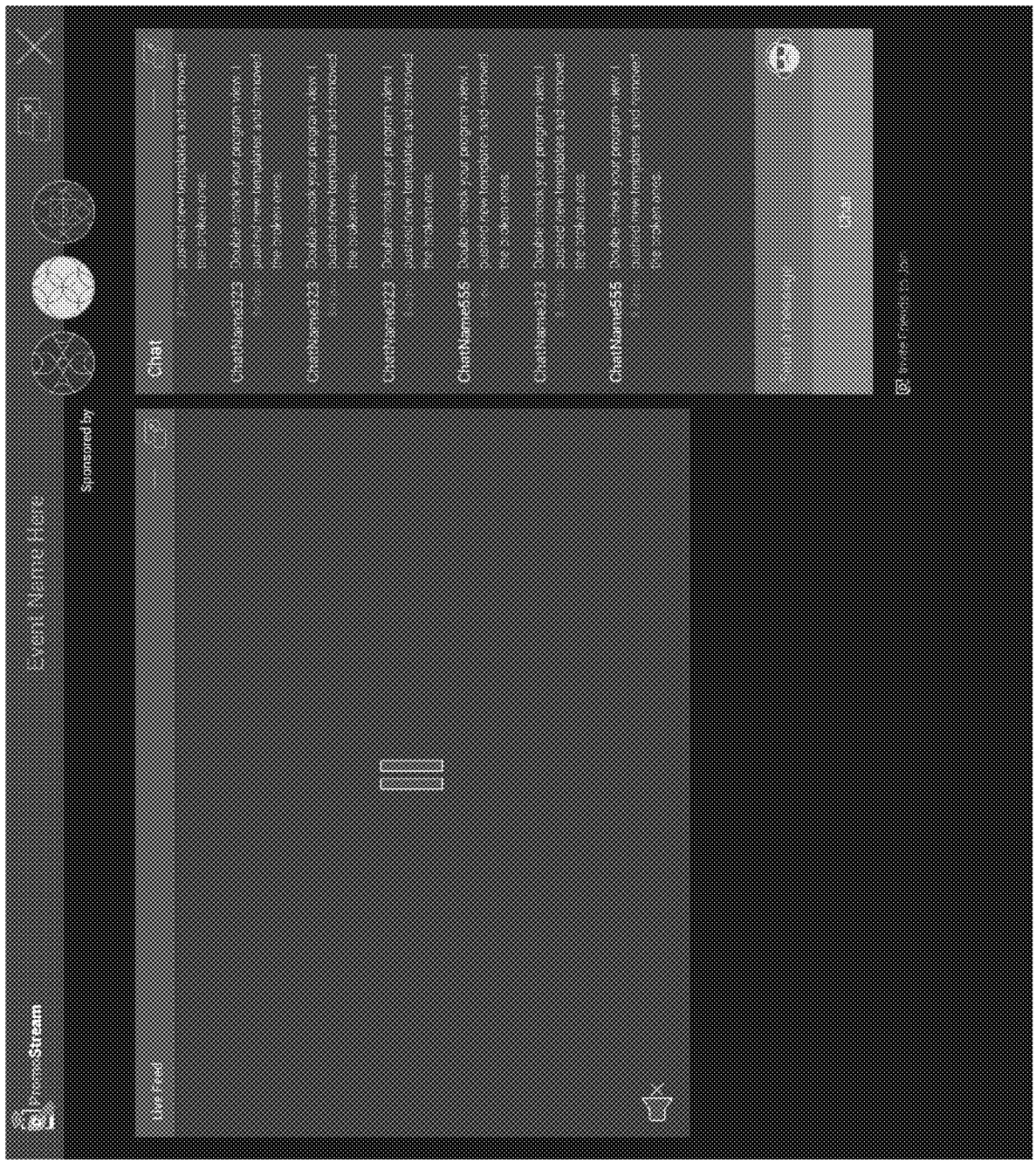
Figure 20:
Figure 21:
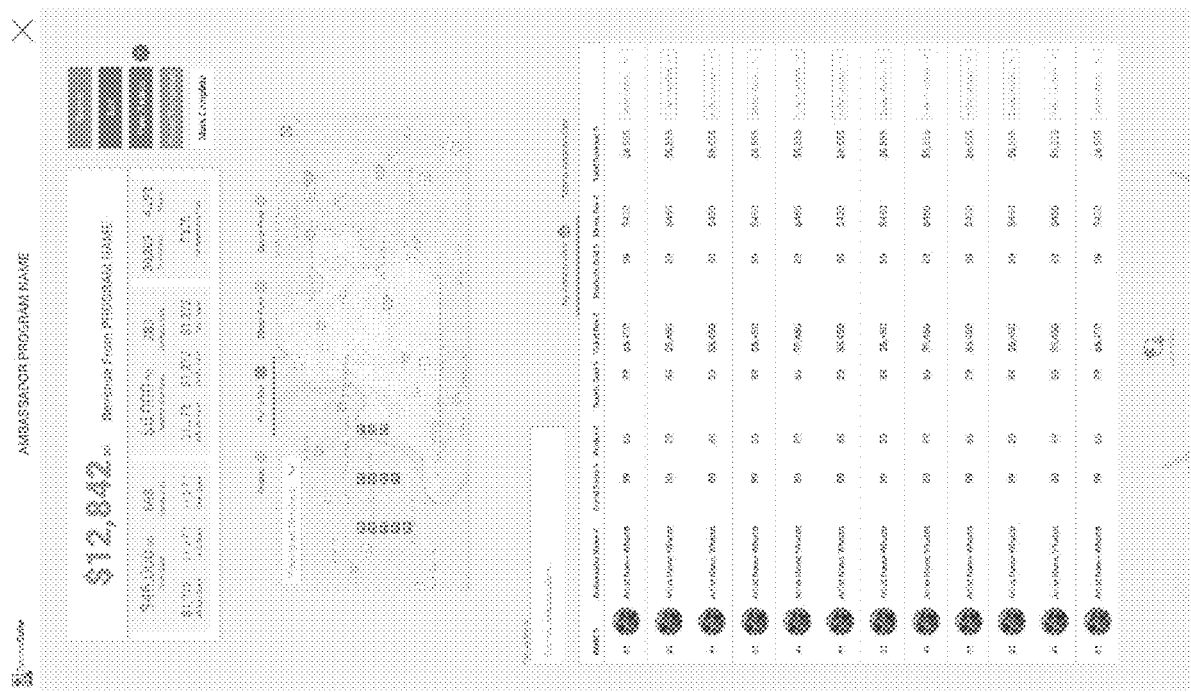
Figure 22:
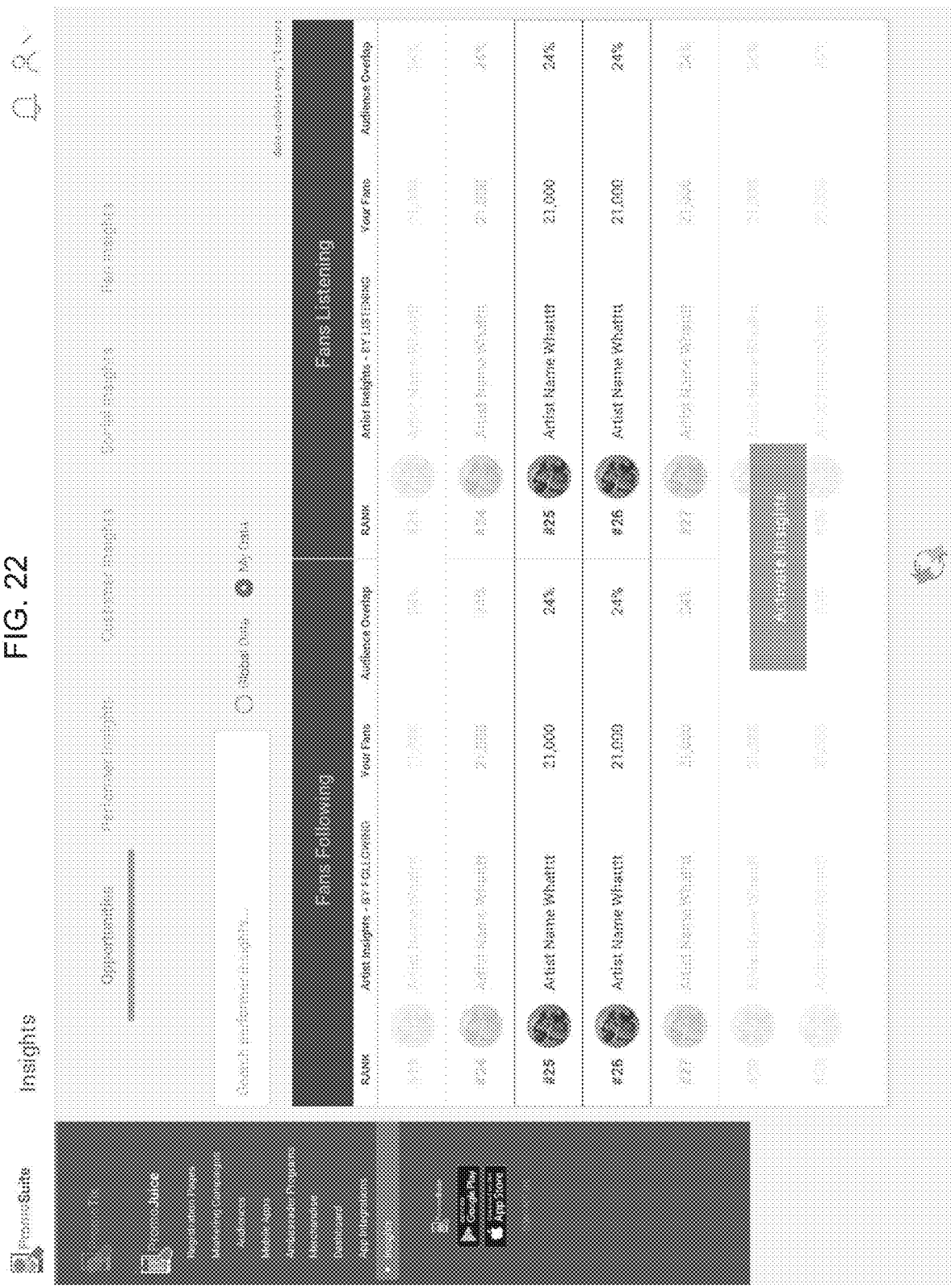
Figure 23:
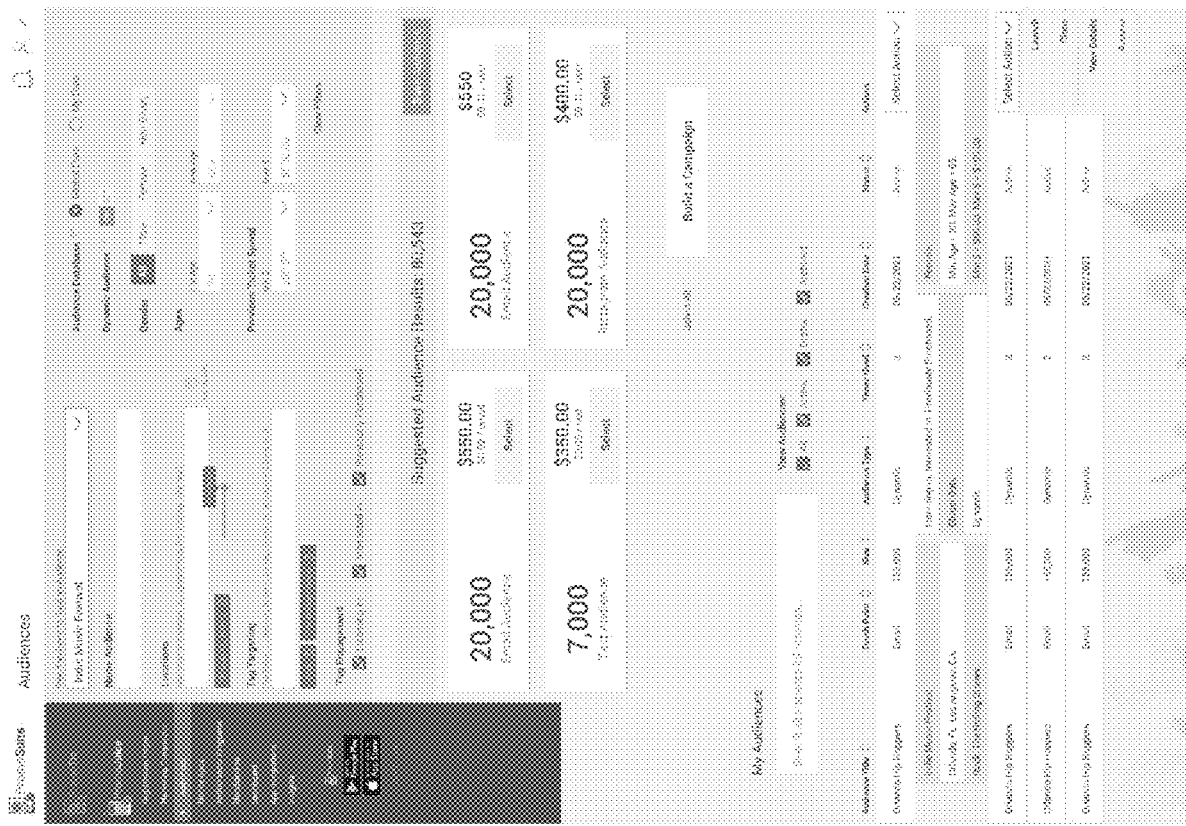
Figure 24:
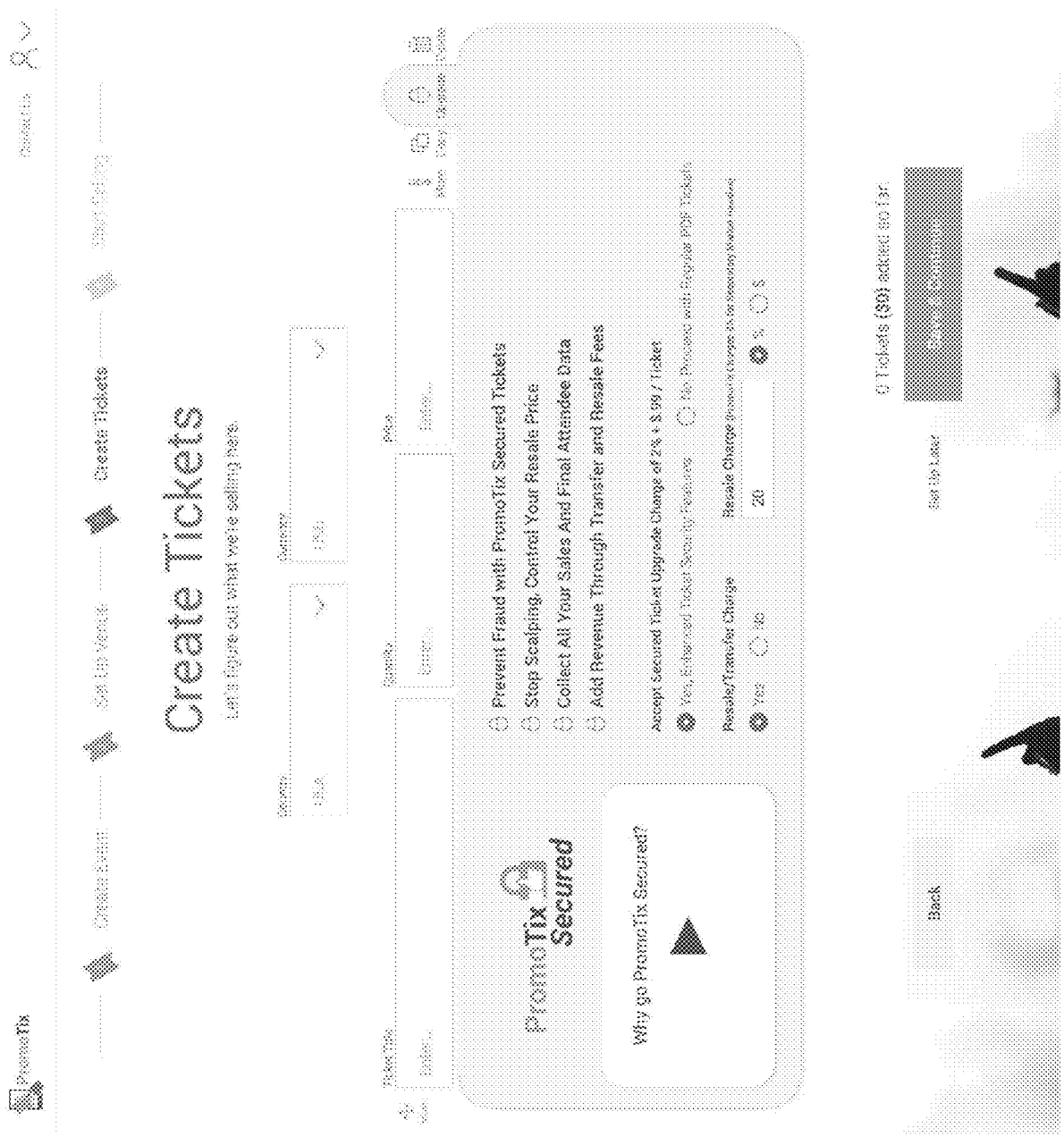
Figure 25:
Figure 26:
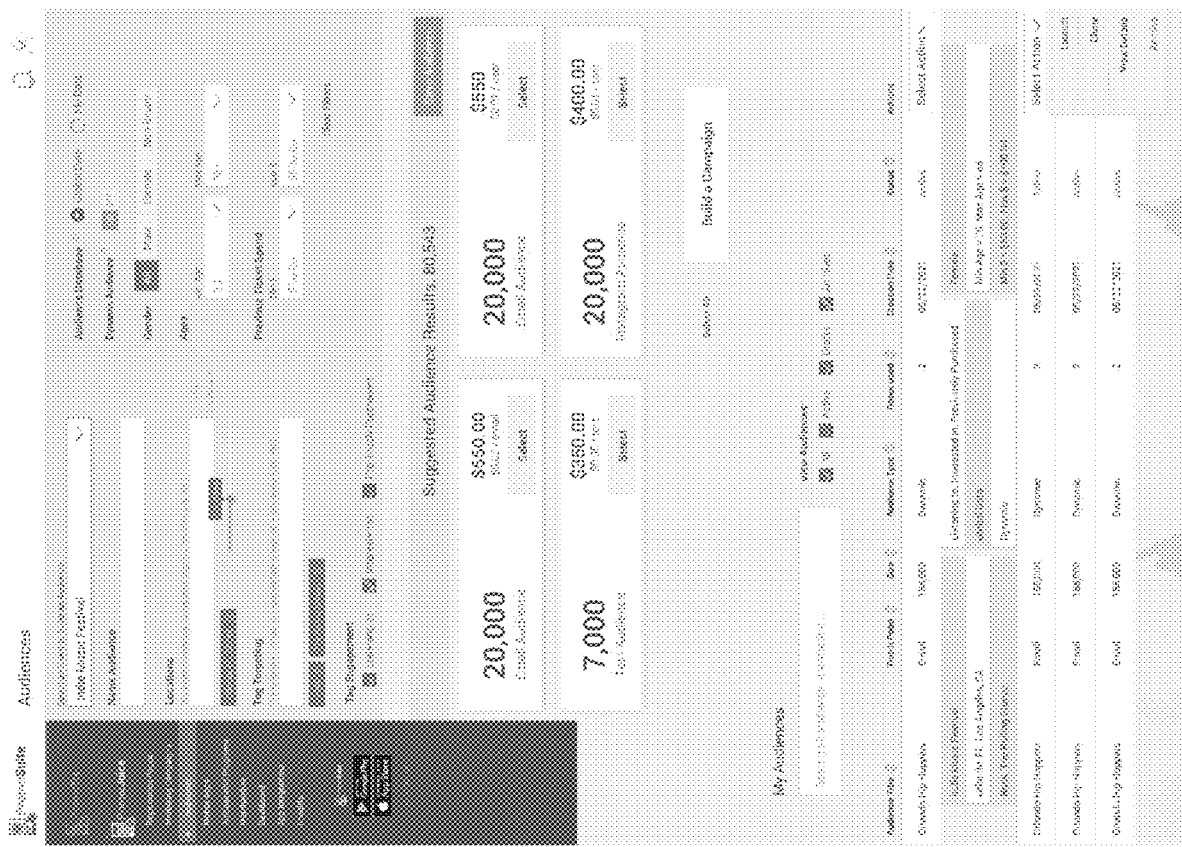
Figure 27:
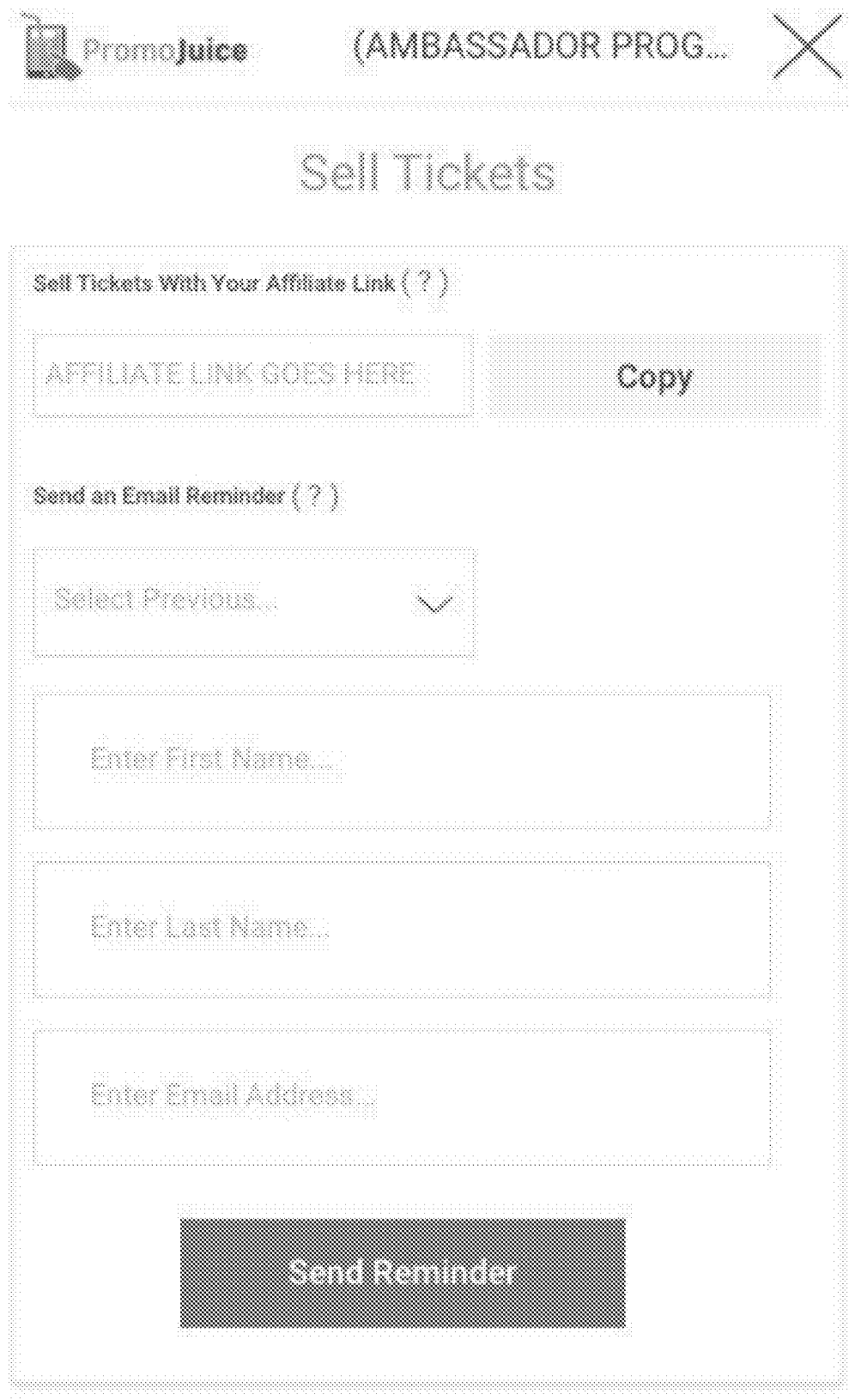
Figure 28:
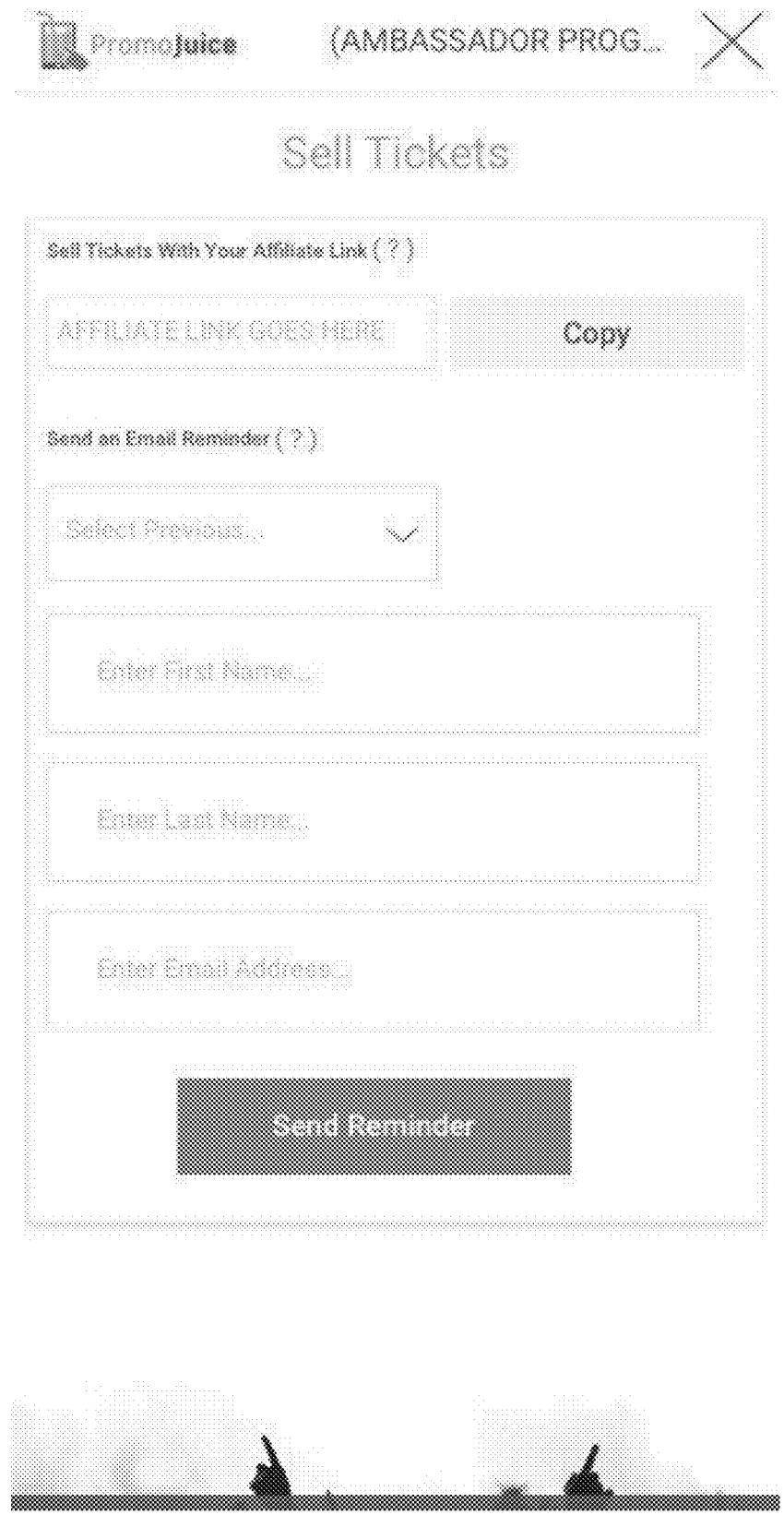

According to one embodiment, an ambassador can select a social media template from among a plurality of defined templates. The templates (e.g., created by the event organizer) can specify images, text, links, hashtags, and can be edited by the ambassador. FIG. 15 illustrates an example screen capture of a social media template. In various embodiments, the system can design and display branded social media templates that integrate event defined information automatically.

Process 600 can continue at 630 with definition of specific tasks, program milestones, or other activities that can be associated with an ambassador program. In some examples, promotional activity can include a photographic component or requirement to validate completion of specific tasks and/or milestones. At 632, users can set up award structure and associate respective awards with specific tasks or goals. Once the various details of the program are defined and ambassador program can be published at 634.

According to various embodiments, the various details of the specific program, goals, requirements, and/or other options can be accessed by other elements of an event management platform to determine when such goals, requirements, and/or definitions have been met.

Figure 7:
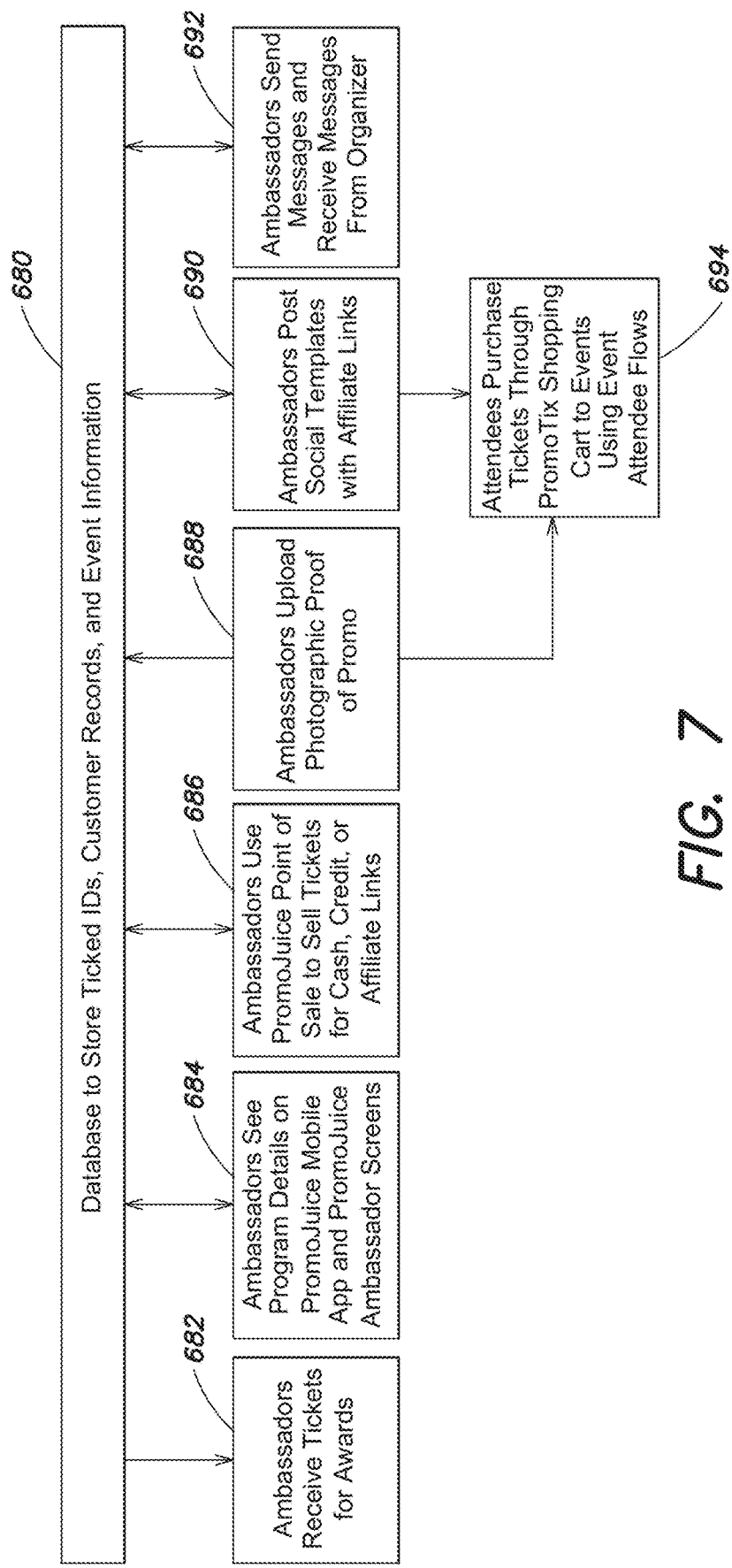
FIG. 7 is an example of process flow and system elements supporting ambassador functionality, according to one embodiment.

Shown in FIG. 7 is an example process flow seen from the perspective of an ambassador participating in an ambassador program. For example, ambassadors can be given tickets as awards for participating in ambassador program at 682. In some embodiments, participation can be tracked and information stored in database 680, based on program requirements an ambassador may award support tickets at 682. Shown at 684, respective ambassadors may access the system via a desktop application or mobile application to view program details. In other examples, respective ambassadors may access ambassador user interface screens that provide details on points earned, awards earned, tasks to complete, requirements for establishing task completion, among other options.

Additional functions made accessible to ambassadors include ticket sale interfaces that enable ambassadors to sell tickets directly to participants (e.g., 686). Responsive to initiating ticket sales the ambassador can trigger or interact with a PromoTix shopping cart which may be specific to a particular event or an event organizer (e.g., 694).

As part of performing ambassador tasks and/or earning points ambassadors may upload evidence or validation information (e.g. upload photograph at 688). Other tasks can include posting to social media sites with affiliate links (e.g. 690). In some examples, the system can identify such posts based on hashtags or affiliate links contained within a post and credit an ambassador accordingly. In further embodiments, ambassadors can send and receive messages from an event organizer (e.g. at 692).

According to some embodiments, the process flow shown can include additional steps and/or combine some of the illustrated steps to reduce the number of steps executed. Various system components can be configured to execute any one or more or any combination of the steps of the illustrated process flow. In yet other embodiments, an event management system can enable and/or execute any of the illustrated functions/steps shown and described above.

Figure 8A:
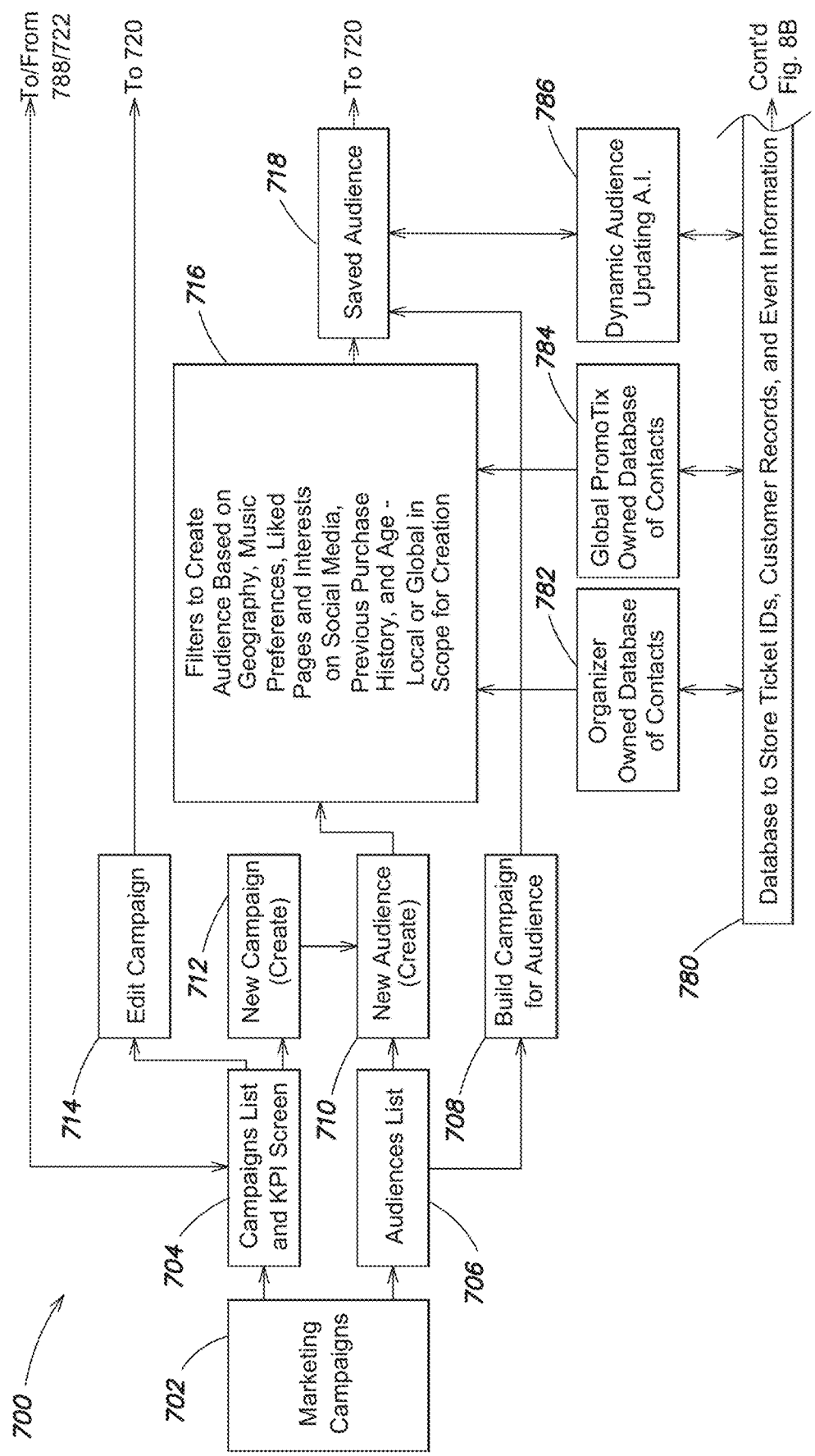
FIGS. 8A-B are an example of process flow and system elements supporting campaign generation and integration, according to one embodiment.
Figure 8B:
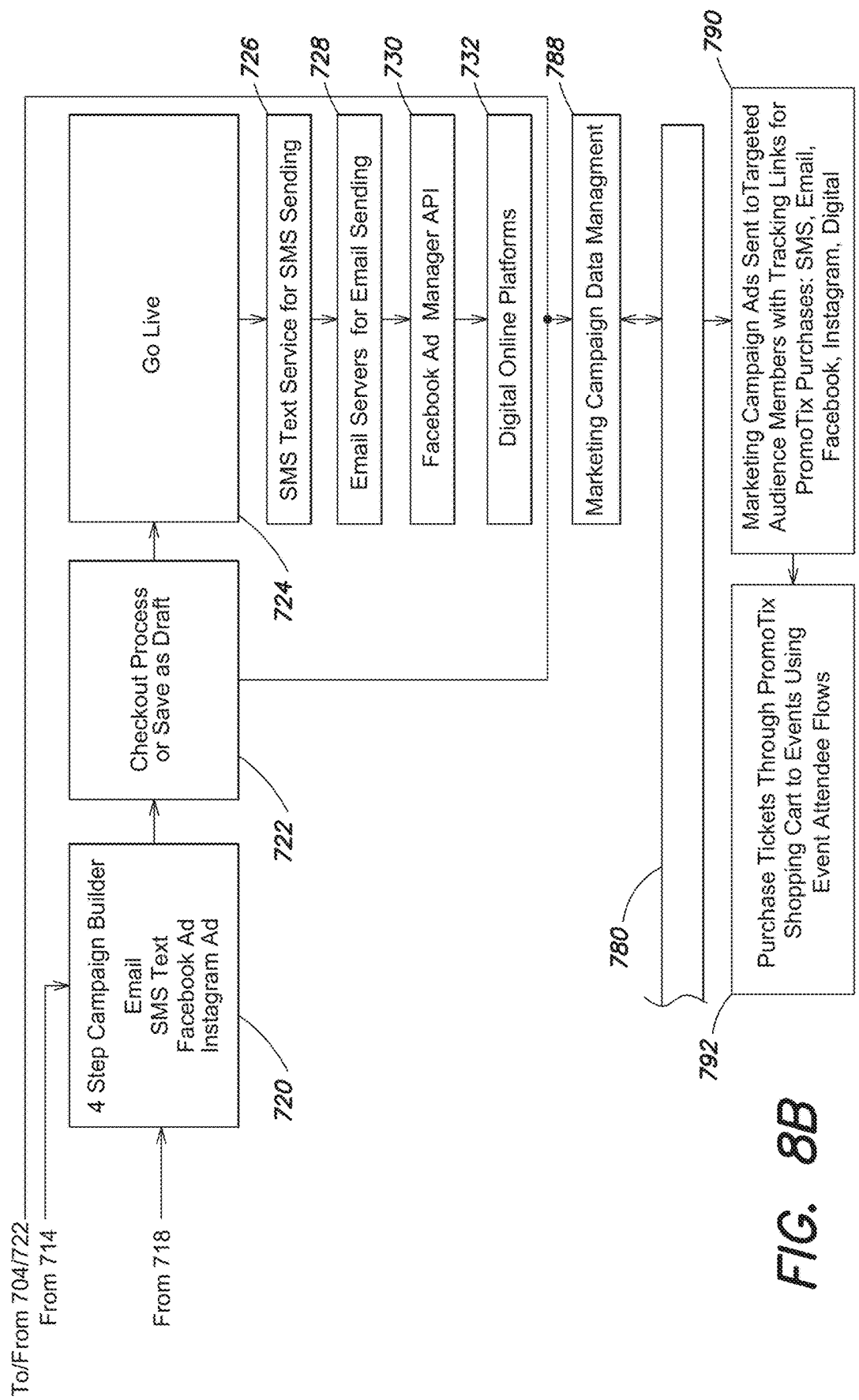

FIG. 8 shows an example process flow 700 for managing marketing campaigns on an event management system. According to one embodiment, the user can access the system to manage marketing campaigns at 702. Responsive to selecting marketing campaigns at 702 the system can display a campaign list and key performance indicators (KPI) screen at 704. In conjunction with the campaign list display, process 700 can include an audience list display at 706. Process 700 can continue with accessing details associated with the campaign list in a KPI screen or in the audience list. For example, process 700 can continue at 714 with editing a specific campaign which can include accessing a campaign builder set of screens. For example, campaign editing functions can trigger a four step campaign builder series of screens at 720 which include defining communication channels such as email, SMS text, Facebook, Instagram, among other options. Completion of the campaign builder wizard or sequence can include a checkout process or a save as draft option at 722. If the user is satisfied with the current changes the marketing campaign can be taken live at 724.

If a new campaign is being generated (e.g., 712), the user can define a new audience to target with the campaign at 710 and process 700 continues at 716 where filters can be applied to create an audience for the marketing campaign. For example, the user can select filters on geography, music preference, like pages, interests on social media, previous purchase history, age, among other options and any combination of the same. In some embodiments, users are given the option of using the filter criteria against the global database or a localized database for audience creation. Once the filters have been applied, the user can save an audience definition at 718 and then trigger a campaign builder wizard or series of screens at 720. As before, once user is satisfied with the created promotion for the campaign, the user can enter a checkout process or save the design as a draft at 722. If the promotion for the campaign is complete the user can trigger the campaign to go live at 724.

As part of the definition of campaign the user can establish a definition of an SMS text service for sending messages at 726, email servers for email communication at 728, and integration with a Facebook ad manager API, and any external digital platform and/or any associated API to enable integration of third party communication platforms (e.g., 732). According to various embodiments, the communication services (e.g., SMS and e-mail, etc.) are instantiated as components of the system and can be executed internally to leverage system based security and avoid communication through external channel not under system control.

According to some embodiments, a data store, or data storage facility 780 can support capture and storage of the information defined above. For example, the data storage facility 780 can include an organizer owned database of contacts at 782, a global PromoTix owned database of contacts at 784, a dynamic audience database at 786 and/or a campaign data management database at 788. In various embodiments, storage of data in the data store (e.g., at 786) can trigger various analytics on audience creation, filter selection, targeting criterion, among other options. In one example, data storage at 786 triggers dynamic updating of artificial intelligence algorithms and/or output models that are generated by the AI, and that can be used for generating insights, pre-defining audiences for selection by a user, and/or generating recommendations to an event organizer.

Once the campaign is triggered to go live, specific promotions or advertisements can be sent to a targeted audience in respective members of the target audience at 790. In some embodiments, the communications include tracking information and/or tracking links. For example, tracking links can be included in the communications to define Associations, for example, with PromoTix purchases. In other examples tracking links can be delivered in SMS messages, email messages, Facebook posts, Instagram posts, and/or other social media platforms for online digital services. When tickets are purchased using a tracking link the tickets purchased (e.g., at 792) can be tracked and attributed to specific campaigns.

Figure 14A:
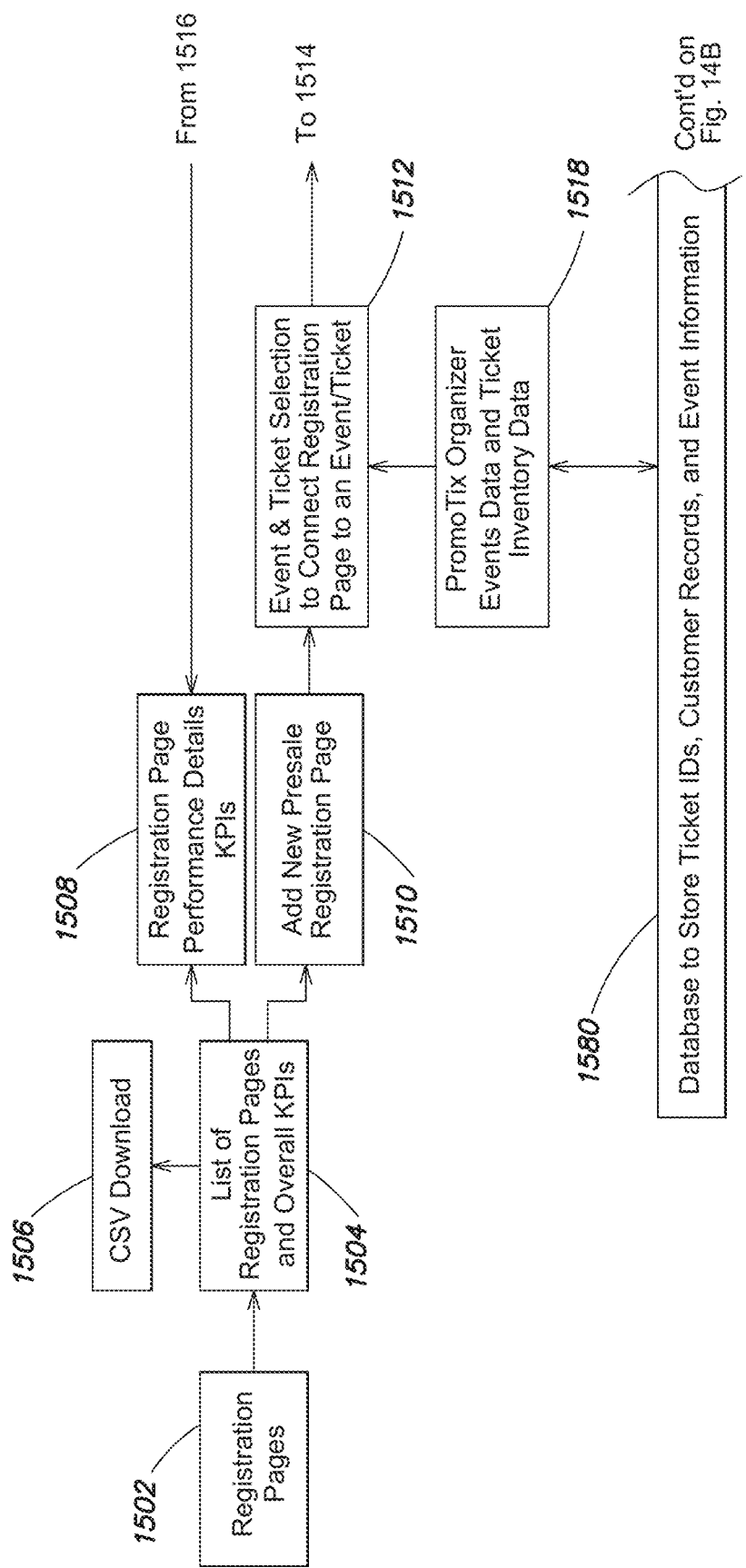
FIGS. 14A-B are an example of process flow and system elements for registration integration, according to one embodiment.
Figure 14B:
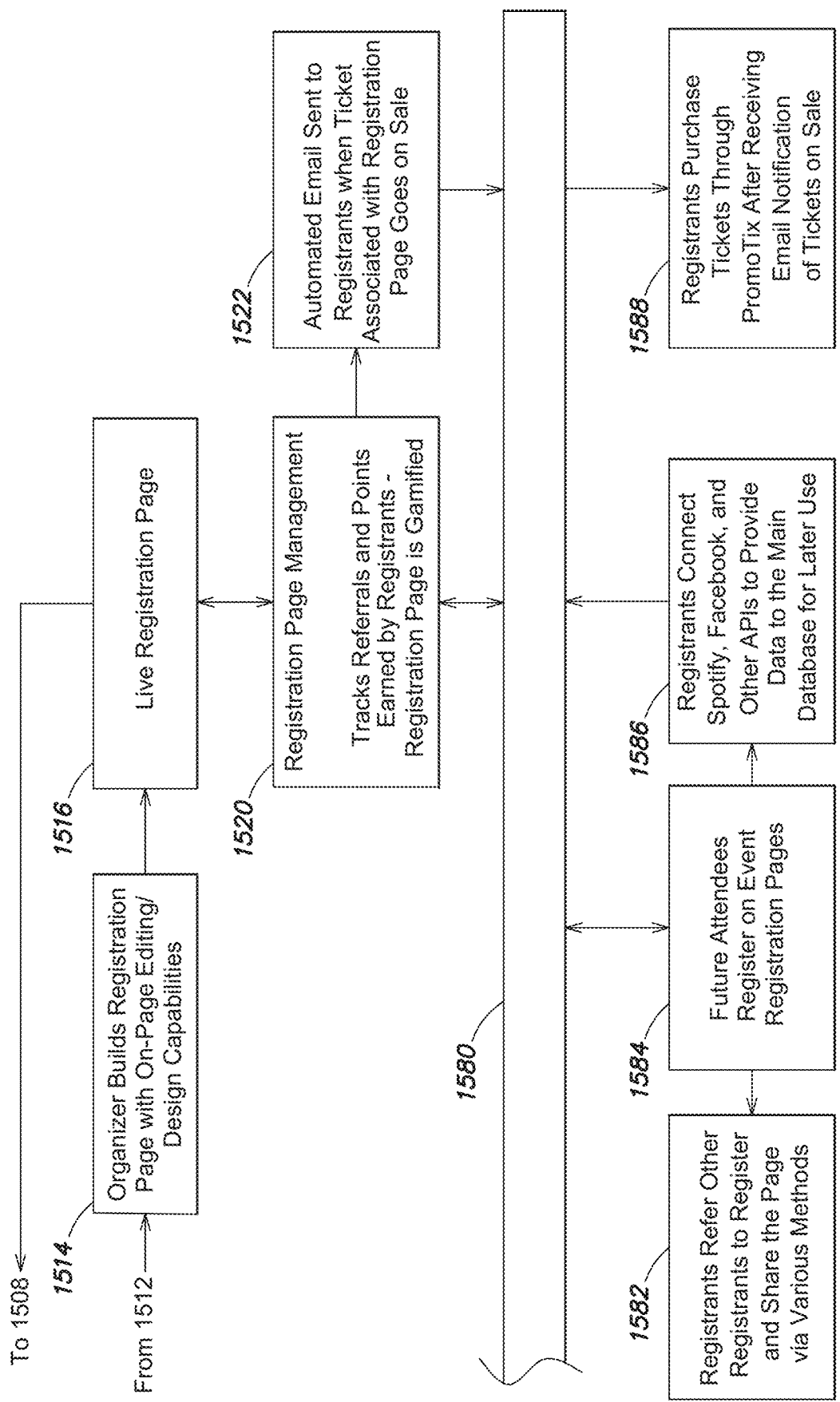

Shown in FIG. 14 is an example process flow for managing registration pages on an event management system. The process can begin at 1502 with the user accessing a registration pages management display. Upon selection of the registration pages management display in the user interface, the process can continue at 1504 with a display of a list of registration pages. The display can include a dashboard of key performance indicators associated with the registration pages and activity. The information displayed in the dashboard and word list of registration pages can be downloaded directly to a user computer or device at 1506.

If accessing an existing page (e.g., 1508), performance details associated with the selected registration page will be displayed and can include key performance indicator displays as well. If the user is creating a new registration page (e.g., 1510) the user can select an "add page" display element or an equivalent displayed function that can be selected in the user interface. Responsive to execution of the new page function, the process can continue with identification of an event to associate with the registration page (e.g., at 1512). In various examples, a number of wizards and/or user interface screens can facilitate creation of a registration page. For example, the process can include display of predesigned templates, predesigned functions, prior registration pages (which can be linked and displayed automatically by the system based on similarity analysis (e.g., based on comparing current event definition with prior events and even based on intelligent models of prior events), among other options. Once a user has created all the elements of their registration page the result can include activation of a live registration page at 1516. As part of event page creation, the process can include steps for integrating ticketing information and/or inventory data (e.g., 1518). In some embodiments, as part of maintaining a live registration page, the process can include steps for page management at 1520. For example, referrals and point awards can be tracked based on, for example, activities associated with the registration page. That activity can be captured and stored in a data storage facility (e.g. 1580).

In some embodiments, a data store can support the registration page operation, including creation, management, and/or execution. In one example, the data store can include databases tailored or specific to registration page operation. As part of execution of registration page functions, automated emails can be sent to any registrants when the tickets associated with an event and registration page go on sale. For example, the process can include acts for delivering email to registrants (e.g. at 1522).

In further embodiments, the process can include steps for leveraging existing registrants and incorporating new registrants or referrals. For example, the process can include steps for future attendees to register on event registration pages (e.g. 1584). In addition, the process can include steps for registrants to refer other participants to register and/or share the registration page via social media platforms (e.g. 1582). In other examples, the process can include connections on social media platforms (e.g., SPOTIFY, a Facebook link or API, etc.). In one embodiment, the process can include step 1586 for connecting registrants and social media platforms, and such information can be captured and stored (e.g. at 1580).

Once tickets are available for an event, any registrants on the associated registration page can receive a notification, and then purchase their tickets. For example, users may access a PromoTix system element to purchase their tickets (e.g., 1588).

Example Features and Example Combinations

Other embodiments can include any one or more and any combination of the following features:

1. Ticketing platform configured to be fee free for event organizers and ticket purchasers, for example, supported by other means of revenue from other products and sponsorship dollars.

2. The ticketing platform can combine in-person event ticketing with virtual event ticketing, allowing an event to be attended both in-person or virtually. Both virtual tickets and in-person tickets can be sold at the same time, in the same transaction, to attend the same event. The platform recognizes both a virtual venue and an in-person venue.

3. The system can also manage events with pre-issued tickets and conversion of a prescheduled event into a remote/livestream event with hybrid ticketing, (e.g., physical presence distribution and online or virtual box office distribution).

4. The system can manage resource allocations for ticketing thresholds and determine the underlying resources required to live stream an event based on ticketing thresholds. In some examples, the system can include event organizer functions to dynamically expand any threshold (e.g., based on demand) and update and/or automatically provision additional broadcast resources to accommodate.

5. The system can include a live video streaming platform which uses ticketing to control unique attendance to the live stream and creates a virtual venue which displays on the same screen: event merchandise sales and e-commerce, live communication between attendees and organizers, sponsors and advertising, and the live streamed event broadcast.

6. The system can include a ticketing platform that automatically hosts recordings of previously live virtual streamed broadcasted events and allows event organizers to continue to monetize those previous streams as ticketed video on-demand content in the future.

7. The system can include a built-in ambassador program module ("AP") with ambassador members coming from previous ticket or account holders of other events held on the platform.

8. The system can include an ambassador platform (that can include the AP) that allows ambassadors to send email ticket reminders to potential customers.

9. The system can include functions to enable event organizers to view direct links of social media posts posted by their ambassadors.

10. The system can include distribution platform for sales of merchandise goods seamlessly through multiple channels including at the shopping cart when customers purchase tickets, through brand ambassadors promoting the events, and during live video feed broadcasts of virtual events 11. The system can include a ticketing platform that collects data from ticket holders on their listening habits of music and organizes and displays that data to event organizers to help them make better artist booking decisions to book the artists their ticket buyers and potential ticket buyers are listening to.

12. The system can include a ticketing platform that can create customized audiences based on targeted preferences of potential ticket buyers that uses previous global event ticket holder or event registration data, creates advertisements, and upload both the ads and audiences to launch advertising on third party platforms such as Facebook, Instagram, Twitter, Adroll, YouTube, and other means such as SMS text, or via email.

13. The system can include a secured ticket type, which cannot be reproduced, subject to fraud, or resold created by changing a digital barcode every 30 seconds, essentially delivering a new unique Ticket ID to the customers' mobile app, as well as stored in the PromoTix database for verification.

14. The system can include a ticketing platform which automatically and consistently analyzes how well an event is selling and being marketed, and makes suggestions for new marketing tactics or channels for additional sales opportunities to the event organizer. Additionally, it is the only ticketing platform which recognizes new potential ticket buyers and creates new audiences for advertising and marketing outreach automatically, and suggests to the event organizer audiences to launch new ads as well.

15. The system can include a ticketing platform to implement AI that recognizes key event indicators, such as whether tickets are on sale or not, if the event is about to sell out or not, if the event is approaching soon, if key promotional tools within the software are not being utilized yet, etc. —and automatically guides the event organizer by suggesting what steps they should take next to improve the sales and promotion of their event leading to its success.

16. The system can include game based functions, for example, via the use of Registration Pages for potential attendees that allows event organizers to provide contests and rewards to attendees for registering for an event, and for providing referrals for others to register for the event on a points based system. The platform asks the Registrant to perform certain tasks such as referrals, following on social media, providing their music preference data, and more to earn points. The event organizer then uses the points as a scoring system to provide the promised rewards. The incentivized program helps push the registration page and marketing of the event viral.

17. The system can include a ticketing platform that allows you to perform research ahead of time within a geographic area to see how many potential ticket buyers exist in the system in that area, and whom also match the preferences set by the Event Organizer such as: listening to an artist on music platforms such as Spotify, Pandora, Amazon Music, or Apple Music. It also allows psychographics targeted from social media platforms such as pages or topics liked on Facebook or other places on the internet, and demographics such as gender, age, and income. No other ticketing platform allows you to see your potential audience for the event you're thinking about throwing ahead of time.

18. The system can include an ambassador Program module as part of the platform which is the only ambassador program that allows ambassadors to sell digital tickets or merchandise in the same shopping cart from a ticketing platform for CASH or CREDIT in person. To facilitate this, ambassadors have their credit cards linked to their account. When an ambassador sells a ticket or merchandise for cash to a Customer, the ambassador keeps the cash, the ambassador's credit card is charged for the ticket(s) and/or merchandise, and the event organizer sends the ticket(s) and/or merchandise to the customer and receives payment from the ambassador. The ambassador can also directly enter the customer's credit card information to sell tickets or merchandise for credit, or can provide an affiliate link to the customer who can then purchase online on their own through the PromoTix shopping cart or merchandise checkout page.

19. Various embodiments provide a ticketing platform that enables users to create their own custom branded mobile apps and release them on the Google Play and Apple app stores.

Figure 29:
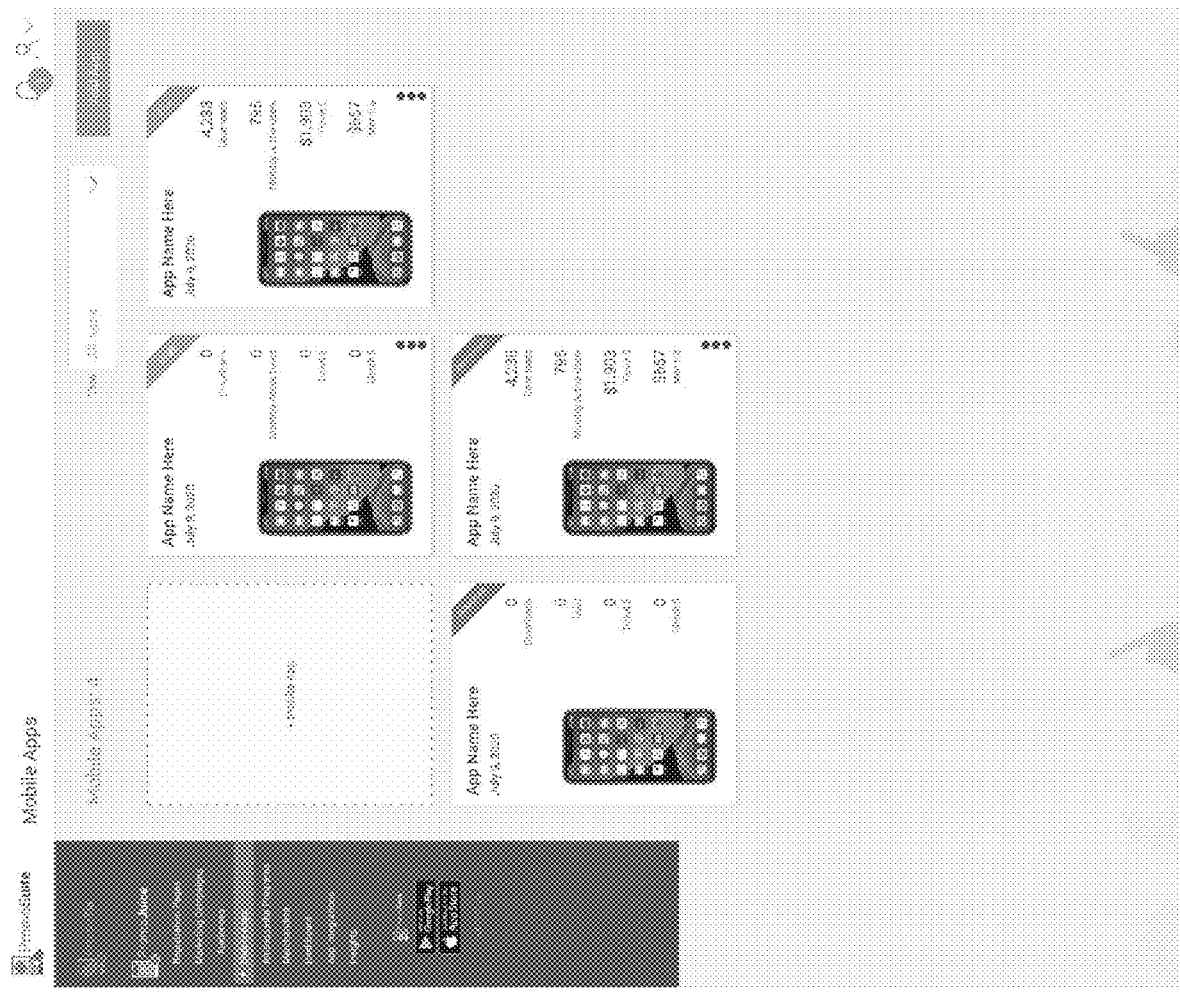
Figure 30:
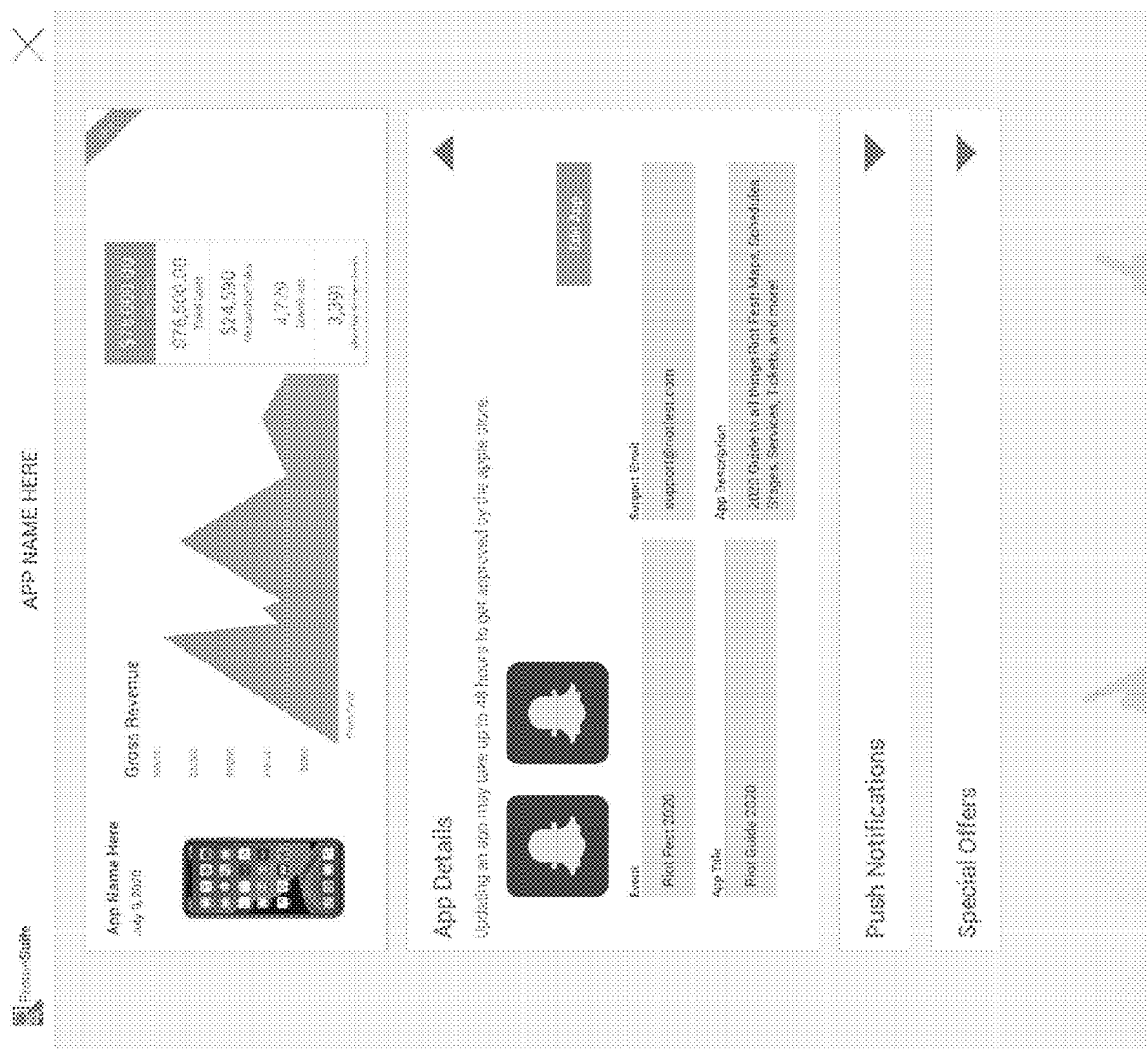
Figure 31:
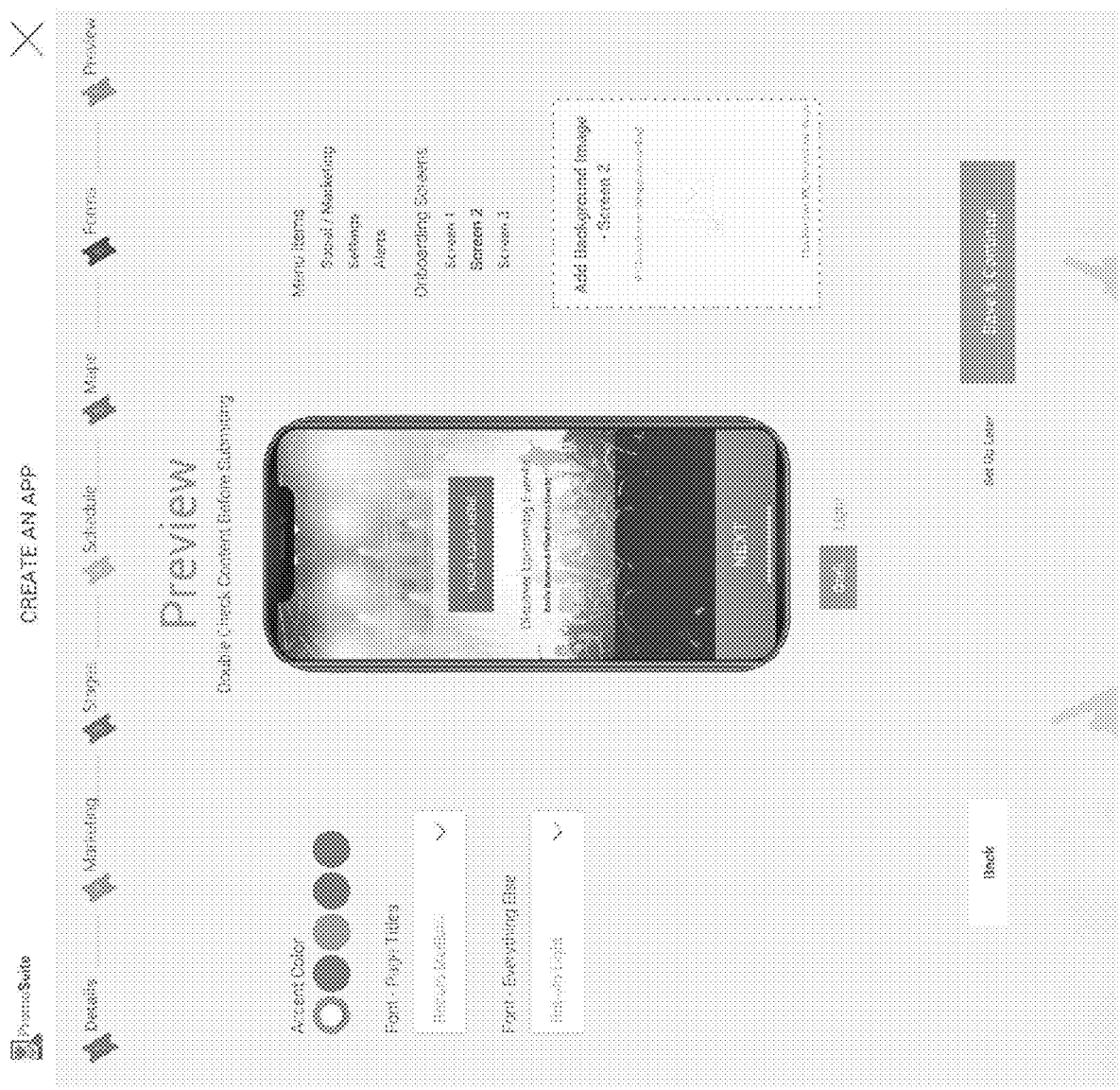

According to some embodiments, system operations are configured to eliminate the burden on an event organizer to leverage integrated systems. According to one example, the system generates custom branded mobile application(s) on behalf of an event organizer. The event organizer can simply choose options in the event definition display to enable or deploy the custom branded mobile applications to respective "app stores." FIG. 29 illustrates example applications created on the system that an event user can select to deploy. In other embodiments, the system can automatically create example mobile applications that an event organizer can edit, review, and/or modify prior to deployment.

In further example, the system enables an event organizer to create their own app as part of the event without any software development or programming skill. In one example, the mobile application is built through a graphics interface by an event organizer based on simple selections in the user interface. In further examples, the interfaces are configured to pull relevant data from the platform, event definition, the fan data, and the ambassador data, as well as social and any e-commerce related information. The result is a fully integrated and holistically branded application that is readily deployable by an event organizer. Further, the creation and distribution of the mobile applications occurs with little or no programming experience or knowledge. Each event organizer is linked to their own branded app, their own managed database, fans platform, ambassador platform, and applications for defining communication between the various components and user populations.

According to various embodiments, the system is configured to provide access to an event management/ticketing platform and experience. Various example functions are described herein that illustrate some features can be incorporated into some embodiments and examples, and in various combinations of the same. The following description illustrates features that can be included and/or combined with other features described (e.g., in other embodiments, examples, appendixes, screen captures, technical description, etc.):

Keep More:
1. Make 10-30% More Per Ticket Sold
2. With Fee Free Ticketing, you can raise your final ticket price since you know nothing will be added onto the backend.
3. The customer pays exactly what was advertised and you'll keep 100% of the income. This is money, straight to your bottom line.
4. Control 100% of your money with Daily Payouts for Ticket Sales (e.g., through Stripe).
5. Just one of our many event management software benefits.
6. Convert More than conventional systems
7. Convert Up to 25% More Buyers
8. Fee Free Ticketing has proven to sell more tickets to events. Customers convert more easily when they see there are no added fees.
9. Additionally, with the system, you'll be able to sell more tickets through multiple channels of marketing including Brand ambassador and Street Team Programs, Mobile apps, Social Ads, Email, Text, and many other event management software features.
10. Even more valuable may be the opportunities and insights for booking talent and launching targeted advertising to ticket buyers who are listening to those acts and want to see the performers you're booking. This helps drive ticket sales in ways you just can't do on your own.

Reach More:
11. Sell 15-20% More With New Audiences
12. Start reaching new customers with your messaging by tapping into our database or live streaming your event to an audience around the globe.
13. Not only will you have access to a variety of optional marketing tools that will help you sell up to 25% more tickets to your events every year, you'll also be able to sell more tickets to attendees who want to attend your event virtually. Many of our system users and communication channels reach more people virtually than they do at their live events!
14. Take your event global and sell tickets to anyone, anywhere, who wants to join in on the event.

According to various embodiments, an event management system and associated functions can be described with respect to various system elements that manage any one or more of the following functions. In other embodiments, various ones and/or any combination of the discussed functions can be executed by other system elements, and in still others the system can implement the described features directly. Stated broadly some embodiments include a PromoTix system element for managing the execution of ticketing functions associated with an event, a PromoStream system element for managing the execution of content streaming, and a PromoJuice system elements for managing the execution of ambassador/marketing functionality. Other embodiments can implement the same functions and/or various combinations of the discussed functions as part of a ticketing platform and/or ambassador platform, among other options.

PromoTix offers a 100% ticket service fee free digital ticketing product, complete with attendee mobile app, and event organizer mobile app for checking in attendees to your event. Our costs of ticketing are covered by our sponsors, meaning you keep more of the final price paid for your tickets.

The system provides Live Event Broadcasting and Video on Demand Streaming

PromoStream opens an entirely new revenue source for your event by allowing you to sell virtual tickets for attendees to watch a live or pre-recorded broadcast of your event online.

Eliminate physical venue capacity limits and open up the audience possibilities to anywhere in the world. Stream from any device to millions of people dying for your content.

Engage the audience by selling merchandise during your event online, initiate live chats for attendees, and even accept donations for great causes.

Automatic/Recommendations for enabling registration pages

Collect Data, and Make Events Go Viral

Start marketing before your event is even on sale with Registration Pages. As soon as you announce dates, you can begin collecting interested party data, to use in later marketing campaigns.

System generated registration pages allow your event to go viral by motivating fans to invite their friends, and connect their social profiles, for prizes and discounts to your event.

also encourages registrants to give you their Spotify® Listening Data, so if you're in the music industry, you'll know exactly who your fans are listening to—and who to book that will garner the most ticket sales from your database.

Automatic generation and validation of marketing campaigns

Reach New Audiences via Text, Email, or Social Media Ads

Revolutionary to any ticketing platform, the system adds the ability for you to create new audiences of potential attendees not already in your database, based on geographic area, Spotify® listening data, Facebook® page likes, previous concert tickets purchased on PromoTix and much more.

This means you can quickly grow your reach and market your event to new individuals you may not have been talking to previously. And you know they'll be interested in your event based on their behaviors.

Stop sending emails to the same tired list and get started with the system's marketing campaigns.

System Generated Insights

Artificial Intelligence that parses captured data. Various AI generated insights into users can be used to drive sales Unique tool that eliminates complex analysis—Insights For example, system enables you to see exactly who your customers are listening to on SPOTIFY® so you can make better booking decisions that will resonate with your audience and sell more tickets.

The system recognizes artists you've booked, and automatically alerts users to opportunities for marketing and reaching new customers who may be within your geographic area and are listening to those artists, for example, on Spotify or have liked them on Facebook.

Insights provide invaluable research, but also a virtual assistant who is constantly monitoring and researching new opportunities for you, even while you sleep.

Insights will incrementally grow your event's participation, and enable better targeted communication to your user population Ambassador Programs System generated army of ambassadors Recruit a team of people to hang up posters, hand out flyers, share content across social media, and sell tickets for you. With the system, a street team of ambassadors can sell tickets for cash or credit through our POS, at no risk of loss to you, the promoter.

The system can create or recommend for approval teams of hundreds on the ground, promoting your event and selling tickets and merchandise for you both on and offline to generate sales.

Reward programs can be automatically engaged to motivate them with free tickets to your event, merch packs, and cash commissions for sales. Various components are configured to automatically track progress of the team both on and offline, leaving you free to work on other things. Managing a comprehensive street team ambassador program has never been streamlined in such a manner—the inventors are not aware of another offering that can perform these functions as an integrated platform The system is configured to offset our company's "cost of ticketing" through sponsorships which we sell to major brands looking to reach event attendees. For example, those sponsors receive ad space on the digital PDF tickets in exchange for covering the ticketing fees for organizers and ticket buyers. In various embodiments, the system can present options for managing sponsor needs based on projected costs associated with ticketing, such that the UI displays in an instant if current sponsorship has covered a target goal and/or projected cost.

Advanced Event Promotional Tools—event organizers use the system to find new customers not already in their database as well as communicate with their current customers (allowing streamlined targeting, more efficient communication, and creating the ability to sell more tickets.

Event organizers can plan and research performers for artist bookings that align with their ticket buyers, create and launch targeted advertisements on social media, send SMS text or email promotions, build and manage their own custom event mobile app, and even engage fans in the promotion of their event through contests. In various embodiments, the system can analyze participant information automatically and deliver recommendations on potential audiences for an event or potential talent for an event given a system generated projected audience, among other options guaranteed.

Streaming Services

Live Video Broadcasting of Events

PromoStream brings your event to the world with live video streaming, broadcasting, and on-demand viewing. With PromoStream, for example, you can sell digital tickets to a digital event hosted online and broadcast video from your device live to attendees.

PromoStream enables users to sell merchandise during the stream to attendees with integrated merchandise functionality (e.g., with a PromoJuice module), that can be configured to display a virtual marketplace or other merchandising channels.

Chat functionality between users and/or participants is enabled for any online event.

Users can initiate live chat functionalities for attendees, and even collect donations. Save your broadcasts and sell a "nonlive" ticket for viewership at a later date with our video on demand service.

The system enables an event that has attendees view from all over the globe, with unlimited attendance, and minimal expense. PromoStream's servers are the fastest on the planet, with a video latency of just 1.x seconds to anywhere in the world. You can be sure when you say your event is "live" you really mean it.

PromoSuite is configured to aggregate and analyze the data from PromoTix's global ticket buyer database to suggest matches and find new audiences reachable through (e.g., PromoJuice) advanced marketing modules. In some examples, PromoSuite uses artificial intelligence and machine learning to tailor system functions, target communications more efficiently, and in some examples, drive more revenue for your event.

In various embodiments, the system operates like your very own marketing assistant who is finding new leads for you, and presenting researched opportunities to drive new sales, all while you sleep.

According to various embodiments, the system can include integrated marketing and promotion services. In one example, a marketing module is referred to as "PromoJuice." And the marketing associated functions, operations, and/or algorithms can be implemented in a PromoJuice component.

The system enables organizers to activate fans through registrations, and motivate them to help promote your event through contests. Take it a step further, the system can define and/or enable you to enlist your own army of PromoJuice ambassadors on the streets, hanging up posters, flyers, and even selling tickets for you.

In some examples, PromoJuice captures pulls global data from PromoTix, and can capture data from external sources (e.g., Facebook, Instagram, Spotify, and others) to provide you access to new audiences and potential ticket buyers that you otherwise couldn't reach. You can target new audiences using system enabled functionality and access information and insights that would not be in your personal database.

In various hybrid event settings, PromoStream enables event organizers to host and broadcast live virtual events or add live broadcast to in-person events to increase your attendance and ticket sales.

Further, the system eliminates attendance capacity limits based on your venue size which would normally prevent you from selling additional tickets. And for those attendees who want to attend, and simply can't make it in person, you can now capture those ticket sales too.

Viewers can watch the live stream from any device enabled with a browser and internet connection. Their unique Ticket ID allows them to enter your gated event and attend virtually from anywhere in the world.

PromoSuite is an example embodiment of an event management platform that can incorporate any of the functions discussed herein. Likewise, details described with respect to PromoSuite can be implemented in any embodiment of an event management platform. In some examples, PromoSuite is configured to use artificial intelligence and machine learning to analyze your data on participants, past events, promotions, communication channels, ambassadors, ambassador teams, street level marketing etc., as well as the global PromoTix database to find and present to users ways to optimize event execution, event definition, and/or to simply design and integration choices to implement missing or lacking functionality—the end result, in some examples, every user is given more opportunities to sell more tickets.

Example Logic, Process Flow, and Pseudocode

According to some embodiments, the system is configured to enable a live video streaming platform which uses ticketing to control unique attendance to the live stream and creates a virtual venue which displays on the same screen: event merchandise sales and e-commerce, live communication between attendees and organizers, Sponsors and advertising, and the live streamed event broadcast.

Example Logic Flow

IF a valid Virtual Ticket ID is entered, THEN the virtual ticket will be marked as "checked in" and the attendee will be allowed to enter the live stream
    If a Virtual Ticket ID is entered which is NOT valid, THEN the virtual ticket will NOT be marked as "checked in" and the attendee will NOT be allowed to enter the live stream. The attendee will also be shown an error message: "This is not a valid Ticket ID"
    IF a valid Virtual Ticket ID is entered, and that valid Virtual Ticket ID is already being used to view the live stream, THEN the previous user will have their access revoked and they will be sent back to the "Virtual Front Gates" screen Further embodiments of the system include an ambassador program module, wherein the system can be configured to establish ambassador members/users from previous tickets or account holders of other events held on the platform.

Example Logic Flow

When an event organizer is recruiting ambassadors from the PromoJuice ambassador network
Recruit New ambassadors function
    [X,XXX] Available ambassadors (X=total number of ambassadors on PromoJuice)
    Show members within [X] miles of [Select State . . . (dropdown menu→all USA States)] [Select City . . . (dropdown menu→all USA Cities)]
    [Filter by Contact Name . . . ]
    [Filter by Email . . . ]
    [Filter by Phone . . . ]

Various embodiments can include functionality to enable ambassadors to send email ticket reminders to potential customers.

Example Logic Flow

Once an ambassador sends an email ticket reminder to a potential customer, the recipient will receive an automated email from PromoJuice containing the ambassador's unique affiliate tracking link for the associated event.
    For example, every time period (e.g., 48 hours), the recipient will receive another automated email from PromoJuice (unless they opt out of the reminder). The ambassador also has the option to stop active email reminders per recipient According to some embodiments, the system enables a software platform that allows event organizers to view direct links of social media posts posted by their ambassadors.

Example Logic Flow

When an individual social media post is clicked on by the event organizer, it will open up the social media post in a new tab.
    For Facebook posts: clicking on the post will open up a link to the ambassador's Facebook profile in a new tab
    For Twitter posts: clicking on the post will open up a link to the specific Twitter post in a new tab
    For Instagram posts: clicking on the post will open up the a link to the ambassador's Instagram profile in a new tab According to some embodiments, the system is configured to collect data from ticket holders on their listening habits of music and organizes and displays that data to event organizers to help them make better artist booking decisions to book the artists their ticket buyers and potential ticket buyers are listening to.

Example Logic Flow

IF a PromoTix user connects their Spotify account, THEN we will generate an access token and pull the following information from their Spotify account:
Email
Date of Birth
Name
Username
Profile Picture
Number of followers
Public playlists
Recently played content
What is saved in library
Top artists and content
Artists followed
PromoTix will update Spotify following and listening data for all users every 24 hours via a CRON According to some embodiments, the system is configured to create customized audiences based on targeted preferences of potential ticket buyers that uses previous global event ticket holder or event registration data, creates advertisements, and upload both the ads and audiences to launch advertising on third party platforms such as Facebook, Instagram, Twitter, Adroll, YouTube, and other means such as SMS text, or via email.

Example Logic Flow

"Tag Engagement":
    Example: "Rock" and "The Rolling Stones" are entered and tagged in the "Tag Targeting" section:
    IF "Listening To" IS CHECKED:
        Include activated PromoTix accounts who are following "The Rolling Stones" on Spotify
        Include activated PromoTix accounts who are listening to "The Rolling Stones" on Spotify
    IF "Interested In" IS CHECKED:
        Include activated PromoTix accounts who have purchased at least one ticket to a PromoTix event which included the tag "Rock"
        Include activated PromoTix accounts who have purchased at least one ticket to a PromoTix event which included the tag "The Rolling Stones"
        Include activated PromoTix accounts who are following "The Rolling Stones" on Spotify Include activated PromoTix accounts who are interested in "Rock" on Facebook Include activated PromoTix accounts who are interested in "The Rolling Stones" on Facebook IF "Previously Purchased" IS CHECKED:
  Include activated PromoTix accounts who have purchased at least one ticket to a PromoTix event which included the tag "Rock"
  Include activated PromoTix accounts who have purchased at least one ticket to a PromoTix event which included the tag "The Rolling Stones"

"Audience Database":
  IF "Global Data" is checked, THEN PromoJuice will consider ALL of the activated PromoTix accounts in our database when building the audience.
  IF "My Data" is checked, THEN PromoJuice will only consider activated PromoTix accounts that live in the EO's database on PromoSuite:
    IF an activated PromoTix account has purchased a ticket to at least one of the event organizer's events (either PromoTix OR Eventbrite), THEN that PromoTix account's data would be included in "My Data"
    IF an activated PromoTix account is listed as an Attendee on at least one of the event organizer's PromoTix events, THEN that PromoTix account's data would be included in "My Data"
    IF an activated PromoTix account has registered as a Fan on at least one of the event organizer's registration pages, THEN that PromoTix account's data would be included in "My Data"
    IF an activated PromoTix account has downloaded and signed in to at least one of the event organizer's mobile apps created through the PromoTix web application, THEN that PromoTix account's data would be included in "My Data"

"Previous Ticket Spend":
  Example: IF a Min $ value of $2.00 is entered, THEN PromoJuice will filter out ALL activated PromoTix accounts who have NOT purchased at least one PromoTix ticket priced at $2.00 or more
  Example: IF a Max $ value of $100.00 is entered, THEN PromoJuice will filter out ALL activated PromoTix accounts who HAVE purchased at least one PromoTix ticket priced greater than $100.00

Once a Facebook or Instagram audience is purchased by an event organizer, PromoTix will create the custom audience on PromoTix's Facebook ad's portal, create the ad on the event organizer's Facebook ad's portal, share the custom audience with the event organizer and associate it with their ad, and then launch the event organizer's ad automatically According to some embodiments, the system is configured to implement AI that recognizes key event indicators, such as whether tickets are on sale or not, if the event is about to sell out or not, if the event is approaching soon, if key promotional tools within the software are not being utilized yet, etc. —and automatically guides the event organizer by suggesting what steps they should take next to improve the sales and promotion of their event leading to its success. In some examples, the system pre-trains neural networks on ticketing data and identification labels to create models to identify the key event indicators. Other learning models can be used in different embodiments, including supervised learning models, unsupervised learning models, etc.

Example Logic Flow And Example System Trigger & Action TABLE I

TABLE I

| Reminder/Opportunity Text | Trigger Criteria | Action |
|---|---|---|
| Your team is too small. Recruit more ambassadors! | The event organizer has at least (1) live ambassador program The event organizer has less than (30) ambassadors total | [Recruit] |
| You haven't created any social content for (AMBASSADOR PROGRAM NAME) yet. | The event organizer has at least (1) live ambassador program The event organizer has not created any social content yet for that live ambassador program. | [Create Social Content] |
| You have pending awards for an ambassador program ending soon. | The event organizer has at least (1) live ambassador program That live program's ambassador Program End Date/Time is equal to or less than 7 days (168 hours) from the current date/time. That live ambassador program has pending awards that need to be approved | [Approve Awards] |
| You have not created social content for (AMBASSADOR PROGRAM NAME) in one week. | The event organizer has at least (1) live ambassador program The event organizer has not created any social content for that live ambassador program in over 7 days (168 hours) | [Create Social Content] |
| Tickets just went on sale for (AMBASSADOR PROGRAM NAME) and you have not created new social content for yet. | The event organizer has at least (1) live ambassador program connected to a PromoTix event At least (1) ticket type for the PromoTix event just went on sale The event organizer has not created social content for that | [Create Social Content] |

TABLE I-continued

| Reminder/Opportunity Text | Trigger Criteria | Action |
| --- | --- | --- |
| | live ambassador program since that ticket type went on sale | |
| You haven't launched a push notification on your mobile app in over six weeks. | The event organizer has at least (1) live mobile app<br>The event organizer has not launched a push notification for that mobile app in over (6) weeks (1,008 hours) | [Send Push Notification] |
| Tickets just went on sale for (PROMOTIX EVENT NAME). Do you want to send out a push notification via your mobile app now ? | The event organizer has at least (1) live PromoTix event<br>At least (1) ticket type just went on sale for that live PromoTix event<br>That live PromoTix event is connected to at least (1) event mobile app<br>The event organizer has not sent out a push notification on that event mobile app since the ticket type went on sale (immediate) | [Send Push Notification] |
| (PROMOTIX EVENT NAME) is coming up in 30 days. Want to send out a push notification via your mobile app now ? | The event organizer has at least (1) live PromoTix event<br>That live PromoTix event's Start Date/Time is in 30 days (720 hours) or less<br>That live PromoTix event is connected to at least (1) mobile app<br>The event organizer has not sent out a push notification on that mobile app (immediate) | [Send Push Notification] |

According to some embodiments, the system is configured to gamify functionality of the event management platform and/or software. For example, the system incorporates game elements into the use of registration pages for potential attendees that allows event organizers to provide contests and rewards to attendees for registering for an event, and for providing referrals for others to register for the event on a points based system. In some examples, the platform asks the registrant to perform certain tasks such as referrals, following on social media, providing their music preference data, and more to earn points. In further examples, the event organizer then uses the points as a scoring system to provide the promised rewards. The incentivized program helps push the registration page and viral marketing of the event.

Figure 9:
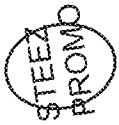
Figure 10:
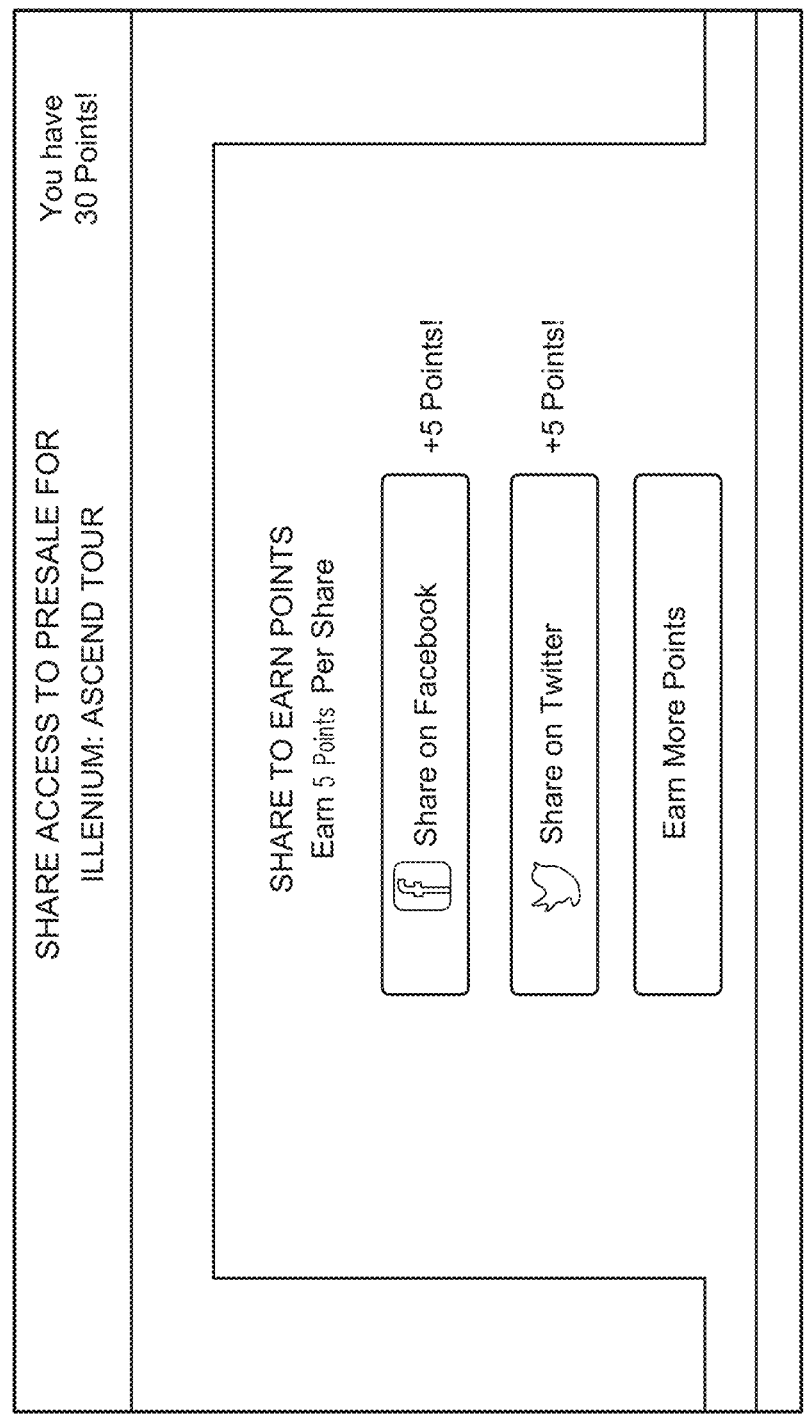
Figure 11:
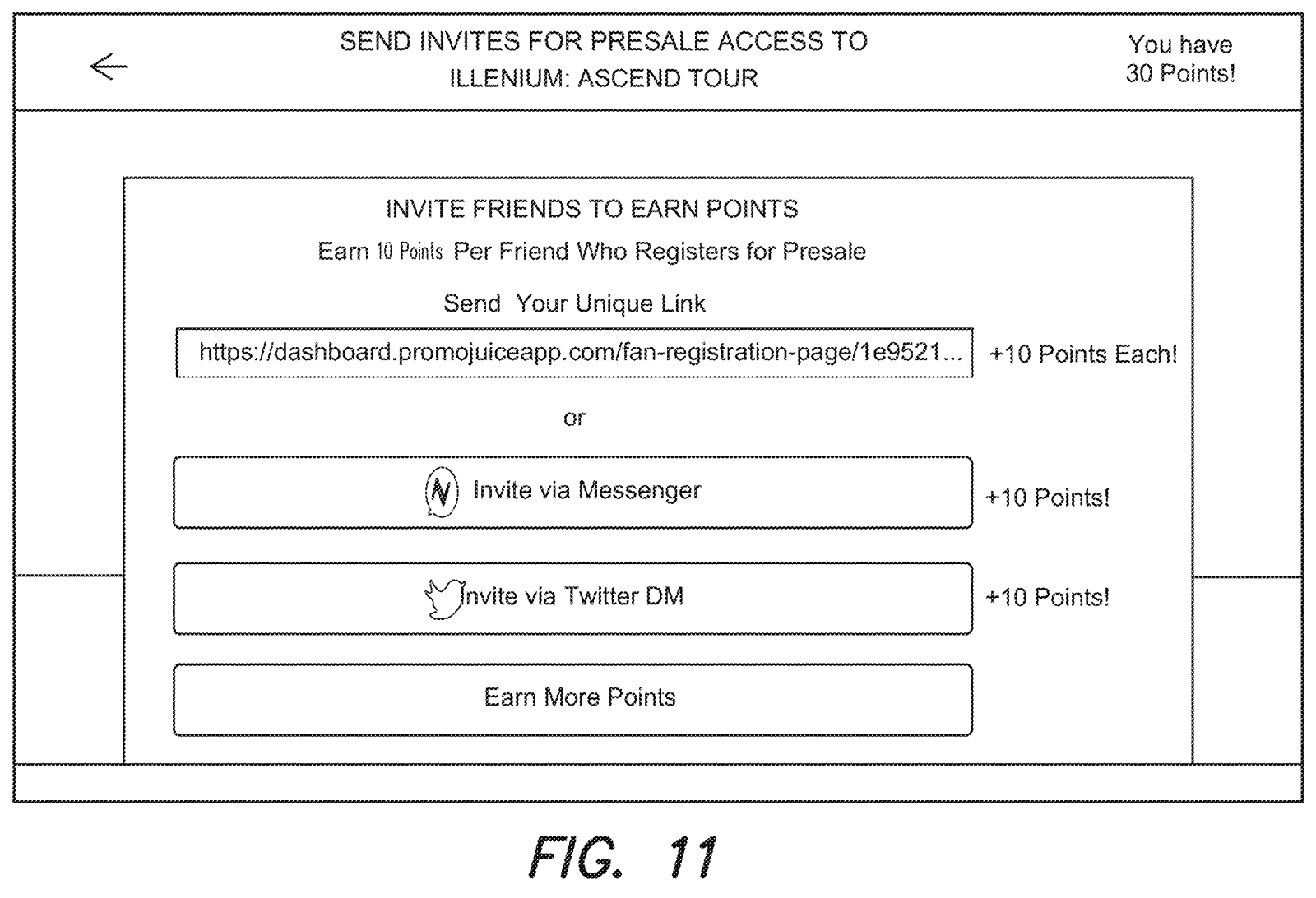
Figure 12:
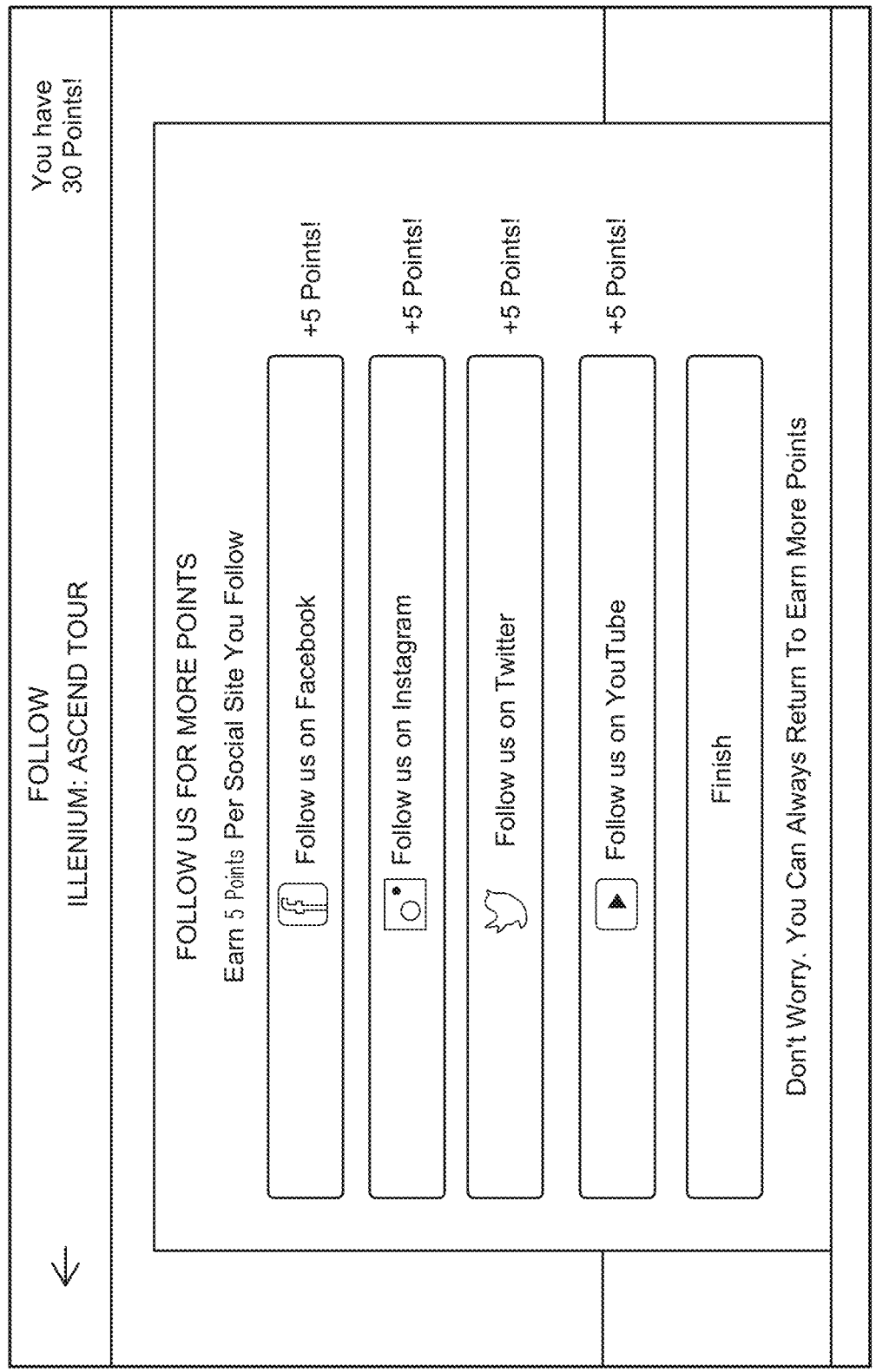
Figure 13:
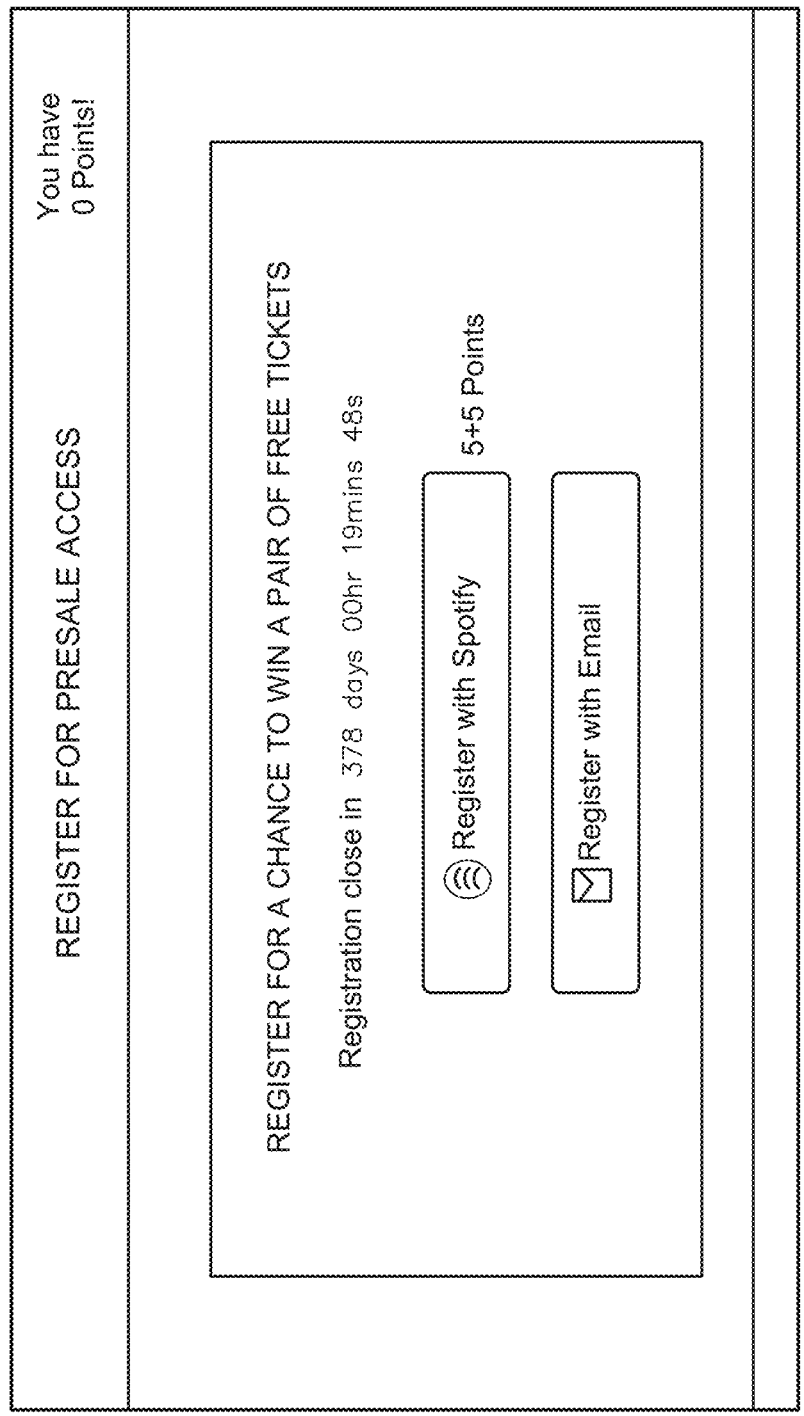

FIGS. 9-13 illustrate examples screen captures from an event management platform, software, and/or mobile implementation to facilitate understanding of various features described above. FIG. 9 is a pre-sale registration page that enables users to register for an event prior to ticket sales opening. In some embodiments, the pre-sale registration page is configured to enroll users as ambassadors for the event. In some example, the pre-sale registration pages provide option to participate in games for pre-sale registration that can earn points and/or awards. FIG. 10 illustrates a user interface display for a registered participation and who is participating in game based marketing. In various embodiments, the system generates and displays user interface selection with game-based activities and that details the points and/or awards that can be or have been earned. FIG. 11 is a user interface display that provides additional function for earning points. FIG. 12 illustrates additional actions that the users can perform to earn more points as part of the game-based marketing. In addition to game-based awards certain actions can be tied to raffles or sweepstakes type options. FIG. 13 illustration a system-based promotion for registering for a chance to win free tickets, and the same action may also earn points towards game awards.

According to some embodiments, registering users as event ambassadors can feed a variety of functions.

According to some embodiments, the ambassador program module can be part of an event management system, and can be configured to enable the user class of ambassadors to sell digital tickets or merchandise in the same shopping cart from a ticketing platform for CASH or CREDIT in person. For example, to facilitate this, ambassadors have their credit cards linked to their account. When an ambassador sells a ticket or merchandise for cash to a customer, the ambassador keeps the cash, the ambassador's credit card is charged for the ticket(s) and/or merchandise, and the event organizer sends the ticket(s) and/or merchandise to the customer and receives payment from the ambassador. The ambassador can also directly enter the customer's credit card information to sell tickets or merchandise for credit, or can provide an affiliate link to the customer who can then purchase online on their own through the PromoTix shopping cart or merchandise checkout page.

In other embodiments, various ones of the functions and/or portions of the flows discussed herein can be executed in different order. In still other embodiments, various one of the functions and/or portions of the flow can be omitted, or consolidated. In yet other embodiments, various one of the functions and/or portions of the flow can be combined, and used in various combinations of the disclosed flows, portions of flows, and/or individual functions. In various examples, various one of the screens, functions and/or algorithms can be combined, and can used in various combinations of the disclosed functions.

Having thus described several aspects of at least one example, it is to be appreciated that various alterations, modifications, and improvements will readily occur to those skilled in the art. For instance, examples disclosed herein may also be used in other contexts. Such alterations, modifications, and improvements are intended to be part of this disclosure, and are intended to be within the scope of the examples discussed herein. Accordingly, the foregoing description and drawings are by way of example only.

Use of ordinal terms such as "first," "second," "third," "a," "b," "c," etc., in the claims to modify or otherwise identify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A remote event management system, comprising at least one processor operatively connected to a memory:
the at least one processor when executing is configured to:
host a ticketing interface for an event, the event comprising a live performance and a remote streamed live event, wherein the ticketing interface includes:
an in-person interface for kiosk or POS ticketing services configured to:
receive, from users, first purchase orders for tickets for physical attendance of the live performance at an in-person venue, the first purchase orders including user information; and
trigger distribution of the tickets for physical attendance of the live performance at an in-person venue;
a remote box office service configured to display a graphical user interface on remote devices of users, the graphical user interface configured to:
receive, from users, second purchase orders for tickets for virtual attendance of the remote streamed live event at a virtual venue, the second purchase orders including user information; and
distribute the tickets for virtual attendance of the remote streamed live event at a virtual venue; and
an online ticketing platform configured to:
store ticket IDs linked with the user information from the first purchase orders for the tickets for physical attendance or the second purchase orders for the tickets for virtual attendance;
manage a shared ticket pool for the live performance and the remote streamed event based on the stored ticket IDs linked with the user information; and
manage a distribution period for the tickets for virtual attendance and the tickets for physical attendance,
wherein the graphical user interface displayed on remote devices of users is further configured to, during the distribution period:
accept, from users, requests to transition between the tickets for physical attendance and the tickets for virtual attendance; and
enable transitions between the tickets for physical attendance and the tickets for virtual attendance based on the shared ticket pool for the live performance and the remote streamed event.

2. The system of claim 1, wherein the system is configured to limit purchase price to face value ticket sale and redemption.

3. The system of claim 1, further comprising external revenue component configured to manage sponsorship operations for the live performance or remote streamed live event.

4. The system of claim 1, further comprising external revenue component configured to manage ticketing costs based on revenue from products or sponsorships.

5. The system of claim 4, wherein the system is configured to determine a threshold value for ticketing operations and determine whether projected input from the external revenue component meets or excess the threshold value.

6. The system of claim 5, wherein the system dynamically adjusts volume or value to achieve the threshold based on projected input.

7. The system of claim 1, wherein the system is configured to:
manage execution of the live performance at the in-person venue;
control localized ticketing of persons at the live performance;
execute the virtual venue as an event space for the live performance;
control ticketing for access to the virtual venue; and
secure broadcast of the live performance to ticketed users through the virtual venue.

8. The system of claim 7, wherein the at least one processor is configured to execute in-person event ticketing and virtual event ticketing, allowing an event to be attended both in-person or virtually.

9. The system of claim 1, wherein the at least one processor is configured to manage the virtual venue and the in-person venue during event execution.

10. The system of claim 1, wherein the at least one processor is configured to:
broadcast the event online; and
secure access to broadcast content based on secured tickets issued by the system.

11. The system of claim 1, wherein the at least one processor is configured to secure access to the remote streamed live event at the virtual venue and the live performance at the in-person venue, comprising limiting access to the remote streamed live event at the virtual venue and the live performance at the in-person venue to users validated as being associated with user information linked with the stored ticket IDs for tickets in the shared ticket pool.

12. The system of claim 1, wherein the at least one processor is configured to execute an ambassador platform, wherein the ambassador platform is configured to:
track ambassador activity online and in-person;
attribute the ambassador activity to respective ambassadors, comprising:
requesting validation information from respective ambassadors; and
associating submitted validation information in respective data records with respective ambassadors;
credit rewards to respective ambassadors based on a defined ambassador program and matched validation data records,
wherein the at least one processor is further configured to:
create data records defining a first level of access to the shared ticket pool to users validated as ambassadors credited with rewards; and create second data records defining a second level of access to the shared ticket pool to users other than users validated as ambassadors credited with rewards; and manage access levels in the graphical user interface based on respective access levels.

13. The system of claim 1, wherein the at least one processor is configured to execute an ambassador platform, wherein the ambassador platform is configured to:

register ambassadors to the ambassador platform, comprising:

requesting validation information from respective ambassadors; and associating submitted validation information in respective data records with respective ambassadors, wherein the at least one processor is further configured manage distribution of, from respective ambassadors to respective users, the tickets for physical attendance of the live performance at the in-person venue, comprising:

generating the tickets for physical attendance;

transferring the tickets for physical attendance from an event organizer to the respective ambassadors; and prompting transfers of the tickets for physical attendance from the respective ambassadors to the respective users.

14. The system of claim 1, wherein the at least one processor is configured to secure access to the remote streamed live event at the virtual venue by using the graphical user interface displayed on remote devices of users to:

presenting, to users, a virtual front gate;

prompting users to present, at the virtual front gate, the tickets for virtual attendance;

operating the virtual front gate to grant access to the remote streamed live event at the virtual venue to users having the tickets for virtual attendance and block access to access to the remote streamed live event at the virtual venue to users not having the tickets for virtual attendance.

15. The system of claim 1, wherein the at least one processor is configured to secure access to the remote streamed live event at the virtual venue and the live performance at the in-person venue, by dynamically maintaining tickets in the shared ticket pool for the live performance and the remote streamed event, comprising:

updating, for tickets in the shared ticket pool, the stored ticket IDs linked with the user information; and delivering, to users, the tickets with the updated ticket IDS.

16. A computer implemented method for remote event management comprising:

hosting, by at least one processor, a ticketing interface for an event, the event comprising a live performance and remote streamed live event, wherein hosting includes:

displaying, by the at least one processor, an in-person interface for kiosk or POS ticketing services, comprising:

receiving, from users, first purchase orders for tickets for physical attendance of the live performance at an in-person venue, the first purchase orders including user information; and triggering distribution of the tickets for physical attendance of the live performance at an in-person venue;

executing, by the at least one processor, a remote box office service comprising, using a graphical user interface displayed on remote devices of users:

receiving, from users, second purchase orders for tickets for virtual attendance of the remote streamed live event at a virtual venue, the second purchase orders including user information; and distributing the tickets for virtual attendance of the remote streamed live event at a virtual venue; and executing, by the at least one processor an online ticketing platform, comprising:

storing ticket IDs linked with the user information from the first purchase orders for the tickets for physical attendance or the second purchase orders for the tickets for virtual attendance;

managing a shared ticket pool for the live performance and the remote streamed event based on the stored ticket IDs linked with the user information; and managing a distribution period for the tickets for virtual attendance and the tickets for physical attendance, the method further comprising, using the graphical user interface displayed on remote devices of users, during the distribution period:

accepting, from users, requests to transition between the tickets for physical attendance and the tickets for virtual attendance; and enabling transitions between the tickets for physical attendance and the tickets for virtual attendance based on the shared ticket pool for the live performance and the remote streamed event.

17. The method of claim 16, further comprising managing a sponsor interface and sponsorship operations for the live performance and remote streamed live event.

18. The method of claim 16, further comprising:

determining a threshold value for ticketing operations and determining projected input from the external revenue component meets or excess the threshold value; and dynamically defining ticketing parameters according to the act of determine the threshold.

19. The method of claim 18, further comprising an act of dynamically adjusting ticketing volume or ticketing value to achieve the threshold based on projected input.

20. The method of claim 16, wherein the method further comprises:

managing, by the at least one processor, execution of the live performance at the in-person venue;

controlling, by the at least one processor, localized ticketing of persons at the live performance;

executing, by the at least one processor, the virtual venue as an event space for the live performance;

controlling, by the at least one processor, ticketing for access to the virtual venue; and securing, by the at least one processor, broadcast of the live performance to ticketed users through the virtual venue.

21. The method of claim 20, further comprising executing, by the at least one processor, in-person event ticketing and virtual event ticketing, and enabling an event to be attended both in-person or virtually by at least a respective participant.

22. The method of claim 16, further comprising managing, by the at least one processor, ticket distribution and redemption via the virtual venue and the in-person venue during event execution.

23. The method of claim 16, further comprising:
broadcasting, by the at least one processor, the event online; and
securing, by the at least one processor, access to broadcast content based on secured tickets issued by the method.

* * * * *